(12) United States Patent
Kiguchi et al.

(10) Patent No.: US 8,187,668 B2
(45) Date of Patent: May 29, 2012

(54) MATERIAL APPLICATION METHOD

(75) Inventors: Hiroshi Kiguchi, Nagano (JP); Kazumi Aruga, Fujimi-machi (JP); Mitsuru Kuribayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1154 days.

(21) Appl. No.: 12/024,366

(22) Filed: Feb. 1, 2008

(65) Prior Publication Data

US 2008/0145519 A1 Jun. 19, 2008

Related U.S. Application Data

(62) Division of application No. 11/035,102, filed on Jan. 14, 2005, now Pat. No. 7,350,899.

(30) Foreign Application Priority Data

Jan. 19, 2004 (JP) ................... 2004-010508

(51) Int. Cl.
*B05D 1/36* (2006.01)
*B05D 5/12* (2006.01)
(52) U.S. Cl. .............. 427/64; 427/74; 427/77; 427/264; 427/427.1
(58) Field of Classification Search .................... 427/64, 427/74, 77, 265, 427.1
See application file for complete search history.

(56) References Cited

U.S. PATENT DOCUMENTS

| 6,736,484 | B2 | 5/2004 | Nakamura |
| 7,231,276 | B2 | 6/2007 | Silverbrook |
| 2004/0241586 | A1 * | 12/2004 | Hirai et al. ................... 430/311 |

FOREIGN PATENT DOCUMENTS

| JP | 2002-036546 A | 2/2002 |
| JP | 2002-221616 A | 8/2002 |
| JP | 2003-154652 A | 5/2003 |
| JP | 2003-275659 A | 9/2003 |
| JP | 2003-284988 A | 10/2003 |

* cited by examiner

*Primary Examiner* — Leo B Tentoni
(74) *Attorney, Agent, or Firm* — Global IP Counselors, LLP

(57) ABSTRACT

A stage on which a substrate having target discharge areas is placed moves relative to a discharge head unit. When at least one of a plurality of first discharge nozzles of the discharge head unit reaches one of the target discharge areas, the first nozzle discharges a first droplet of fluid material to the target discharge area. When one of a plurality of second nozzles of the discharge head unit reaches the target discharge area to which the first droplet has been discharged, the second nozzle discharges a second droplet of the fluid material to the target discharge area. A first nozzle row of the first nozzles and a second nozzle row of the second nozzles are separated by a predetermined distance in a direction of the relative movement of the stage and the discharge head unit.

2 Claims, 33 Drawing Sheets

MATERIAL APPLICATION METHOD

CROSS-REFERENCE TO RELATED APPLICATIONS

This application is a divisional application of U.S. patent application Ser. No. 11/035,102 filed on Jan. 14, 2005, now patented (U.S. Pat. No. 7,350,899 issued on Apr. 1, 20081), which claims priority to Japanese Patent Application No. JP2004-010508 filed on Jan. 19, 2004. The entire disclosures of U.S. patent application Ser. No. 11/035,102 and Japanese Patent Application No. JP2004-010508 are hereby incorporated herein by reference.

BACKGROUND OF THE INVENTION

1. Field of the Invention

The present invention relates to a discharge apparatus for applying fluid material to a workpiece (substrate) and a method of applying material. More particularly, the present invention relates to a discharge apparatus and a material application method suitable for production of color filter substrates and the like.

2. Background Information

There have been known inkjet apparatuses that are used in producing color filters, electroluminescent display apparatuses, and the like. For example, Japanese Laid-Open Patent Application No. 2002-221616 discloses such inkjet apparatus.

Material having fluidity or material in the form of a liquid contains a solvent for imparting fluidity to material that is to be applied. For this reason, there are situations in which the volume of the liquid material required to deposit the target material (solute in the solution or the substance dispersed in the solvent) to the target discharge area up to a desired thickness exceeds the capacity that the target discharge area can receive. In such a case, the inkjet apparatus reduces the volume of the droplets of the liquid material discharged to the target discharge area during a single main scan and increases the number of main scans to be performed so that the liquid material does not flow out of the target discharge area. This is due to the fact that, by reducing the volume of the droplet of the liquid material during a single main scan, an increase in the volume of the liquid material per unit of time due to the discharge of the liquid material becomes less than a decrease in the volume of the liquid material per unit of time due to vaporization of the solvent.

In the above-described method, however, the application step requires a longer period of time to carry out the deposit operation, since a plurality of main scans need to be performed on a single target discharge area.

In view of the above, it will be apparent to those skilled in the art from this disclosure that there exists a need for an improved discharge apparatuses, material application methods, manufacturing methods for color filter substrate, manufacturing methods for electroluminescence display apparatus, manufacturing methods for plasma display apparatus, and wiring manufacturing methods that overcome the above described problems of the conventional art. This invention addresses this need in the art as well as other needs, which will become apparent to those skilled in the art from this disclosure.

SUMMARY OF THE INVENTION

The present invention was contrived in view of the above-described issue, and an object thereof is to reduce the time required in application step.

The discharge apparatus of the present invention is for discharging droplets of fluid material on a substrate that has target discharge areas. The discharge apparatus includes a stage on which the substrate is adapted to be placed such that the target discharge area is positioned to extend in a X-axis direction; a discharge head unit having a first nozzle row having a plurality of first discharge nozzles and a second nozzle row having a plurality of second discharge nozzles, the second discharge nozzles being separated from the first discharge head unit in a Y-axis direction by a first distance, the Y-axis direction intersecting with the X-axis direction; and a scanning unit for moving at least one of the stage and the discharge head unit in the Y-axis direction with respect to the other. When any one of the plurality of first discharge nozzles is at an area above any one of the target discharge areas due to the relative movement between the stage and the discharge head unit, the first nozzle is configured to discharge a first droplet of the fluid material to the target discharge area. When any one of the plurality of second discharge nozzles is, due to the relative movement in the Y-axis direction, at the area above the target discharge area to which the first droplet has been discharged, the second nozzle is configured to discharge a second droplet of the fluid material to the target discharge area.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
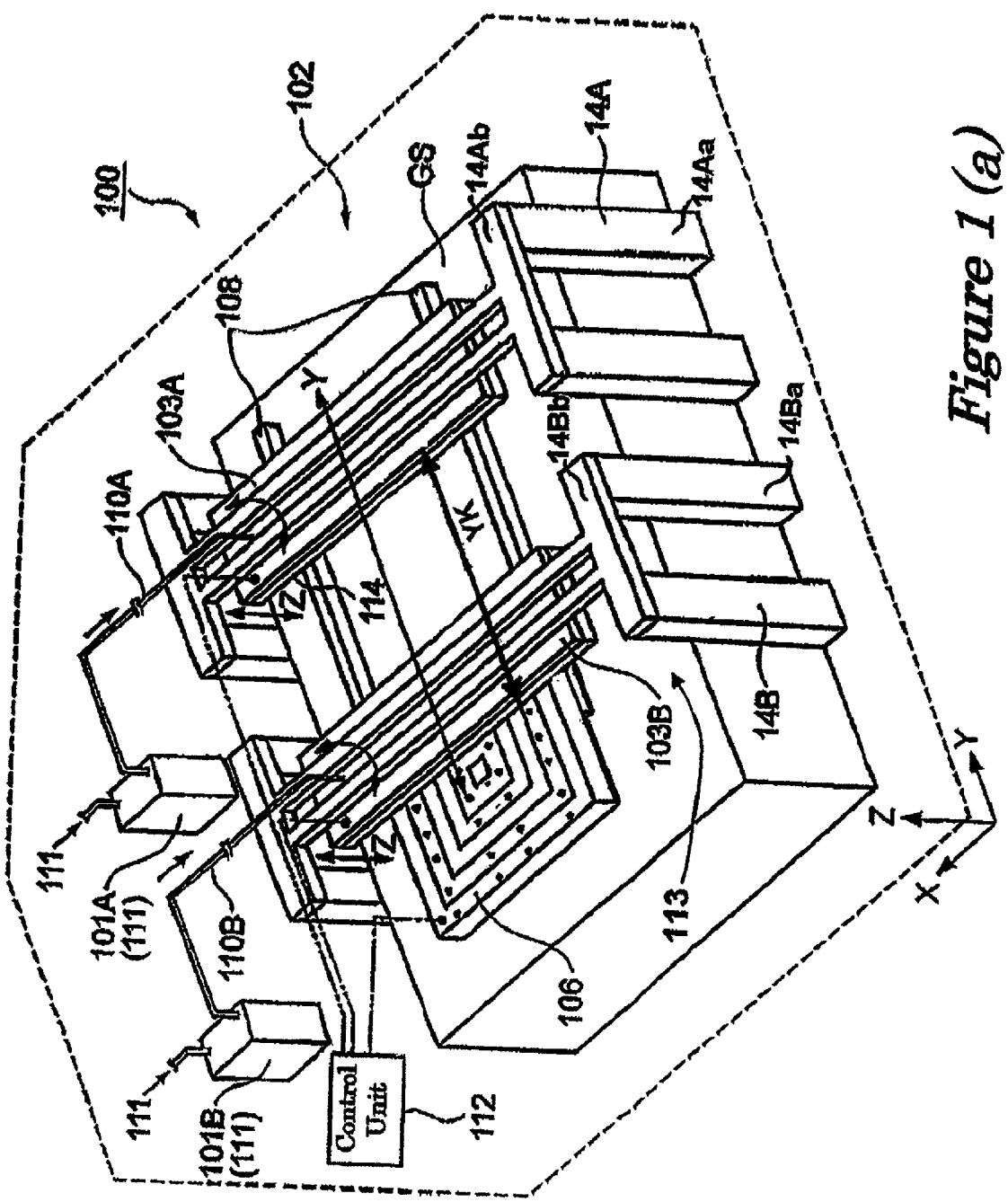
FIG. 1(a) is a schematic diagram showing the discharge apparatus in accordance with the first embodiment of the present invention.
FIG. 1(b) is a schematic diagram showing the position control apparatus of the discharge apparatus in accordance with the first embodiment of the present invention.
Figure 1:
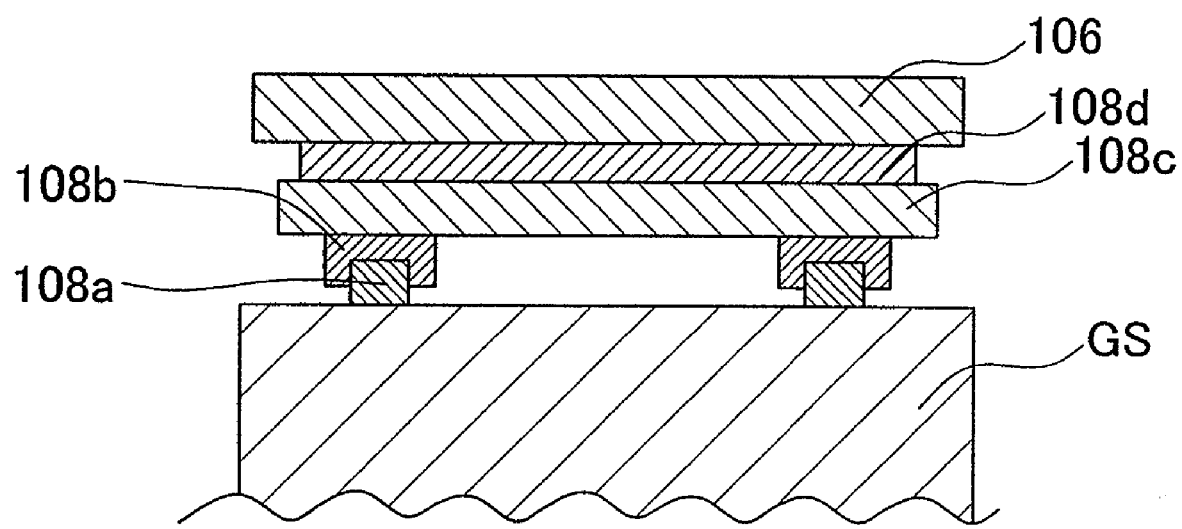

The discharge apparatus of the present invention is for discharging droplets of fluid material on a substrate that has at least one target discharge area. The discharge apparatus includes a stage on which the substrate is adapted to be placed such that the target discharge area is positioned to extend in a X-axis direction; a discharge head unit having a first nozzle row having a plurality of first discharge nozzles and a second nozzle row having a plurality of second discharge nozzles, the second discharge nozzles being separated from the first discharge head unit in a Y-axis direction by a first distance, the Y-axis direction intersecting with the X-axis direction; and a scanning unit for moving at least one of the stage and the discharge head unit in the Y-axis direction with respect to the other. When any one of the plurality of first discharge nozzles is at an area above the target discharge area due to the relative movement between the stage and the discharge head unit, the first nozzle is configured to discharge a first droplet of the fluid material to the target discharge area. When any one of the plurality of second discharge nozzles is, due to the relative movement in the Y-axis direction, at the area above the target discharge area, the second nozzle is configured to discharge a second droplet of the fluid material to the target discharge area to which the first droplet has been discharged.

With the above-described configuration, the target material (solute or dispersed substance) with the required volume can be applied without the liquid material flowing from the target discharge area during a single scanning period (single relative movement in the Y-axis direction of the stage, for example). For this reason, it is possible to shorten the time required to apply the material in the target discharge area.

Preferably, the substrate has a plurality of the target discharge areas. When any one of the plurality of first discharge nozzles is at an area above any one of the target discharge areas due to the relative movement between the stage and the discharge head unit, the first nozzle is configured to discharge a first droplet of the fluid material to the target discharge area. When any one of the plurality of second discharge nozzles is at an area above the target discharge area due to the relative movement in the Y-axis direction, the second nozzle is configured to discharge a second droplet of the fluid material to the target discharge area to which the first droplet has been discharged.

With the above configuration, fluid material can be applied to each of a plurality of target discharge areas on a single substrate (a substrate designed as a color filter substrate, for example) up to a desired volume during a single scan period (single relative movement in the Y-axis direction of the stage 106, for example).

Preferably, the scanning unit moves the stage in a direction along the Y-axis direction.

With the above configuration, the discharge of liquid material from the first nozzles and the second nozzles of the discharge head unit is stable. Since the discharge head unit does not move within the discharge apparatus, vibration that affects the discharge of droplets of liquid material can be suppressed.

The scanning unit preferably moves the stage at a substantially constant velocity.

With the above configuration, the discharge timing of the fluid material is easily controlled.

Preferably, the plurality of first nozzles are positioned such that all of the plurality of target discharge areas receive a first droplet during one relative movement between the stage and the discharge head unit, and the plurality of second nozzles are positioned such that all of the plurality of target discharge areas receive a second droplet during one relative movement between the stage and the discharge head unit.

With the above configuration, a plurality of discharge apparatuses can be arranged in a linear fashion.

Preferably, all of the first nozzles are arranged on different X-axis direction positions, all of the second nozzles are arranged on different X-axis direction positions, and every one of the second nozzles has a first nozzle that is positioned on the same X-axis direction.

The material application method of the present invention is a method by which a discharge apparatus discharges droplets of fluid material on a substrate that has target discharge areas. The discharge apparatus includes a stage, a discharge head unit having a first nozzle row of first nozzles and a second nozzle row of second nozzles, and a scanning unit for moving at least one of the stage and the discharge head unit with respect to the other. The material application method includes a step of mounting on the stage of the discharge apparatus the substrate such that the target discharge areas are positioned to extend along a X-axis direction; a step of moving one of the stage and the drive head unit relative to the other in a Y-axis direction, the Y-axis direction intersecting with the X-axis direction; a step of discharging a first droplet of the fluid material from one of the first nozzles to one of the target discharge areas when the first nozzle is positioned in an area above the target discharge area; and a step of discharging a second droplet of the fluid material from one of the second nozzles to the target discharge area to which the first droplet has been discharged when the second nozzle is positioned in the area above the target discharge area after a predetermined period of time passed since the discharge of the first droplet to the target discharge area.

With the above configuration, the target material with the required volume (solute or the substance dispersed in the solvent) can be applied without the fluid material flowing out from the target discharge areas during a single scan period (single relative movement in the Y-axis direction of the stage, for example).

Selected embodiments of the present invention will now be explained with reference to the drawings. More specifically, the present invention may be implemented in a variety of aspects, and may be implemented in a production method for a color filter substrate, a production method for an electroluminescent display apparatus, a production method for a plasma display apparatus, or a wiring production method, for example. It will be apparent to those skilled in the art from this disclosure that the following descriptions of the embodiments of the present invention are provided for illustration only and not for the purpose of limiting the invention as defined by the appended claims and their equivalents.

First Embodiment

A discharge apparatus in accordance with the first embodiment of the present invention is described below in the following order.

A. Overall configuration of the discharge apparatus
B. Head
C. Control unit
D. Discharge head unit
E. Application step A. Overall Configuration of the Discharge Apparatus The discharge apparatus 100 shown in FIG. 1 has two tanks 101A and 101B, a tube 110A, a tube 110B, and a discharge scanning unit 102. Both of the tanks 101A and 101B store a liquid material 111. The tubes 110A and 110B each feed liquid material 111 from the tanks 101A and 101B to the discharge scanning unit 102. The discharge scanning unit 102 has a stage 106, a first discharge head unit 103A, a second discharge head unit 103B, a scanning unit 113, a ground stage GS, and a control unit 112.

Both the first discharge head unit 103A and the second discharge head unit 103B are formed so as to discharge droplets of the liquid material 111 toward the stage 106. The first discharge head unit 103A and the second discharge head unit 103B are separated from one another by a predetermined distance YK in the Y-axis direction. Also, the position of the second discharge head unit 103B is fixed with respect to the first discharge head unit 103A. The scanning unit moves at least one of the stage and the combination of the first discharge head unit 103A and the second discharge head unit 103B in the Y-axis direction with respect to the other.

Here, the Y-axis direction in the present embodiment matches the direction in which one of the stage 106 and the combination of the set of the first discharge head unit 103A and the second discharge head unit 103B moves with respect to the other. Also in the present embodiment, a Z-axis direction is the direction in which the first discharge head unit 103A and the second discharge head unit 103B discharge droplets of liquid material 111, and this dropping direction of the present embodiment matches the direction of gravitational acceleration of the earth. The X-axis is the direction that is perpendicular to both the Y- and Z-axis directions thus described. The origin of the XYZ coordinate system that defines the X-, Y-, and Z-axis directions is fixedly assumed as the reference portion of the discharge apparatus 100.

Furthermore, in the present specification, the X coordinate, Y coordinate, and Z coordinate are coordinates in the XYZ coordinate system thus described. The origin may not only be a reference position, but may also be fixedly assumed on the stage 106, and may also be assumed on the first discharge head unit 103A or the second discharge head unit 103B.

The scanning unit 113 in the present embodiment has a position control apparatus 108, a first support structure 14A, and a second support structure 14B.

The position control apparatus 108 moves the stage 106. The position control apparatus 108 in the present invention moves the stage 106 along the Y-axis direction in accordance with a signal from the control unit 112. Furthermore, the position control apparatus 108 has a function of rotating the stage 106 about an axis parallel to the Z-axis.

More specifically, the position control apparatus 108 has a pair of linear motors 108a extending in the Y-axis direction, a pair of Y-axis guide rails 108b extending in the Y-axis direction, a Y-axis air slider 108c, and a θ table 108d. The pair of linear motors 108a and the pair of Y-axis guide rails 108b are positioned on the ground stage GS. The Y-axis slider 108c is movably supported by the pair of Y-axis guide rails 108b. The Y-axis slider 108c is moved in the Y-axis direction along the pair of Y-axis guide rails 108b by the action of the pair of linear motors 108a. Since the Y-axis air slider 108c is linked to the reverse surface of the stage 106 via the θ table 108d, the stage 106 moves together with the Y-axis air slider 108c in the Y-axis direction. The θ table 108d has a motor, and causes the stage 106 to rotate about the axis parallel to the Z-axis.

The first support structure 14A supports the first discharge head unit 103A. More specifically, the first support structure 14A holds the first discharge head unit 103A so that the first discharge head unit 103A is separated from the ground stage GS by a predetermined distance in the Z-axis direction. The second support structure 14B supports the second discharge head unit 103B. More specifically, the second support structure 14B holds the second discharge head unit 103B so that the second discharge head unit 103B is separated from the ground stage GS by a predetermined distance in the Z-axis direction.

The first support structure 14A and the second support structure 14B each have two supports 14Aa (14Ba) and a fixed portion 14Ab (14Bb) supported by the two supports 14Aa (14Ba). The two supports 14Aa (14Ba) are positioned so as to sandwich the stage 106 on the ground stage GS, and each support 14Aa (14Ba) extends in the Z-axis direction. The fixed portion 14Ab (14Bb) is linked to the two supports 14Aa (14Ba) so as to be positioned at a distance from the ground stage GS in the Z-axis direction. The fixed portion 14Ab (14Bb) holds the first discharge head unit 103A or the second discharge head unit 103B so that the discharge nozzles 118T (FIG. 2) in the first discharge head unit 103A or the second discharge head unit 103B face the ground stage GS side.

The fixed portion of the first support structure 14A is capable of rotating the first discharge head unit 103A about the axis parallel to the Z-axis. This rotation is used when making slight adjustments to the first discharge head unit 103A. However, the fixed portion fixedly holds the first discharge head unit 103A so that the first discharge head unit 103A does not rotate while the discharge step described below is carried out. The fixed portion of the second support structure 14B also fixedly holds the second discharge head unit 103B in the same manner as the first support structure 14A.

In the present embodiment, the positions of the first support structure 14A and the second support structure 14B are fixed with respect to the ground stage GS (or the discharge apparatus 100). For this reason, the position of the first discharge head unit 103A and the position of the second discharge head unit 103B are fixed with respect to the ground stage GS. Accordingly, the first discharge head unit 103A and the second discharge head unit 103B are fixedly positioned relative to each other. Therefore, the position of the second discharge head unit 103B is fixed with respect to the first discharge head unit 103A.

Furthermore, in the present embodiment, the first discharge head unit 103A and the second discharge head unit 103B are fixed within the discharge apparatus. On the other hand, the stage 106 moves in the Y-axis direction. The relative positions of the first discharge head unit 103A and the second discharge head unit 103B change with respect to the stage 106 because of the movement of the stage 106. With this configuration, the first discharge head unit 103A and the second discharge head unit 103B may remain stationary, so the head 114 described below can stably discharge the liquid material 111. This is due to the fact that the head 114 does not move, so vibration that would be caused by movement of the head 114 does not occur. As a result, unnecessary vibration is not transmitted to the liquid material 111 in the head 114.

B. Head

Figure 2:
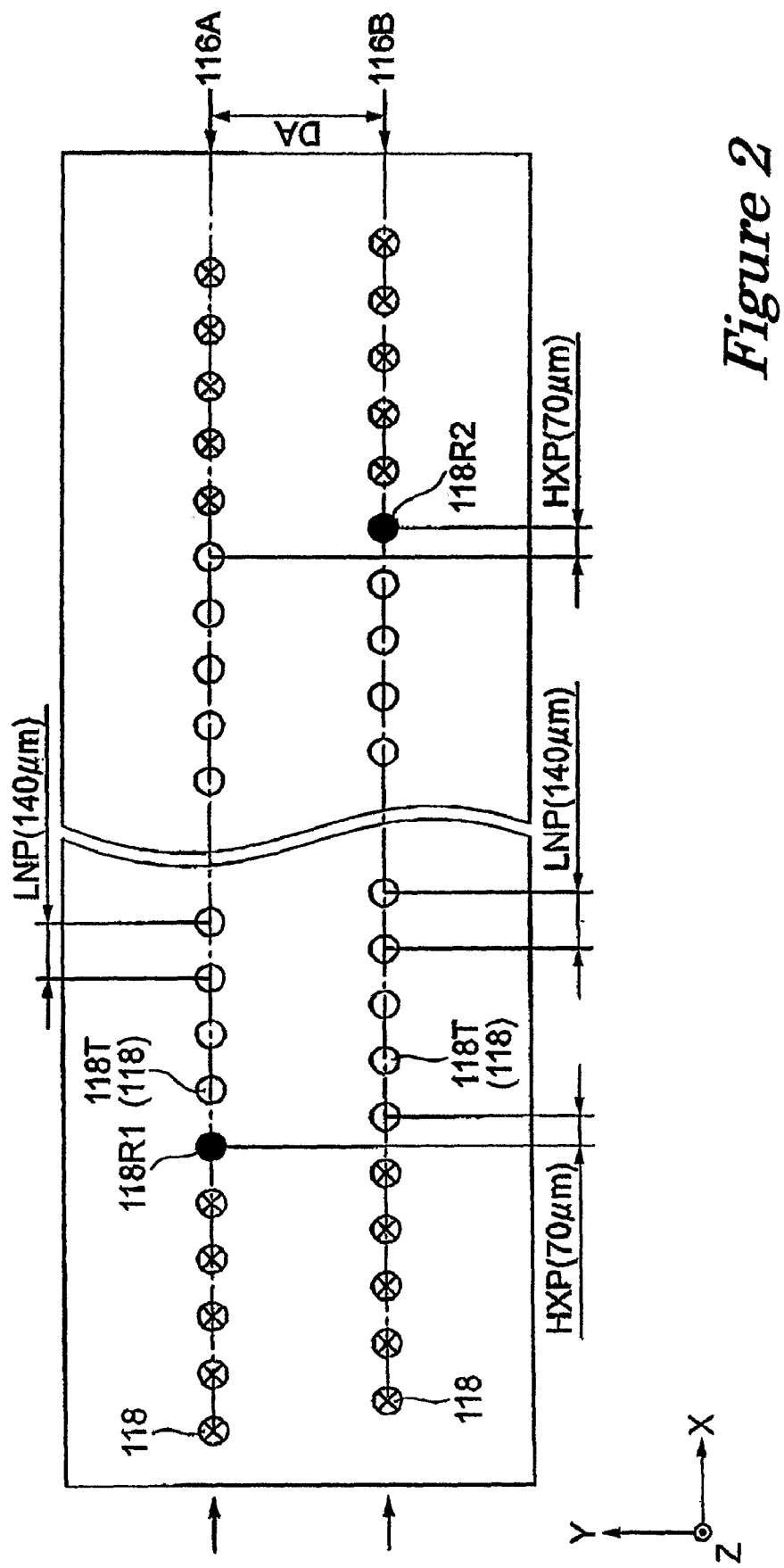
FIG. 2 is a schematic diagram showing the bottom surface of a head in the discharge apparatuses of in accordance with the first through seventh embodiments of the present invention.

The head 114 shown in FIG. 2 is one of heads 114 in the first discharge head unit 103A and second discharge head unit 103B. FIG. 2 shows a bottom surface of the head 114. The head 114 has a plurality of nozzles 118 aligned in the X-axis direction. This plurality of nozzles 118 is disposed so that the nozzle pitch HXP in the X-axis direction of the head 114 is about 70 μm. Here, "the nozzle pitch HXP in the X-axis direction of the head 114" corresponds to the pitch between a plurality of nozzle images that is obtained by projecting all of the nozzles 118 in the head 114 onto the X-axis from the direction orthogonal to the X-axis direction.

In the present embodiment, the plurality of nozzles 118 in the head 114 form a nozzle row 116A and a nozzle row 116B, both of which extend in the X-axis direction. The nozzle row 116A and nozzle row 116B are positioned next to each other in the Y-axis direction. In each of the nozzle row 116A and nozzle row 116B, 90 nozzles 118 are aligned in a single row in the X-axis direction with a predetermined spacing therebetween. In the present invention, the spacing or the nozzle pitch LNP is about 140 μm. In other words, the nozzle pitch LNP of the nozzle row 116A and the nozzle pitch LNP of the nozzle row 116B are both about 140 μm.

The position of the nozzle row 116B is offset in the positive direction (rightward direction of FIG. 2) of the X-axis direction by a length (about 70 μm) about half the nozzle pitch LNP with respect to the position of the nozzle row 116A. For this reason, the nozzle pitch HXP in the X-axis direction of the entire head 114 is half the length of the nozzle pitch LNP of the nozzle row 116A (or the nozzle row 116B).

Therefore, the linear density of the nozzles in the X-axis direction of the entire head 114 is double the linear density of the nozzles of one nozzle row 116A (or nozzle row 116B). It should be noted that "linear density of the nozzles in the X-axis direction" corresponds to the number of nozzles 118 per unit length of a plurality as viewed by projecting a plurality of nozzles onto the X-axis from the direction orthogonal to the X-axis direction.

Although there are two nozzle rows 116 in the head 114 shown in FIG. 2, the number of nozzle rows in the head 114 is not limited to two. The head 114 may have any number (M) of nozzle rows, as long as the number M is a natural number that is 1 or greater. When the number of nozzle rows 116 on the head 114 is M, a plurality of nozzles 118 in each of the M nozzle rows 116 are aligned such that the pitch length LNP between the nozzles 118 of one nozzle row 116 is M times the nozzle pitch HXP, which in FIG. 2 is the pitch length between the nozzles 118 of the all M nozzle rows 116. In other words, when there are M nozzle rows (M is a natural number that is 2 or greater), M−1 nozzle rows are offset in the X-axis direction with respect to any one of the M nozzle rows so as not to overlap. Thus, all M nozzles rows are offset from one another, the distance between offset nozzle rows are i times HXP, where i is any natural number between 1 and M−1.

The nozzle row 116A and nozzle row 116B are each composed of 90 nozzles 118, so a single head 114 has 180 nozzles 118. However, five nozzles on each end of the nozzle row 116A are set as "inactive nozzles." Five nozzles at each end of the nozzle row 116B are also similarly set as "inactive nozzles." In other words, liquid material 111 is not discharged from these 20 "inactive nozzles." For this reason, only 160 nozzles 118 of the 180 nozzles 118 in the head 114 function as nozzles 118 for the purpose of discharging liquid material 111. In the present embodiment, these 160 nozzles 118 are referred to as "discharge nozzles 118T."

Although the head 114 of the present invention has 180 nozzles 118. The number of nozzles 118 in a single head 114 is not limited to 180, and 360 nozzles may be provided to a single head 114. In this case, the nozzle row 116A and nozzle row 116B may each have 180 nozzles 118. Also, the number of discharge nozzles 118T in the present invention is not limited to 160, and a single head 114 may have any number (any natural number between 2 and the total number of the nozzles in the head) of discharge nozzles.

For the purpose of describing the relative positional relationship between the heads 114 in the present embodiment, the discharge nozzle 118T at a position of the smallest value in the X coordinate among the 160 discharge nozzles 118T in each of the heads 114 will be referred to as a "first reference nozzle 118R1." The discharge nozzle 118T at a position of the highest value in the X coordinate among the 160 discharge nozzles 118T will be referred to as the "second reference nozzle 118R2." In the case of FIG. 2, the sixth nozzle 118 from the left of the nozzle row 116A is the discharge nozzle 118T with the smallest X coordinate value so this nozzle is the first reference nozzle 118R1. Similarly, the sixth nozzle 118 from the right of the nozzle row 116B is the discharge nozzle 118T with the greatest X coordinate value, so this nozzle is the second reference nozzle 118R2. The "first reference nozzle 118R1" and the "second reference nozzle 118R2" in other heads 114 do not have to be same nozzles as those described above and shown in FIG. 2, as long as the manner in which the "first reference nozzle 118R1" and "second reference nozzle 118R2" are identified is the same for all the heads 114.

Figure 3:
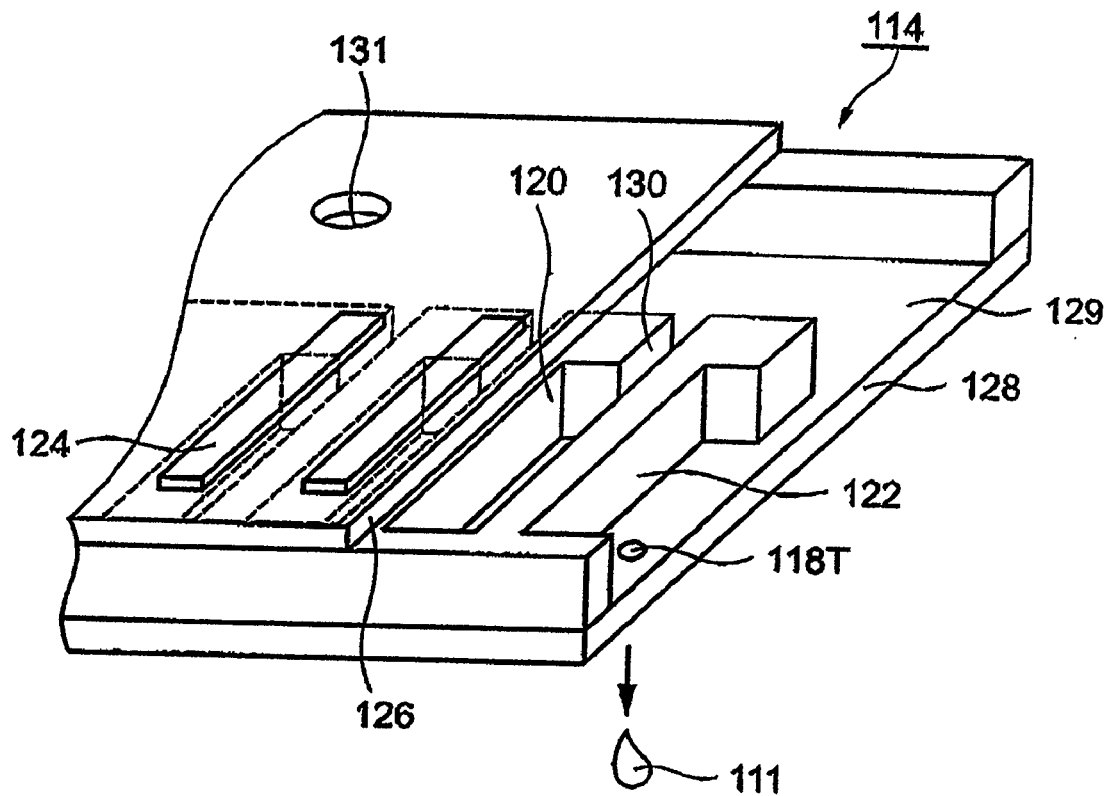
FIGS. 3(a) and (b) are schematic diagrams of the structure of the heads in the discharge apparatuses in accordance with the first through seventh embodiments of the present invention.
Figure 3:
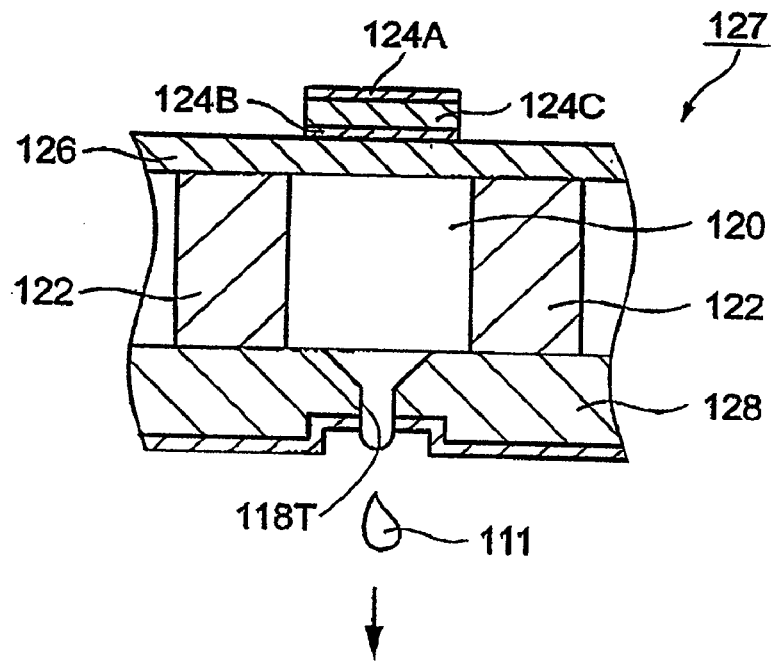

Each of the heads 114 is an inkjet head, as shown in FIG. 3(a). More specifically, each of the heads 114 has a vibration plate 126 and a nozzle plate 128. A liquid reservoir 129 that is filled with liquid material 111 fed from the tank 101A or the tank 101B (FIG. 1) via a hole 131 is positioned between the vibration plate 126 and the nozzle plate 128.

A plurality of partition walls 122 are also positioned between the vibration plate 126 and the nozzle plate 128. The portion surrounded by the vibration plate 126, the nozzle plate 128, and a pair of partition walls 122 is a cavity 120. The cavity 120 is disposed in correspondence with the nozzle 118, so the number of cavities 120 and the number of nozzles 118 are the same. Liquid material 111 is fed from the liquid reservoir 129 to the cavity 120 via a supply port 130 positioned between the pair of partition walls 122.

Vibrators 124 are positioned on the vibration plate 126 in correspondence with the cavities 120. Each vibrator 124 has a piezo element 124C, and a pair of electrodes 124A and 124B that sandwiches the piezo element 124C. By imparting a drive voltage between the pair of electrodes 124A and 124B, liquid material 111 is discharged from the corresponding nozzles 118. The shape of the nozzle 118 is adjusted so that liquid material 111 is discharged from the nozzle 118 in the Z-axis direction, which is the downward direction as shown in FIG. 3(b).

Here, "liquid material 111" in the present specification refers to material having a viscosity that allows discharge from a nozzle. In this case, the material may be water-based or oil-based. The material need only be provided with sufficient fluidity (viscosity) to allow discharge from the nozzle 118, and the material should be a fluid as a whole even if a solid substance is blended therein.

The control unit 112 (FIG. 1) may be configured so as to impart a signal to each of the plurality of vibrators 124 in a mutually independent fashion. In other words, the volume of the liquid material 111 to be discharged from the nozzles 118 can be controlled for each nozzle 118 in accordance with a signal from the control unit 112. For instance, the volume of the liquid material 111 to be discharged from each of the nozzles 118 may be varied between 0 pL and 42 pL (picoliters). Also, the control unit 112 can set the nozzles 118 that perform discharge action and the nozzles 118 that do not perform discharge action during application scans.

In the present specification, a portion containing a single nozzle 118, a cavity 120 corresponding to the nozzle 118, and a vibrator 124 corresponding to the cavity 120 are referred to as a "discharge unit 127." In accordance with this description, a single head 114 has the equal number of discharge units 127 and the nozzles 118. Also, the discharge unit 127 can have an electrothermal converter instead of a piezoelement. In other words, the discharge unit 127 may be configured to make use of the thermal expansion of the material caused by the electrothermal converter to discharge the material.

C. Control Unit

Figure 4:
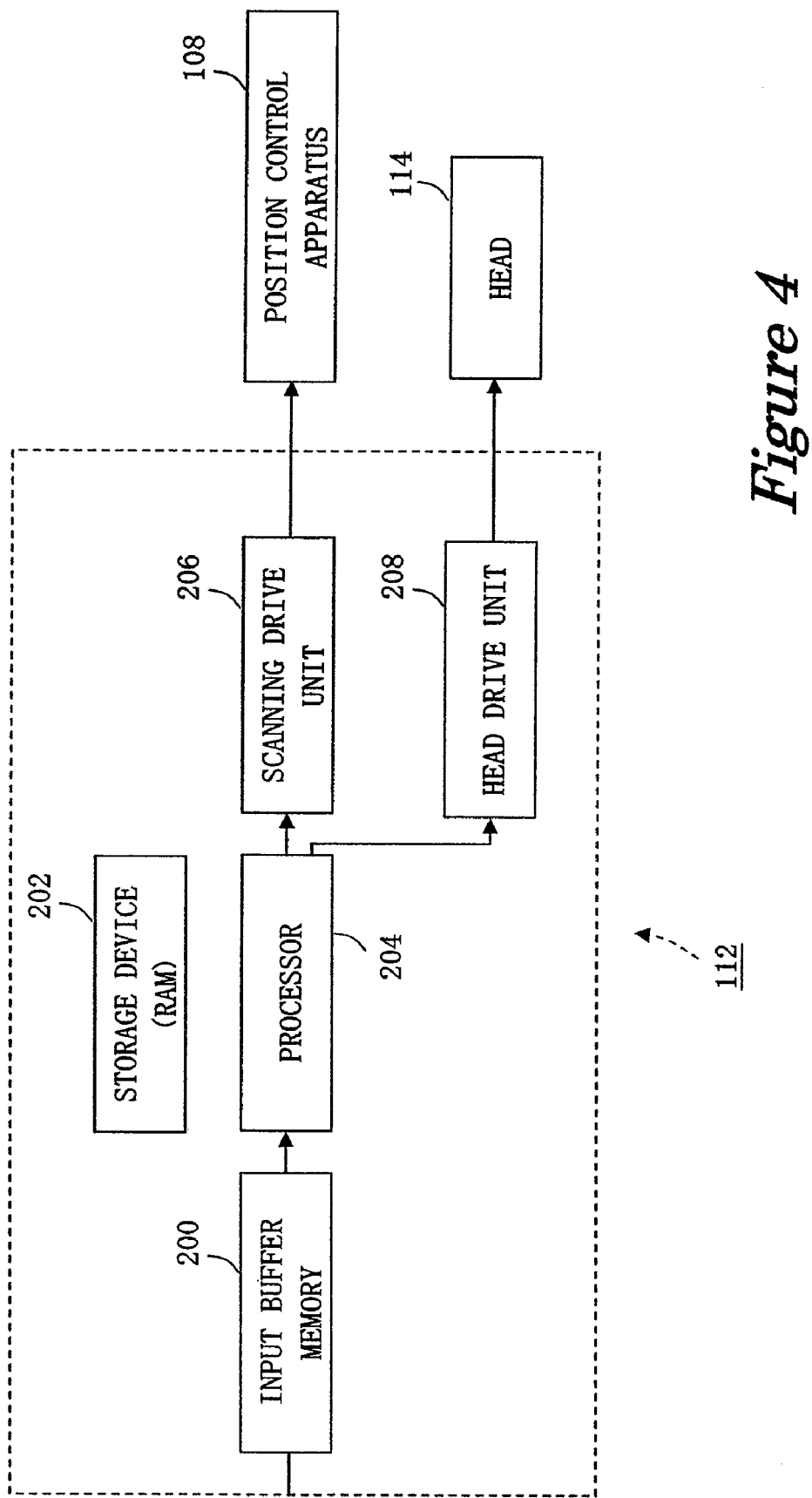
FIG. 4 is a functional block diagram of the control unit in the discharge apparatuses of the in accordance with the first through seventh embodiments of the present invention.

Next, the configuration of the control unit is described referring to FIG. 4. The control unit 112 has an input buffer memory 200, a storage device 202, a processor 204, a scan drive unit 206, and a head drive unit 208, as shown in FIG. 4. The buffer memory 200 and processor 204 are mutually communicably connected. The processor 204 and the storage device 202 are mutually communicably connected. The processor 204 and scan drive unit 206 are mutually communicably connected. The processor 204 and the head drive unit 208 are mutually communicably connected. The scan drive unit 206 and the position control apparatus 108 are mutually communicably connected. In a similar fashion, the head drive unit 208 is mutually communicably connected with each of the plurality of heads 114. Furthermore, the processor 204 is configured to be able to selectively control any of the storage device 202, the scan drive unit 206, and the head drive unit 208.

The input buffer memory 200 receives discharge data from an external information processing apparatus, and the data is used to discharge droplets of liquid material 111. The discharge data contains data expressing the relative position of all target discharge areas on a substrate, data showing the number of discharges required to apply liquid material 111 to all target discharge areas and achieve a desired thickness, data for identifying inactive nozzles, data for identifying nozzles that actually perform discharges among the discharge nozzles 118T, and data for identifying nozzles that do not perform discharges among the discharge nozzles 118T. The input buffer memory 200 feeds such discharge data to the processor 204, and the processor 204 stores the discharge data in the storage device 202. In the example shown in FIG. 4, the storage device 202 is a RAM.

Figure 5:
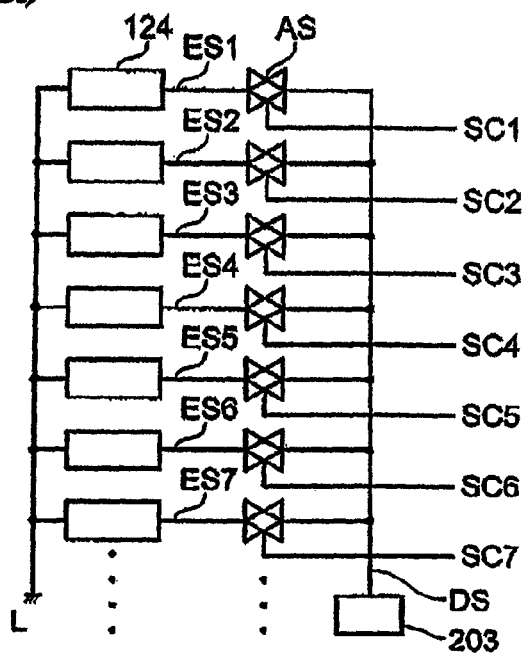
FIGS. 5(a) and (b) are schematic diagrams of the head drive unit in the discharge apparatuses of in accordance with the first through seventh embodiments of the present invention.
Figure 5:
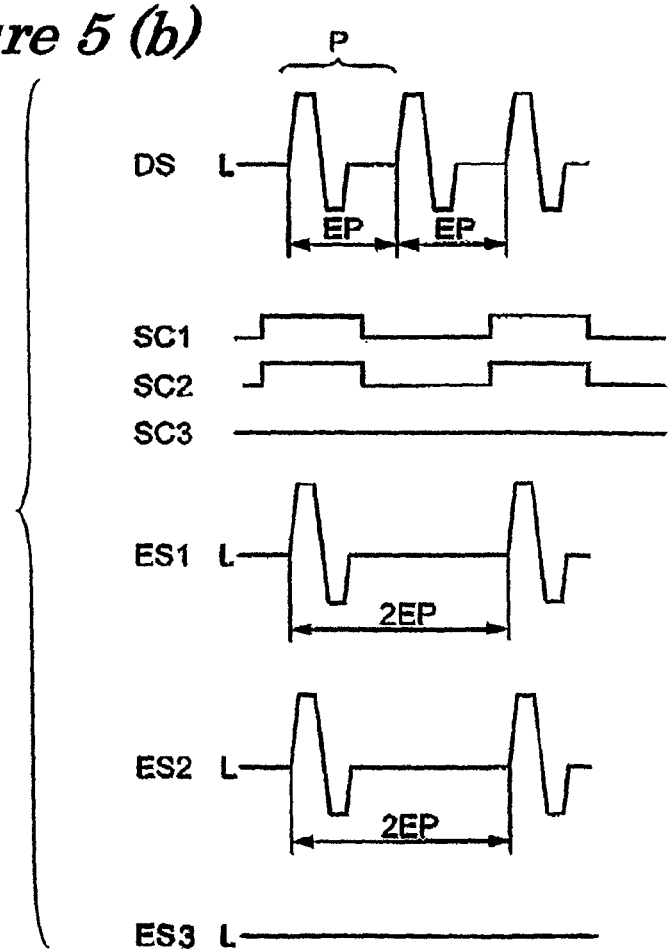

The processor 204 presents the scan drive unit 206 with data showing the relative positions of the nozzles 118 with respect to the target discharge areas based on the discharge data in the storage device 202. The scan drive unit 206 presents the position control apparatus 108 with drive signals correlated with this relative positions data and with the discharge cycle EP (FIG. 5) described below. As a result, the head 114 performs relative scanning on the target discharge area. The processor 204, on the other hand, presents the head drive unit 208 with selection signals SC for specifying the ON/OFF state of the nozzles 118 at each discharge timing based on the discharge cycle EP and the discharge data stored in the storage device 202. The head drive unit 208 presents the head 114, on the basis of the selection signals SC, with ejection signals ES that require the liquid material 111 to be discharged. As a result, the liquid material 111 is discharged as droplets from the corresponding nozzles 118 on the head 114.

The control unit 112 can be a separate computer that includes a CPU, a ROM, a RAM, and a bus. In this case, the above-described functions of the control unit 112 are carried out by a software program that is executed by the computer. The control unit 112 can also be implemented as a dedicated circuitry (hardware).

Next, the configuration and function of the head drive unit 208 in the control unit 112 are described.

The head drive unit 208 has a single drive signal generator 203 and a plurality of analog switches AS, as shown in FIG. 5(a). The drive signal generator 203 generates a drive signal DS, as shown in FIG. 5(b). The electric potential of the drive signal DS varies with time in relation to a reference electric potential L. Specifically, the drive signal DS contains a plurality of discharge waveforms P that are repeated in the discharge cycle EP. Here, the discharge waveform P corresponds to the drive voltage waveform that is to be applied between the pairs of electrodes of the corresponding vibrators 124 in order to discharge a single droplet from the nozzle 118.

The drive signal DS is fed to the input terminal of each analog switch AS. In other words, the number of analog switches AS and the number of discharge units 127 (the number of nozzles 118, in other words) are the same.

The processor 204 provides selection signals SC indicating the ON/OFF state of the nozzles 118 to the analog switches AS, respectively. Here, the selection signals SC (SC1 to SC7 in FIG. 5) can assume either a high level or a low level for each analog switch AS. The analog switches AS feed ejection signals ES (ES1 and ES7 in FIG. 5) to the electrodes 124A of the vibrators 124 in accordance with the drive signal DS and selection signals SC. Specifically, when the selection signal SC is at a high level, the analog switch AS transmits a drive signal DS as an ejection signal ES to the electrodes 124A. When the selection signal SC is at a low level, the electric potential of the ejection signal ES output by the analog switches AS is the reference electric potential L. When a drive signal DS is provided to the electrodes 124A of the vibrator 124, the liquid material 111 is discharged from the nozzle 118 corresponding to the vibrator 124. It should be noted that the reference potential L is also provided to each of the electrodes 124B of the vibrators 124.

In the example shown in FIG. 5(b), a high level period and a low level period are set in each of the two selection signals SC1 and SC2, so that the discharge waveform P appears in the cycle of 2EP, which is twice as long as the discharge cycle EP, in each of the two ejection signals ES1 and ES2. The liquid material 111 is thereby discharged in the cycle 2EP from each of the two corresponding nozzles 118. Also, the shared drive signal DS is provided from the shared drive signal generator 203 to the corresponding vibrators 124 of these two nozzles 118 in a parallel manner. For this reason, liquid material 111 is discharged from these two nozzles 118 at substantially the same timing.

On the other hand, since the level of the selection signal SC3 in FIG. 5(b) is kept at a low level while the selection signals SC1 and SC2 are at a high level, the discharge waveform P does not appear in the corresponding ejection signals ES3. More specifically, the ejection signal ES3 is kept at the reference level L. For this reason, liquid material 111 is not discharged from the nozzle 118 that corresponds to the selection signal SC3 even when the discharge waveform P appears in the drive signal DS.

In accordance with the above-described configuration, the discharge apparatus 100 scans and applies the liquid material 111 in accordance with the discharge data provided to the control unit 112.

D. Discharge Head Unit

Figure 6:
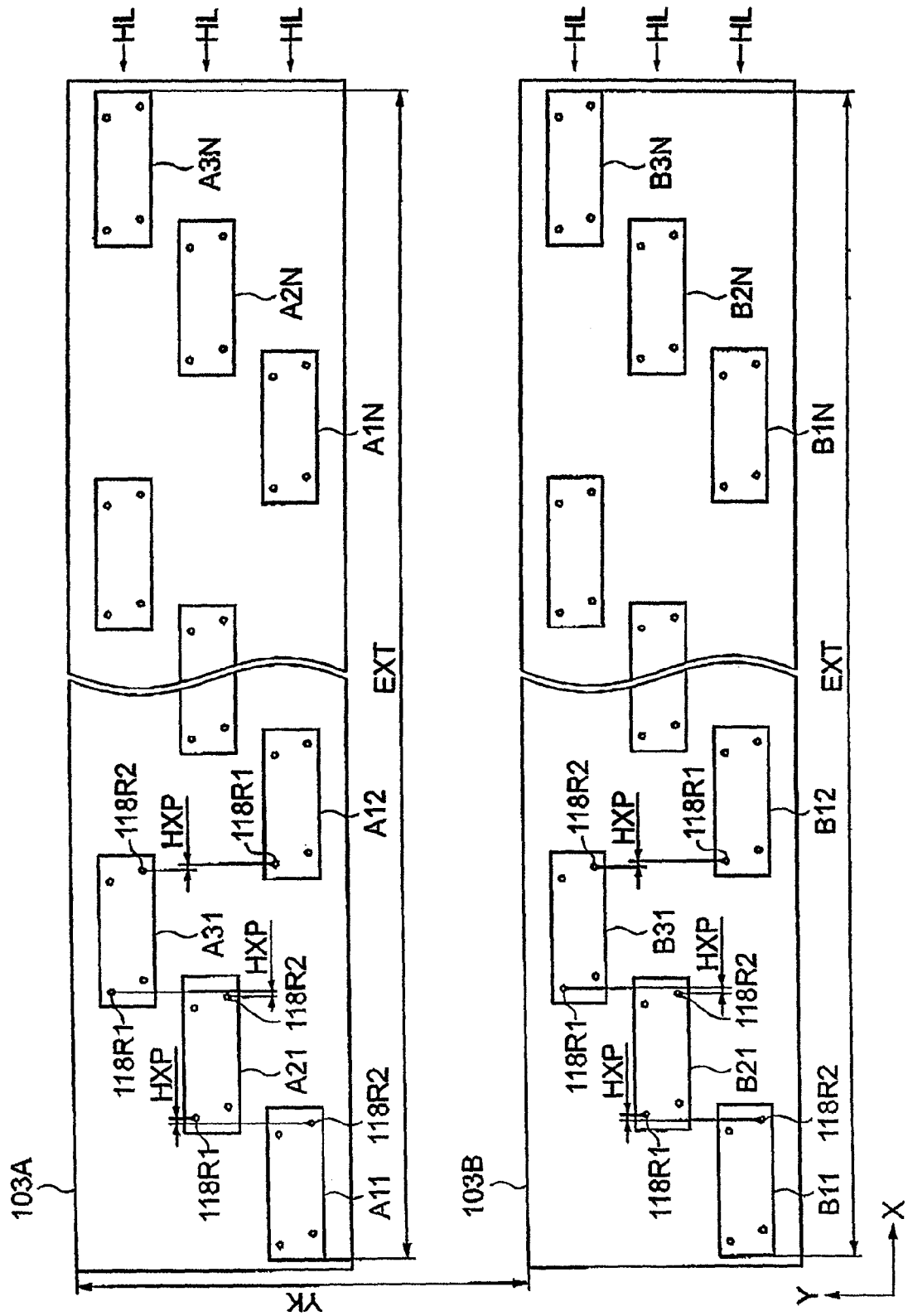
FIG. 6 is a schematic diagram of the two discharge head units in accordance with the first embodiment of the present invention.

The first discharge head unit 103A is separated from the second discharge head unit 103B by a predetermined distance YK in the Y-axis direction, as shown in FIG. 6. In the case of FIG. 6, the Y coordinate value of the first discharge head unit 103A is greater than the Y coordinate value of the of the second discharge head unit 103B. The predetermined distance YK is also the distance between the nozzle row having the largest Y coordinate value in the first discharge head unit 103A and the nozzle row having the largest Y coordinate value in the second discharge head unit 103B.

The relative positional relationship of the heads 114 of the first discharge head unit 103A will now be described.

A plurality of heads 114 are arranged in three head rows HL, each of which extends in the X-axis direction. The three head rows HL neighbor each other in the Y-axis direction. Each of the head rows HL has the same number of heads 114 that are aligned with a predetermined spacing between adjacent heads 114.

For the purpose of facilitating the description, the plurality of heads 114 contained in the bottom head row HL of the first discharge head unit 103A shown in FIG. 6 is designated as head $A_{11}$, head $A_{12}$, and head $A_{13}$ to $A_{1N}$ in the order from the left hand side to the right hand side in FIG. 6. Also, the heads 114 contained in the middle head row HL of FIG. 6 are designated as head $A_{21}$, head $A_{22}$, and head $A_{12}$ to $A_{2N}$ from the left hand side to the right hand side in FIG. 6. The plurality of heads 114 contained in the top head row HL as shown in FIG. 6 is designated as head $A_{31}$, head $A_{32}$, and head $A_{33}$ to $A_{3N}$ from the left hand side to the right hand side in FIG. 6. It should be noted that the number N is a positive integer and indicates the number of heads 114 contained in a head row.

The position of the first reference nozzle 118R1 of the head $A_{21}$ is offset in the positive direction (rightward direction in FIG. 6) of the X-axis direction by the length of the nozzle pitch HXP (about 70 μm) from the position of the second reference nozzle 118R2 of the head $A_{11}$. In FIG. 6, the nozzle pitch HXP is the distance between the first and second reference nozzles 118R1 and 118R2 of the immediately adjacent heads 114. The position of the first reference nozzle 118R1 of the head $A_{31}$ is offset in the positive direction of the X-axis direction by the length of the nozzle pitch HXP (about 70 μm) from the position of the second reference nozzle 118R2 of the head $A_{21}$. The position of the first reference nozzle 118R1 of the head $A_{12}$ is offset in the positive direction of the X-axis direction by the length of the nozzle pitch HXP (about 70 μm) from the position of the second reference nozzle 118R2 of the head $A_{31}$.

Furthermore, the relative positional relationships between other heads in the first discharge head unit 103A is the same as the relative positional relationships between the head $A_{11}$, head $A_{21}$, head $A_{31}$, and head $A_{12}$.

Based on the description above, the discharge nozzles 118T in the first range EXT are distributed so that the nozzle pitch in the X-axis direction is the nozzle pitch HXP. Here, the term "first range EXT" in the present embodiment is a range disposed along the X-axis direction, and this range is defined to be between the two discharge nozzles 118T positioned on the outermost sides in the first discharge head unit 103A. The two discharge nozzles 118T positioned on the outermost sides are included in the first range EXT.

For convenience in description, the heads 114 in the second discharge head unit 103B are described next as heads $B_{11}$ to $B_{3N}$. The arrangement pattern of the heads $B_{11}$ to $B_{3N}$ in the second discharge head unit 103B is the same as the arrangement pattern of the heads $A_1$ to $A_{3N}$ in the first discharge head unit 103A. In other words, the arrangement pattern of the discharge nozzles 118T of the second discharge head unit 103B is the same as the arrangement pattern of the discharge nozzles 118T of the first discharge head unit 103A.

Based on the above description, the discharge nozzles 118T in the first range EXT in the second discharge head unit 103B are also distributed so that the nozzle pitch in the X-axis direction is the nozzle pitch HXP. The two discharge nozzles 118T that have the same X coordinate value are positioned one each in the first discharge head unit 103A and second discharge head unit 103B.

E. Application Step

Figure 7:
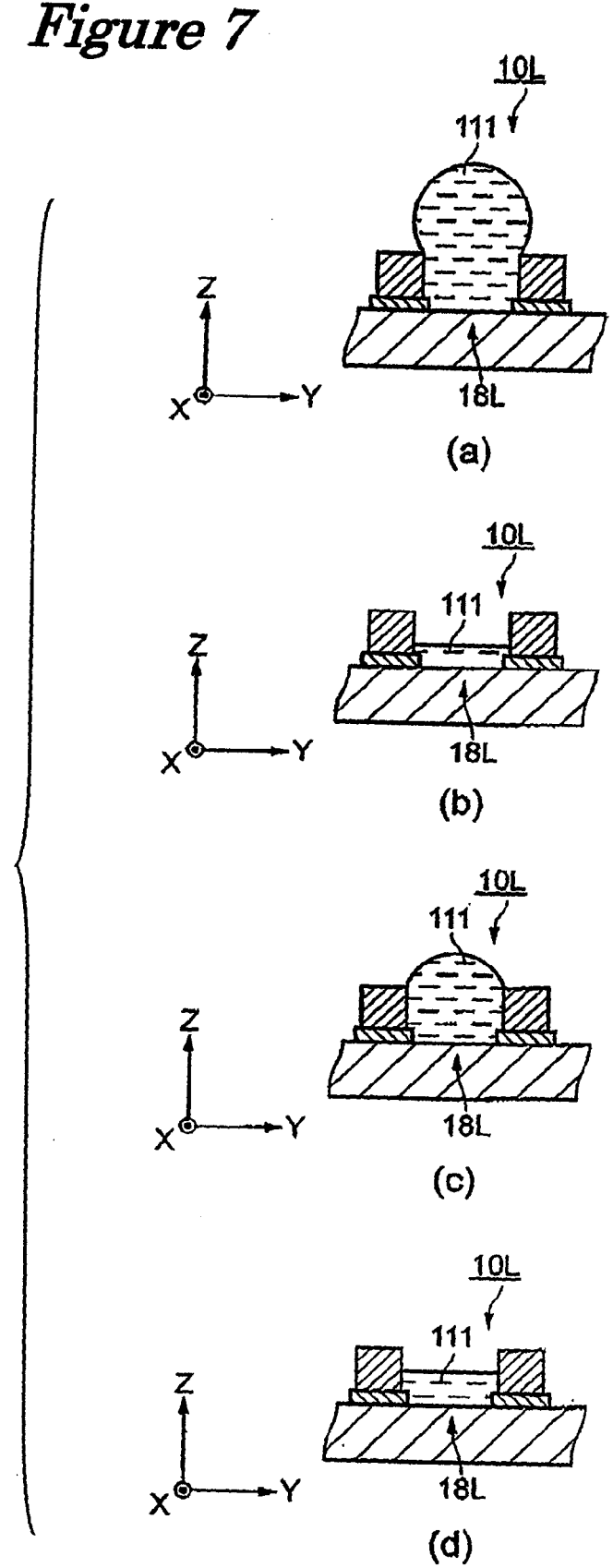
FIG. 7 is a schematic diagram showing the application step in accordance with the first embodiment of the present invention.
Figure 8:
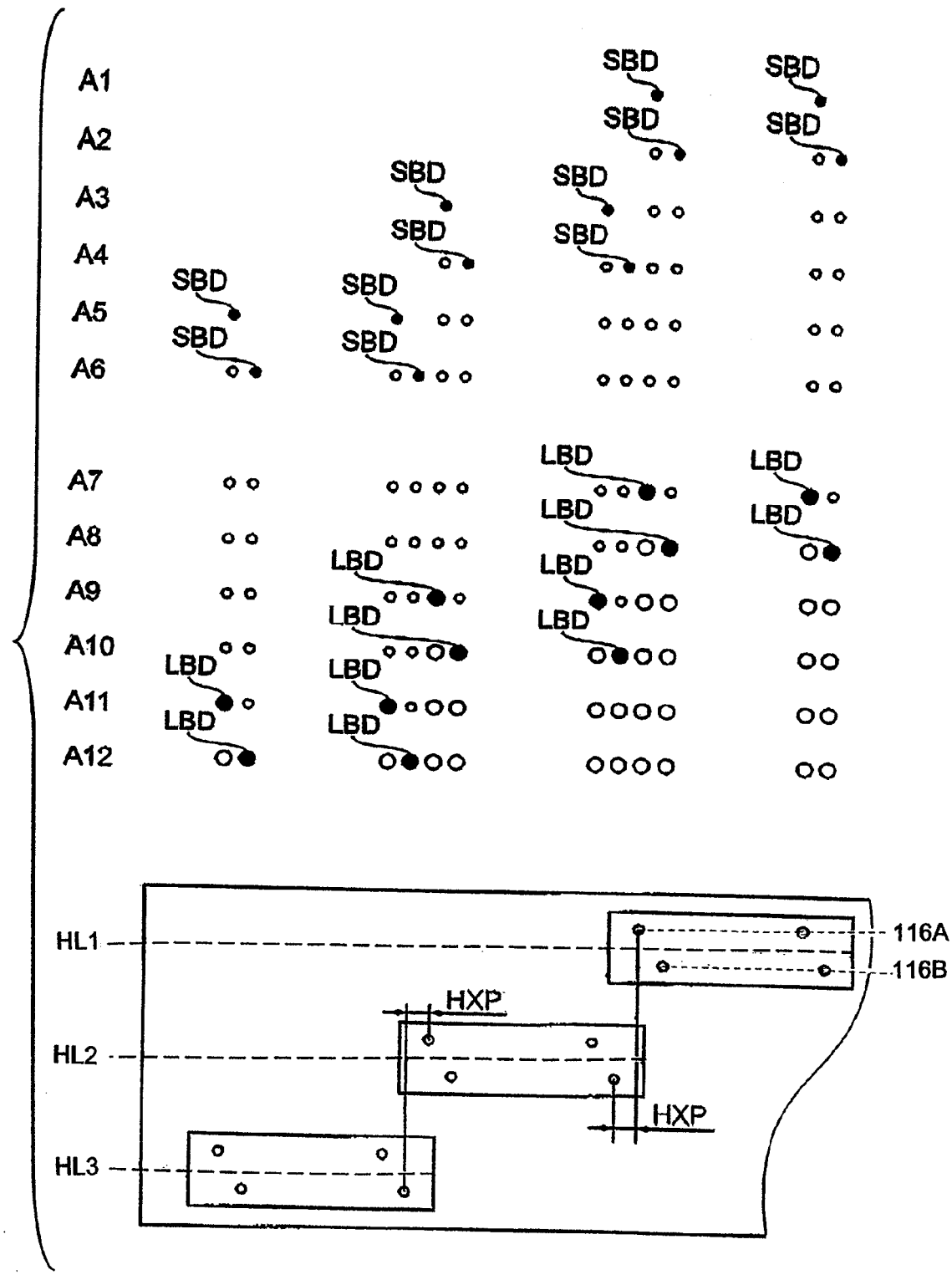
FIG. 8 is a schematic diagram showing the application step in accordance with the first embodiment of the present invention.

The step for applying the liquid material 111 to the striped target discharge area 18L is described as the application step of the present embodiment with reference to FIGS. 7 and 8.

The stage 106 in the discharge apparatus 100 of the present embodiment moves once in the Y-axis direction from a receiving area to a removal area in the step for applying (application step) the liquid material 111 to a single target discharge area 18L on the substrate 10L.

When the stage 106 is positioned in the receiving area, the substrate 10L to which the liquid material 111 is to be applied is placed on the stage 106 using a first robot fork. Here, the substrate 10L is positioned with respect to the discharge apparatus 100 so that the lengthwise direction of the stripe-shaped target discharge area 18L matches the X-axis direction. The substrate 10L is positioned with respect to the discharge apparatus 100, and the stage 106 then begins to move in the Y-axis direction from the receiving area toward the removal area.

The first discharge head unit 103A passes through the area corresponding to the target discharge area 18L. The first discharge head unit 103A discharges first droplets of the liquid material 111 in the target discharge area 18L from each of the discharge nozzles 118T while the first discharge head unit 103A passes through the area corresponding to the target discharge area 18L. As a result, droplets of the liquid material 111 are deposited in each of a plurality of deposit positions in alignment with the nozzle pitch HXP in the first range EXT. Each of the deposited droplets spreads out from their respective deposited positions.

When this operation is completed, the liquid material 111 fills the target discharge area 18L, as shown in FIG. 7(a). The first discharge head unit 103A passes by the area corresponding to the target discharge area 18L, and the solvent contained in the liquid material 111 then evaporates by the time the second discharge head unit 103B enters the area corresponding to the target discharge area 18L thereof, and only the material (solute or dispersed substance) that is to be applied remains in the target discharge area 18L. The volume of the liquid material 111 in the target discharge area 18L is reduced as a result, as shown in FIG. 7(b).

The first discharge head unit 103A passes through the area corresponding to the target discharge area 18L, and then the second discharge head unit 103B passes through the area corresponding to the target discharge area 18L. The second discharge head unit 103B discharges second droplets of the liquid material 111 in the target discharge area 18L from each of the discharge nozzles 118T while the second discharge head unit 103B passes through the area corresponding to the target discharge area 18L. As a result, droplets of the liquid material 111 are deposited in each of a plurality of deposit positions in alignment with the nozzle pitch HXP in the first range EXT. The plurality of deposit positions produced by the second discharge head unit 103B is substantially the same as the plurality of deposit positions of the first discharge head unit 103A. Each of the deposited droplets spreads out from their respective deposited positions. As a result, the entire target discharge area 18L is covered with the liquid material 111.

As a result, the liquid material 111 once again fills the target discharge area 18L, as shown in FIG. 7(c). The liquid material 111 discharged to the target discharge area 18L dries thereafter, and the material with the required volume is applied to the target discharge area 18L after the solvent in the liquid material 111 evaporates, as shown in FIG. 7(d).

The second discharge head unit 103B passes through the area corresponding to the target discharge areas 18L, and the stage 106 then reaches at the removal area and stops. The substrate 10L that has gone through the application step is lifted up from the stage 106 using the two forks of a second robot.

Next, the process in FIG. 7 is described in a greater detail referring to FIG. 8. The stage 106 moves in the Y-axis direction, as shown in FIG. 8. When this operation is completed, the nozzle row 116A of the plurality of heads 114 contained in the first head row HL1 in the first discharge head unit 103A reaches the areas corresponding to the target discharge areas 18L. The nozzle row 116A of these heads 114 discharges first droplets of the liquid material 111 toward the target discharge areas 18L. The plurality of first droplets is thereby deposited in a plurality of deposit positions SBD in alignment with the nozzle pitch LNP (about 140 μm) in the target discharge area 18L, as shown on the right side of the label A1 of FIG. 8. The deposited droplets spread out from the deposit positions SBD.

In FIG. 8, only the deposit positions SBD corresponding to the discharge nozzles 118T at both ends of the nozzle row 116A are shown as black dots on the right side of the label A1 of FIG. 8, and the deposit positions SBD that correspond to the discharge nozzles 118T between the ones on both ends of the nozzle row 116A have been omitted from the diagram. In the other labels A2 to A12 as well, only the deposit positions SBD corresponding to the discharge nozzles 118T at both ends of the corresponding nozzle row are represented as deposit positions SBD.

Next, the plurality of heads 114 of the nozzle row 116B in the first head row HL1 reaches the area corresponding to the target discharge areas 18L. The nozzle row 116B then discharges first droplets of liquid material 111 toward the target discharge areas 18L. The first droplets are thereby deposited at each of the plurality of deposit positions SBD that are in alignment with the nozzle pitch LNP (about 140 μm) on the target discharge areas 18L, as shown on the right side of the label A2 of FIG. 8. As seen in FIG. 8, the deposit positions SBD deposited from the nozzle row 116A and the deposit positions SBD deposited from the nozzle row 116B are offset by about 70 μm. In this manner, the nozzle row 116A and nozzle row 116B deposit the first droplets at each of the plurality of deposit positions SBD that are in alignment with the spacing of the nozzle pitch HXP on the target discharge areas 18L.

The first droplets of the liquid material 111 are discharged in the same manner from the heads 114 in the second head row HL2 and the heads 114 in the third head row HL3. More specifically, the nozzle row 116A of the second head row HL2 deposits droplets at the deposit positions SBD of the label A3, and the nozzle row 116B the label A4. The nozzle row 116A of the third head row HL3 deposits droplets at the deposit positions SBD of the label A5, and the nozzle row 116B the label A6. The first droplets of the liquid material 111 are deposited at each of the plurality of deposit positions SBD in alignment with the nozzle pitch HXP across the first range in the target discharge areas 18L (labels A3 to A6 in FIG. 8).

Next, the second discharge head unit 103B reaches the areas corresponding to the target discharge areas 18L. The arrangement pattern of the discharge nozzles 118T in the second discharge head unit 103B is the same as the arrangement pattern of the discharge nozzles 118T in the first discharge head unit 103A. Therefore, second droplets of the liquid material 111 are deposited at the same deposit positions LBD as the deposit positions SBD of the first discharge head unit 103A (labels A7 to A12 in FIG. 8).

The application step described above can allow liquid material 111 with a desired volume to be applied to the target discharge areas 18L with only a single movement of the stage 106 in the Y-direction.

The liquid material 111 contains a solvent so as to obtain a desired fluidity. For this reason, the volume of the liquid material 111 corresponding to the volume of the material (solute or material dispersed by the solvent) that is to be applied to the target discharge area 18L may be greater than the volume of the capacity of the target discharge area 18L. In such cases, the volume of the liquid material 111 that can be discharged to the target discharge area during a single scan period is limited. Accordingly, a plurality of scan periods is therefore necessary, and time is required in the application step as a result.

In accordance with the present embodiment, however, the first discharge head unit 103A and the second discharge head unit 103B overlap at the same positions on the target discharge areas 18L with a time interval therebetween during a single scan (for example, a single relative movement of the stage 106 along the Y-axis direction from the start point to the end point). Here, the solvent of the liquid material 111 in the first droplet deposited by the first discharge head unit 103A evaporates vaporizes by the time the second discharge head unit 103B reaches the same target discharge area 18L. Thus, the volume of the liquid material 111 is reduced during the time interval, which begins when the first discharge head unit 103A discharges the first droplet to the target discharge area 18L and ends when the second discharge head unit 103B discharges the second droplet to the target discharge area 18L. Accordingly, several droplets can be discharged to the same target discharge area 18L during a single scan period even if the volume of the droplets from a single head is small. The required amount of liquid material 111 can therefore be applied to the target discharge area 18L during a single scan without the liquid material 111 flowing out from the target discharge area 18L.

One example of the stripe-shaped target discharge area 18L is a portion for forming metal wiring in electronic equipment. Therefore, the discharge apparatus 100 of the present embodiment can be applied to wiring manufacturing apparatuses for producing metal wiring in electronic equipment by discharging wiring material in the form of a liquid. For example, the present invention can be applied to wiring manufacturing apparatuses for forming address electrodes 54 on a carrier substrate 52 of a plasma display apparatus 50 (FIGS. 25 to 26) described below.

Second Embodiment

Figure 9:
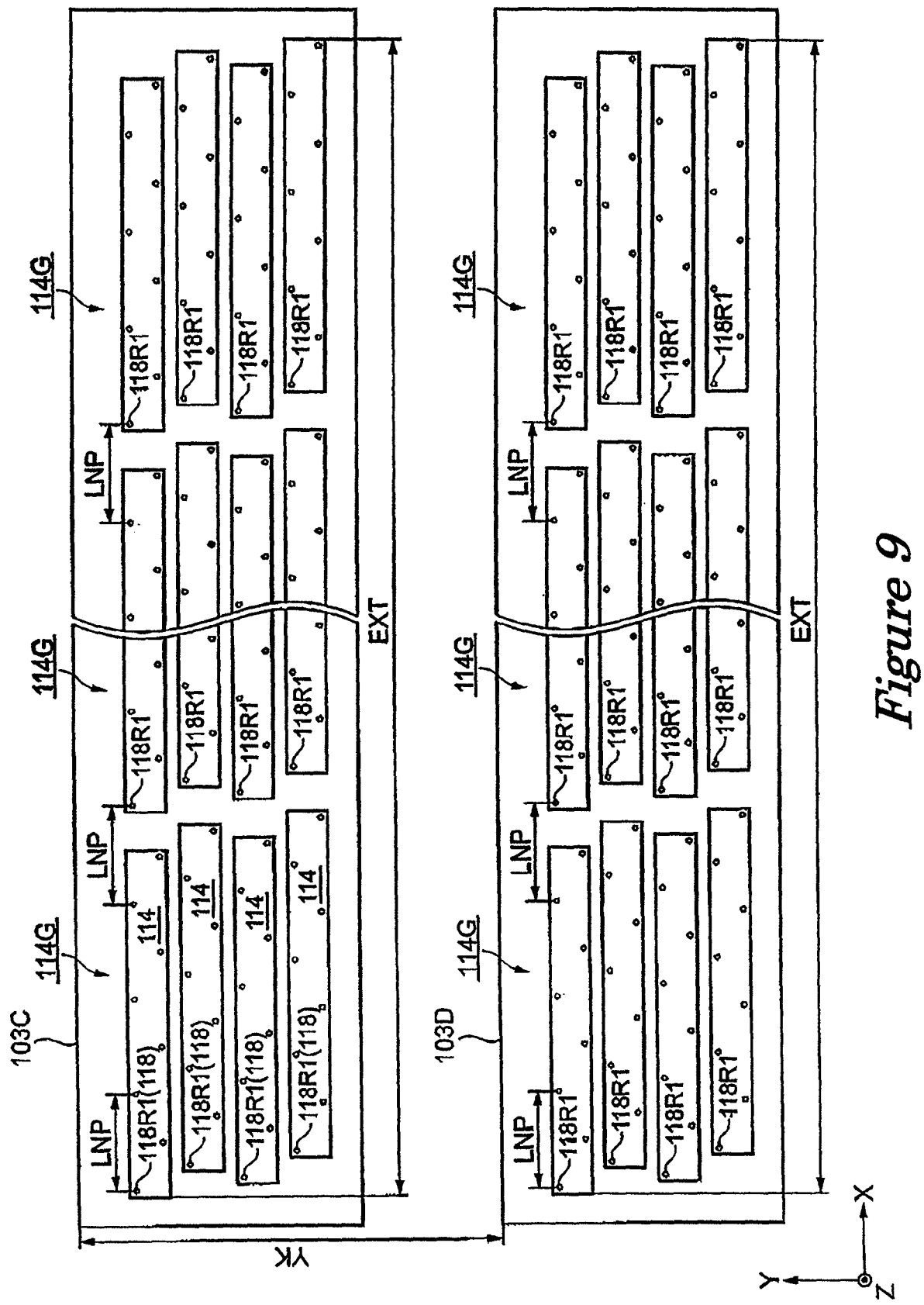
FIG. 9 is a schematic diagram of the two discharge head units in accordance with the second embodiment of the present invention.
Figure 10:
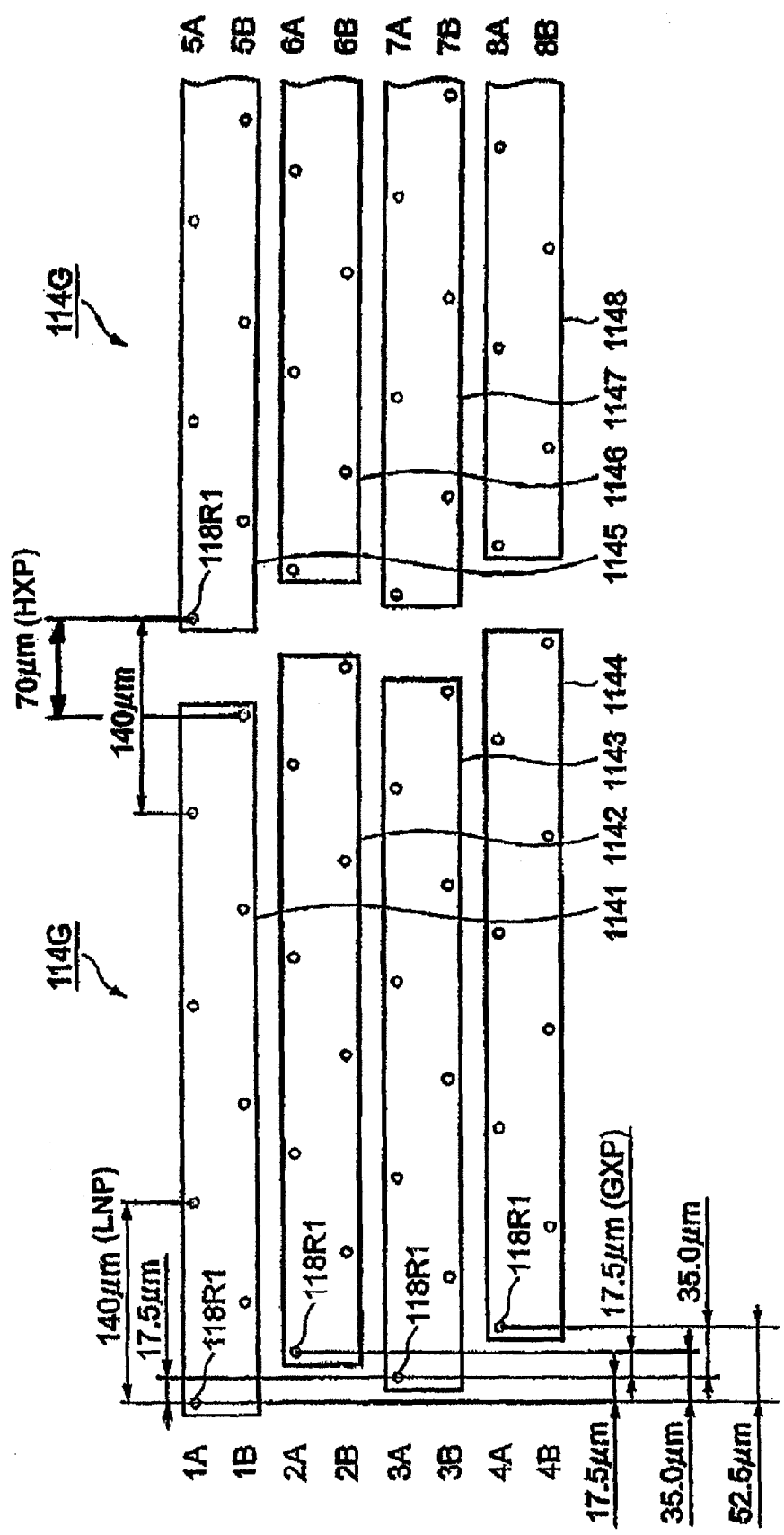
FIG. 10 is a schematic diagram showing the head groups in accordance with the second embodiment of the present invention.

Referring now to FIGS. 9-10 a discharge apparatus in accordance with a second embodiment will now be explained. The configuration of the discharge apparatus of the second embodiment of the present embodiment is the same as the configuration of the discharge apparatus 100 of the first embodiment, except that the arrangement pattern of the discharge nozzles 118T in the first discharge head unit 103C and the arrangement pattern of the discharge nozzles 118T in the second discharge head unit 103D differ from those of the first and second discharge head units 103A and 103B in the first embodiment. In view of the similarity between the first and second embodiments, the parts of the second embodiment that are identical to the parts of the first embodiment will be given the same reference numerals as the parts of the first embodiment.

The first discharge head unit 103C is separated from the second discharge head unit 103D by a predetermined distance YK in the Y-axis direction, as shown in FIGS. 9 and 10. In the case of FIG. 9, the Y coordinate value of the first discharge head unit 103C is greater than that of the second discharge head unit 103D. The predetermined distance YK is also same as the distance between the nozzle row having the greatest Y coordinate value in the first discharge head unit 103C and the nozzle row having the greatest Y coordinate value in the second discharge head unit 103D.

The relative positional relationship of the heads 114 in the first discharge head unit 103C is will now described.

The first discharge head unit 103C has a plurality of head groups 114G, as shown in FIG. 9. Each of the plurality of head groups 114G has a group of the heads 114 that are arranged in the Y-axis direction. The plurality of head groups 114G are aligned in the X-axis direction.

More specifically, each of the head groups 114G includes four heads 114 that are positioned next to each other in the Y-axis direction. As seen in FIG. 10, the four heads 114 are disposed in the head groups 114G so that the nozzle pitch GXP (17.5 μm in FIG. 10) in the X-axis direction of the head groups 114G is ¼ the length of the nozzle pitch HXP (70.0 μm in FIG. 10) in the X-axis direction of the heads 114. In this embodiment, the nozzle pitch GXP is the shortest distance between the first reference nozzles 118R1 of the heads 114 in one head group 114G. The nozzle pitch HXP in this embodiment is the distance between the first and second reference nozzles 118R1 and 118R2 of the immediately adjacent heads 114 in the same head row HL. More specifically, the first reference nozzles 118R1 of the four heads 114 are positioned on the X coordinate so as to be offset from one another in the X-axis direction without overlapping. The distance in the X-axis direction between the reference nozzles 118R1 of a single head 114 in the head groups 114G varies from ¼ to ¾ of the nozzle pitch HXP (or the nozzle pitch GXP to three times the nozzle pitch GXP).

In the present embodiment, the nozzle pitch HXP in the X-axis direction of the heads 114 is about 70 μm, so the nozzle pitch GXP in the X-axis direction of the head groups 114G is ¼ of the nozzle pitch HXP, which is about 17.5 μm. Here, "nozzle pitch GXP in the X-axis direction of the head groups 114G" corresponds to the pitch between X-axis positions that are obtained by projecting all of the nozzles 118 of the head group 114G onto the X-axis from the direction orthogonal to the X-axis direction.

Of course, the number of heads 114 contained in one head group 114G is not limited to just four. The head group 114G may be composed of any 2 or greater natural number of heads 114. Where the head group 114G includes N number of heads 114, the heads 114 should be disposed in the head groups 114G so that the nozzle pitch GXP between immediately adjacent nozzles 118 is 1/N the length of the nozzle pitch HXP. The distance in the X-axis direction between the reference nozzles 118R1 of a single head 114 in the head groups 114G varies from 1/N to (N−1)/N of the nozzle pitch HXP (or the nozzle pitch GXP to N−1 times the nozzle pitch GXP).

The relative positional relationship of the heads 114 of the present embodiment is described in detail below.

First, the four heads 114 contained in the leftmost head group 114G of the first discharge head unit 103C in FIGS. 9 and 10 are designated as head 1141, head 1142, head 1143, and head 1144, respectively from the top. In the same manner, the four heads 114 contained in the second head group 114G from the left in the first discharge head unit 103C of the FIGS. 9 and 10 are designated as head 1145, head 1146, head 1147, and head 1148, respectively from the top.

In FIG. 10, the nozzle rows 116A and 116B in the head 1141 are designated as nozzle rows 1A and 1B; the nozzle rows 116A and 116B in the head 1142 are designated as nozzle rows 2A and 2B; the nozzle rows 116A and 116B in the head 1143 are designated as nozzle rows 3A and 3B; and the nozzle rows 116A and 116B in the head 1144 are designated as nozzle rows 4A and 4B, as shown in FIG. 10. In the same manner, the nozzle rows 116A and 116B in the head 1145 are designated as nozzle rows 5A and 5B; the nozzle rows 116A and 116B in the head 1146 are designated as nozzle rows 6A and 6B; the nozzle rows 116A and 116B in the head 1147 are designated as nozzle rows 7A and 7B; and the nozzle rows 116A and 116B in the head 1148 are designated as nozzle rows 8A and 8B.

Each of these nozzle rows 1A to 8B includes 90 nozzles 118. These 90 nozzles are aligned in the X-axis direction in each of the nozzle rows 1A to 8B, as described above. However, only four discharge nozzles 118T (nozzles 118) out of the 90 nozzles are depicted in each of the nozzle rows 1A to 8B in FIG. 10 for the sake of simplification. In the FIGS. 9 and 10, the leftmost nozzle 118 of the nozzle row 1A is the first reference nozzle 118R1 of the head 1141, the leftmost nozzle 118 of the nozzle row 2A is the first reference nozzle 118R1 of the head 1142, the leftmost nozzle 118 of the nozzle row 3A is the first reference nozzle 118R1 of the head 1143, the leftmost nozzle 118 of the nozzle row 4A is the first reference nozzle 118R1 of the head 1144, and the leftmost nozzle 118 of the nozzle row 5A is the first reference nozzle 118R1 of the head 1145. It should be noted that the leftward direction in FIGS. 9 and 10 is the negative direction of the X-axis direction.

The absolute value of the difference between the X coordinate value of the first reference nozzle 118R1 of the head 1141 and the X coordinate value of the first reference nozzle 118R1 of the head 1142 is ¼ the length (35 μm in FIG. 10) of the nozzle pitch LNP (140 μm in FIG. 10), that is to say, ½ the length of the nozzle pitch HXP (70 μm in FIG. 10). In the example in FIGS. 9 and 10, the position of the first reference nozzle 118R1 of the head 1141 is offset in the negative direction (leftward direction in FIGS. 9 and 10) of the X-axis by ¼ the length of the nozzle pitch LNP with respect to the position of the first reference nozzle 118R1 of the head 1142. However, the direction in which the head 1141 is offset with respect to the head 1142 may be in the positive direction (rightward direction in FIGS. 9 and 10) of the X-axis.

The absolute value of the difference between the X coordinate value of the first reference nozzle 118R1 of the head 1143 and the X coordinate value of the first reference nozzle 118R1 of the head 1144 is ¼ the length of the nozzle pitch LNP, that is to say, ½ the length of the nozzle pitch HXP. In the example in FIGS. 9 and 10, the position of the first reference nozzle 118R1 of the head 1143 is offset in the negative direction (leftward direction in FIGS. 9 and 10) of the X-axis direction by ¼ the length of the nozzle pitch LNP with respect to the position of the first reference nozzle 118R1 of the head 1144. However, the direction in which the head 1143 is offset with respect to the head 1144 may be in the positive direction (rightward direction in FIGS. 9 and 10) of the X-axis.

The absolute value of the difference between the X coordinate value of the first reference nozzle 118R1 of the head 1142 and the X coordinate value of the first reference nozzle 118R1 of the head 1143 in FIG. 10 is ⅛ the length of the nozzle pitch LNP, that is to say, ¼ the length of the nozzle pitch HXP. In the example in FIGS. 9 and 10, the position of the first reference nozzle 118R1 of the head 1142 is offset in the positive direction (rightward direction in FIGS. 9 and 10) of the X-axis direction by ⅛ the length of the nozzle pitch LNP, in other words, 17.5 μm with respect to the position of the first reference nozzle 118R1 of the head 1143. However, the direction in which the head 1142 is offset with respect to the head 1143 may be the negative direction (leftward direction in FIGS. 9 and 10) of the X-axis direction.

Similarly, the absolute value of the difference between the X coordinate value of the first reference nozzle 118R1 of the head 1141 and the X coordinate value of the first reference nozzle 118R1 of the head 1144 in FIG. 10 is ⅜ the length of the nozzle pitch LNP, that is to say, ¾ the length of the nozzle pitch HXP.

In the present embodiment, the heads 1141, 1142, 1143, and 1144 are arranged in this order toward the negative direction (downward direction of FIG. 10) of the Y-axis. However, the order by which these four heads 114 are arranged in the Y-axis direction is not required to be this order. Specifically, the heads 1141, 1142, 1143, and 1144 can be arranged in any order in the Y-axis direction as long as the head 1141 and the head 1142 are positioned immediately next to each other, and the head 1143 and the head 1144 are positioned immediately next to each other.

In accordance with the above-described arrangement, the X coordinate value of the leftmost nozzle 118 of the nozzle row 2A, the X coordinate value of the leftmost nozzle 118 of the nozzle row 3A, and the X coordinate value of the leftmost nozzle 118 of the nozzle row 4A are accommodated between the X coordinate values of the leftmost nozzle 118 of the nozzle row 1A and the leftmost nozzle 118 of the nozzle row 1B. In the same manner, the X coordinate value of the leftmost nozzle 118 of the nozzle row 2B, the X coordinate value of the leftmost nozzle 118 of the nozzle row 3B, and the X coordinate value of the leftmost nozzle 118 of the nozzle row 4B are accommodated between the X coordinate values of the leftmost nozzle 118 of the nozzle row 1B and the second nozzle 118 from the left of the nozzle row 1A. In a similar fashion, the X coordinate value of the N-th nozzle 118 from the left of the nozzle row 2A (or 2B), the X coordinate value of the N-th nozzle 118 from the left of the nozzle row 3A (or 3B), and the X coordinate value of N-th nozzle 118 from the left of the nozzle row 4A (or 4B) are accommodated between the X coordinate values of the N-th nozzle 118 from the left nozzle 118 of the nozzle row 1A (or 1B) and the X coordinate value of the N-th nozzle 118 from the left of the nozzle row 1B (or the (N+1)-th nozzle 118 from the left of the nozzle row 1A). Here, the number N is any natural number greater than zero.

More specifically, in accordance with the above-described arrangement, the X coordinate value of the leftmost nozzle 118 of the nozzle row 1B substantially matches the X coordinate center between the leftmost nozzle 118 of the nozzle row 1A and the second nozzle 118 from the left of the nozzle row 1A. The X coordinate value of the leftmost nozzle 118 of the nozzle row 2A substantially matches the X coordinate center of the leftmost nozzle 118 of the nozzle row 1A and the leftmost nozzle 118 of the nozzle row 1B. The X coordinate value of the leftmost nozzle 118 of the nozzle row 2B substantially matches the X coordinate center of the second nozzle 118 from the left of the nozzle row 1A and the leftmost nozzle 118 of the nozzle row 1B. The X coordinate value of the leftmost nozzle 118 of the nozzle row 3A substantially matches the X coordinate center of the leftmost nozzle 118 of the nozzle row 1A and the leftmost nozzle 118 of the nozzle row 2A. The X coordinate value of the leftmost nozzle 118 of the nozzle row 3B substantially matches the X coordinate center of the leftmost nozzle 118 of the nozzle row 1B and the second nozzle 118 from the left of the nozzle row 2B. The X coordinate value of the leftmost nozzle 118 of the nozzle row 4A substantially matches the X coordinate center of the leftmost nozzle 118 of the nozzle row 1B and the leftmost nozzle 118 of the nozzle row 2A. The X coordinate value of the leftmost nozzle 118 of the nozzle row 4B substantially matches the X coordinate center of the second nozzle 118 from the left of the nozzle row 1A and the leftmost nozzle 118 of the nozzle row 2B.

The arrangement, or the configuration, of the heads 1145, 1146, 1147, and 1148 in the second head group 114G from the left as shown in FIGS. 9 and 10 is the same as that of the heads 1141, 1142, 1143, and 1144.

Next, the relative relational position between the two head groups 114G positioned next to each other in the X-axis direction is described based on the relative position relationship between the head 1145 and the head 1141.

The position of the first reference nozzle 118R1 of the head 1145 is offset from the position of the first reference nozzle 118R1 of the head 1141 in the positive direction of the X-axis direction by the length of the product of the nozzle pitch HXP in the X-axis direction of the head 114 times the number of discharge nozzles 118T in the head 114. In the present embodiment, the nozzle pitch HXP is about 70 μm, and the number of discharge nozzles 118T in a single head 114 is 160, so the position of the first reference nozzle 118R1 of the head 1145 is offset in the positive direction of the X-axis by 11.2 mm (70 μm×160) from the position of the first reference nozzle 118R1 of the head 1141. In FIGS. 9 and 10, however, the number of discharge nozzles 118T in the head 1141 is shown as eight for the sake of simplification, so the position of the first reference nozzle 118R1 of the head 1145 is depicted as being offset by eight times the nozzle pitch HXP (560 μm=70 μm×8) from the position of the first reference nozzle 118R1 of the head 1141.

The head 1141 and head 1145 are arranged as described above, so the rightmost discharge nozzle 118T of the nozzle row 1A and the leftmost discharge nozzle 118T of the nozzle row 5A are offset by the nozzle pitch LNP in the X-axis direction. The X-axis direction distance pitch between discharge nozzles 118T of both of the two head groups 114G is ¼ the nozzle pitch HXP.

The relative positional relationship between the four heads 1145-1148 disposed next to each other in the Y-axis direction in the first discharge head unit 103C is the same as the relative positional relationship between the above-described four heads 1141-1144. The relative positional relationship between other two head groups 114G that are disposed next to each other in the X-axis direction is also the same as that of the above-described two head groups 114G.

Based on the description above, the discharge nozzles 118T are distributed in the first range EXT so that the nozzle pitch between closest discharge nozzles in the X-axis direction is substantially ¼ the length of the nozzle pitch HXP, in other words, 17.5 μm in this embodiment. In the present embodiment, the "first range EXT" is the range shown in FIG. 9 along the X-axis direction, and is the range that is defined to be between the two discharge nozzles 118T positioned on the outermost ends in the first discharge head unit 103C. These two discharge nozzles 118T positioned on the outermost ends are included in the first range EXT.

The arrangement pattern of the heads 114 of the second discharge head unit 103D is the same as that of the heads 114 (heads 1141 to 1148 in FIG. 10) of the first discharge head unit 103C, as shown in FIG. 9. In other words, the arrangement pattern of the discharge nozzles 118T of the second discharge head unit 103D is the same as that of the discharge nozzles 118T of the first discharge head unit 103C.

Based on the description above, the discharge nozzles 118T are also distributed in the first range EXT in the second discharge head unit 103D so that the X-axis direction pitch between the discharge nozzles 118T of the second discharge head unit 103D is ¼ the nozzle pitch HXP. There are discharge nozzles 118T on the first discharge head unit 103C that are positioned on the same X coordinate point as those on the second discharge head unit 103D.

Application Step

The step for applying the liquid material 111 to the stripe-shaped target discharge area using the discharge apparatus of the second embodiment will now be described. In view of the similarity between the first and the second embodiments, parts of the discharge apparatus other than the discharge head units 103C and 103D will be given the same reference number as those of the first embodiment.

The stage 106 in the discharge apparatus 100 of the second embodiment of the present invention moves once in the Y-axis direction from a receiving area to a removal area in the step for applying (application step) the liquid material 111 to a single target discharge area on the substrate 10L.

When the stage 106 is positioned in the receiving area, the substrate 10L to which the liquid material is to be applied is placed on the stage 106 using a first robot fork. Here, the substrate is positioned with respect to the discharge apparatus 100 so that the lengthwise direction of the stripe-shaped target discharge area matches the X-axis direction. The substrate is positioned with respect to the discharge apparatus 100, and the stage 106 then begins to move in the Y-axis direction from the receiving area toward the removal area.

The first discharge head unit 103C passes through the target discharge area. The first discharge head unit 103C discharges first droplets of the liquid material 111 in the target discharge areas from each of the discharge nozzles 118T while the first discharge head unit 103C passes through the target discharge areas. As a result, droplets of the liquid material 111 are deposited in positions that are aligned at a ¼ the nozzle pitch HXP in the first range EXT. Each of the deposited droplets spreads out from their deposited positions.

After the first discharge head unit 103C passes through the target discharge area, the second discharge head unit 103D passes through the target discharge areas. The second discharge head unit 103D discharges second droplets of the liquid material 111 in the target discharge areas from each of the discharge nozzles 118T while the second discharge head unit 103D passes through the target discharge areas. As a result, second droplets of the liquid material 111 are deposited in each of a plurality of deposit positions in alignment with ¼ of the nozzle pitch HXP in the first range EXT. The plurality of deposit positions to which the second discharge head unit 103D deposited the second droplets is substantially the same as the plurality of deposit positions to which the first discharge head unit 103C deposited the first droplets. Each of the deposited droplets spreads out from their respective deposited positions. As a result, the entire target discharge areas are covered with the liquid material 111.

After the second discharge head unit 103D passes through the target discharge areas, the stage 106 reaches the removal area and stops. The substrate 10L that has passed through the application step is lifted from the stage 106 with the two forks of a second robot.

Third Embodiment

Figure 11:
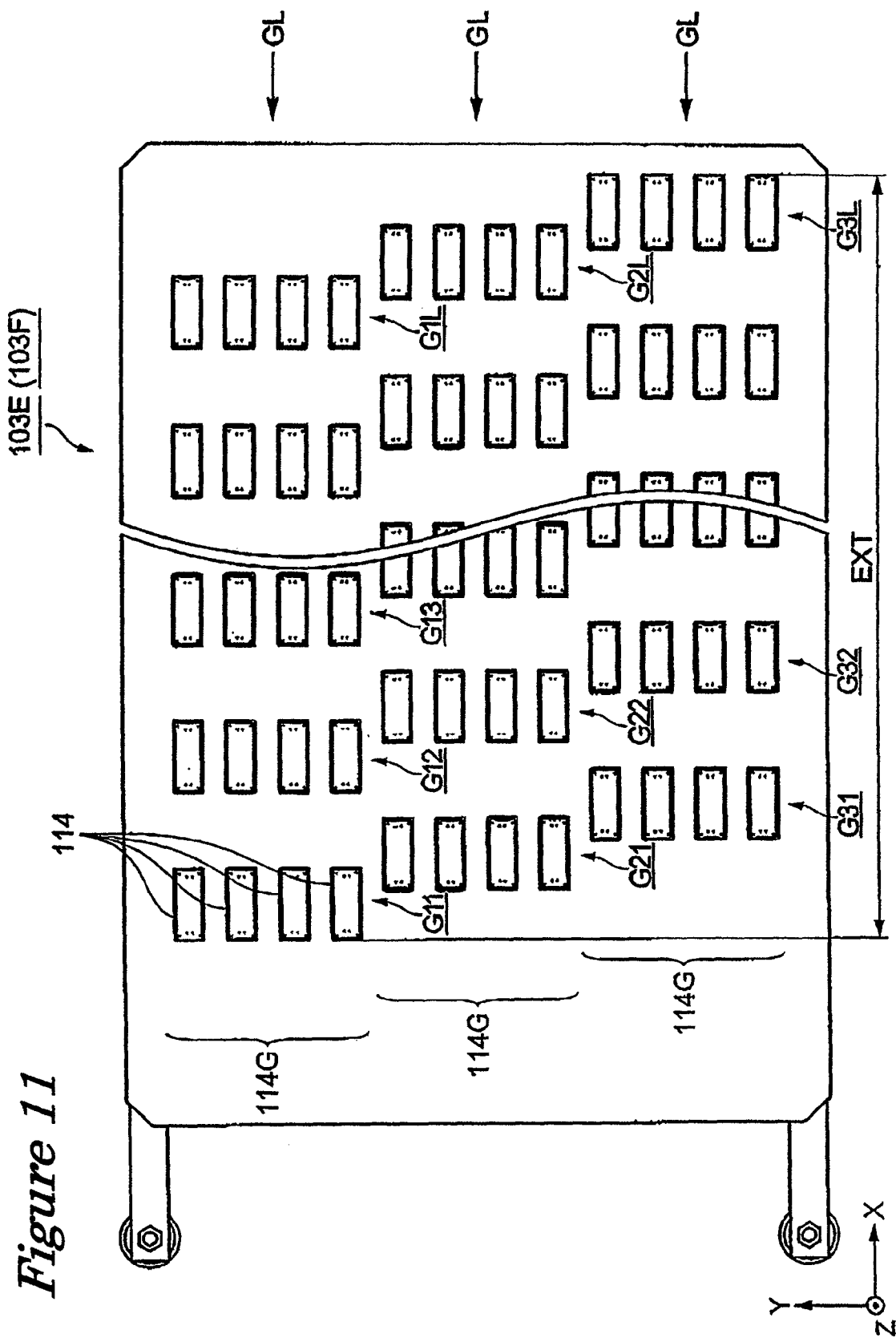
FIG. 11 is a schematic diagram showing one of the two discharge head units in accordance with the third embodiment of the present invention.
Figure 12:
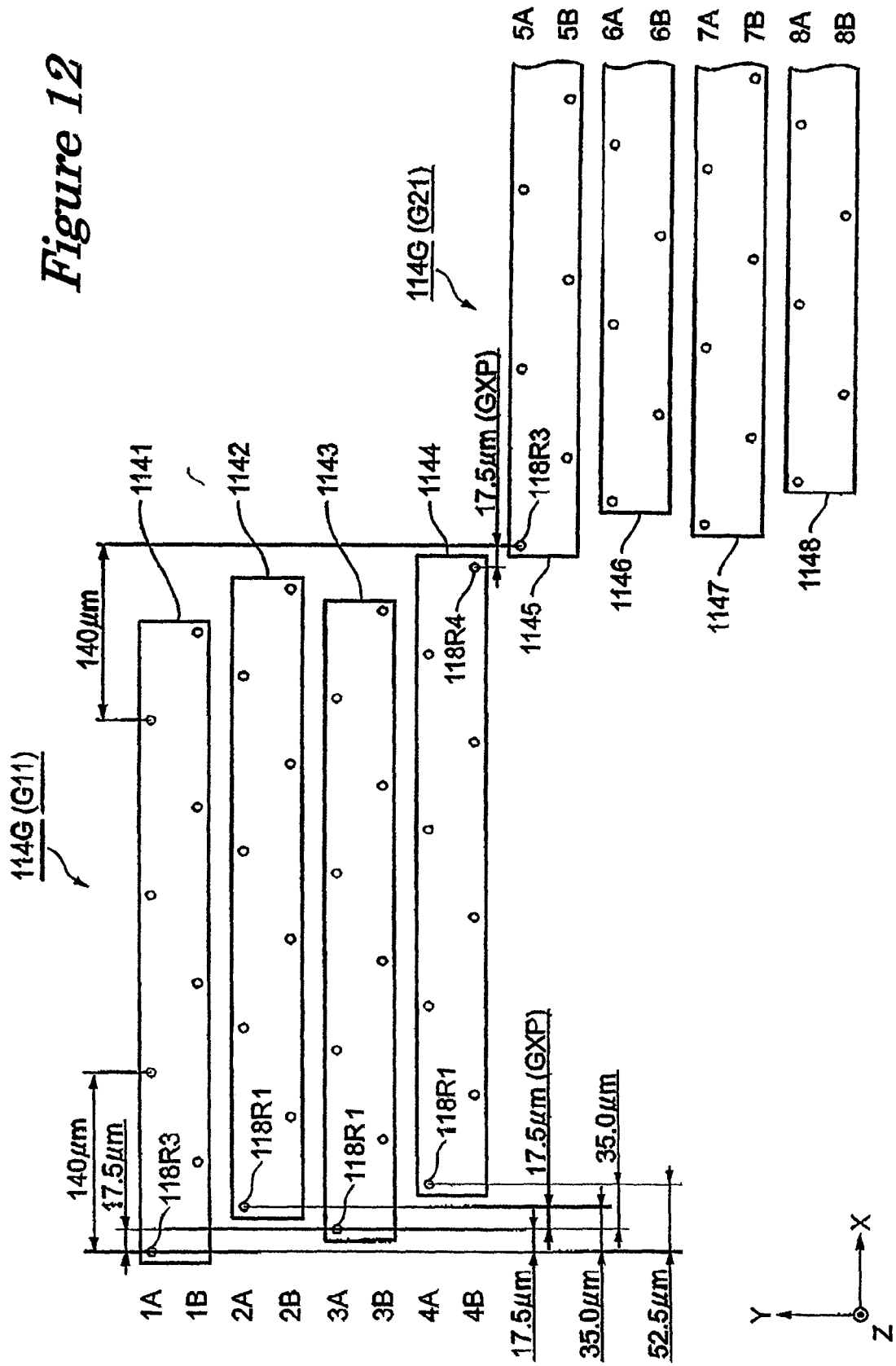
FIG. 12 is a schematic diagram showing the head groups in accordance with the third embodiment of the present invention.

Referring now to FIGS. 11-12, a discharge apparatus in accordance with a second embodiment will now be explained. The configuration of the discharge apparatus of the present embodiment is the same as that of the discharge apparatus of the second embodiment, except that the arrangement pattern of the discharge nozzles 118T in the first discharge head unit 103E and the second discharge head unit 103F differ from that of the first and second discharge head units 103C and 103D of the second embodiment. In view of the similarity between the first and second embodiments, the parts of the second embodiment that are identical to the parts of the first embodiment will be given the same reference numerals as the parts of the first embodiment.

In the second embodiment, the plurality of head groups 114G in the first discharge head unit 103C is arranged in the X-axis direction as a single row (FIGS. 9 and 10). In the third embodiment, each of the plurality of head groups 114G has a plurality of rows GL (three rows in the present embodiment as an example), each of which extends in the X-axis direction, as shown in FIGS. 11 and 12. The plurality of rows GL in one head group is arranged next to each other in the Y-axis direction.

The relative positional relationship of the four heads 114 in each of the head groups 114G of the third embodiment is the same as that described in the second embodiment. More specifically, the nozzle pitch GXP in the X-axis direction in each of the head groups 114G is substantially ¼ the length of the nozzle pitch HXP.

As shown in FIGS. 11 and 12, the first discharge head unit 103E has head groups 114G that are described in the second embodiment above and are arranged in a two-dimensional array. As a result, the X-axis direction distance between closest discharge heads through the entire first discharge head unit 103E is the nozzle pitch GXP, in other words, substantially ¼ the length of the nozzle pitch HXP.

The head groups 114G contained in the uppermost row GL of FIG. 11 will now be referred to as a head group $G_{11}$, a head group $G_{12}$, a head group $G_{13}$, and a head group $G_{1L}$, in the order from the left hand side to the right hand side of FIG. 11. The head groups 114G contained in the middle row GL of FIG. 11 will now be referred to as a head group $G_{21}$, a head group $G_{22}$, a head group $G_{23}$, and a head group $G_{2L}$ in the order from the left had side to the right hand side of FIG. 11. The head groups 114G contained in the lowermost row GL of FIG. 11 will now be referred to as a head group $G_{31}$, a head group $G_{32}$, a head group $G_{33}$, and a head group $G_{3L}$ in the order from the left hand side to the right hand side of FIG. 11. It should be noted that L is a natural number and represents the number of heads 114 contained in the row GL. Also, the left direction of FIGS. 11 and 12 is the negative direction of the X-axis.

The discharge nozzle 118T having the smallest X coordinate value in the head group 114G is designated as the third reference nozzle 118R3, while the discharge nozzle 118T having the greatest X coordinate value in the head group 114G is designated as the fourth reference nozzles 118R4. Also, the discharge nozzle 118T having the smallest X coordinate value in the head 114 is designated as the first reference nozzle 118R1. As seen in FIG. 12, the third reference nozzle 118R3 of the head group G11 is also the first reference nozzle of the head 1141.

The position of the third reference nozzle 118R3 in the head group $G_{21}$, which is at the left end of the middle row GL, is offset from the fourth reference nozzle 118R4 of the head group $G_{11}$, which is at the left end of the uppermost row GL, in the positive direction of the X-axis by the length (about 17.5 μm) of the nozzle pitch GXP, as shown in FIG. 12.

Similarly, the position of the third reference nozzle 118R3 of the head group $G_{31}$, which is at the left end of the lowermost row GL, is offset from the fourth reference nozzle 118R4 of the head group $G_{21}$, which is at the left end of the middle row GL, in the positive direction of the X-axis direction by the length (about 17.5 μm) of the nozzle pitch GXP. Since the positional relationship between the third reference nozzles 118R3 of the head group $G_{31}$ and the fourth reference nozzle 118R4 of the head group $G_{21}$ is identical to that of the third reference nozzle 118R3 of the head group $G_2$, and the fourth reference nozzle 118R4 of the head group $G_{11}$, illustration thereof is omitted herein.

The position of the third reference nozzle 118R3 of the head group $G_{12}$, which is the second head group from the left on the uppermost row GL, is offset from the fourth reference nozzle 118R4 of the head group $G_{31}$, which at the left end of the lowermost row GL, in the positive direction of the X-axis direction by the length (about 17.5 μm) of the nozzle pitch GXP.

The relative positional relationship between other head groups in the first discharge head unit 103E is the same as that of the head groups $G_{11}$, $G_{21}$, $G_{31}$, and $G_{12}$. Therefore, the pitch in the X-axis direction between the discharge nozzles 118T of the entire first discharge head unit 103E is the nozzle pitch GXP, in other words, substantially ¼ the length of the nozzle pitch HXP.

Based on the description above, the discharge nozzles 118T in the first range EXT are distributed so that the pitch in the X-axis direction between the discharge nozzles 118T is the nozzle pitch GXP. Here, the term "first range EXT" in the present embodiment is a range along the X-axis direction that is between the two discharge nozzles 118T positioned on the outermost ends in the first discharge head unit 103E. However, the two discharge nozzles 118T positioned on the outermost ends are also included in the first range EXT.

The second discharge head unit 103F has the same number of head groups 114G as in the first discharge head unit 103E. The relative positional relationship between the plurality of head groups 114G in the second discharge head unit 103F is the same as that of the head groups 114G in the first discharge head unit 103E. The arrangement pattern of the discharge nozzles 118T in the second discharge head unit 103F is the same as that of the discharge nozzles 118T of the first discharge head unit 103E.

Based on the description above, there are discharge nozzles 118T in the first discharge head unit 103E that have the same X coordinate values as those of the second discharge head unit 103F. Also, the discharge nozzles 118T in the first range EXT in the second discharge head unit 103F are also distributed so that the X-axis direction pitch between the discharge nozzles 118T is the nozzle pitch GXP.

Fourth Embodiment

Described below is an example in which the discharge apparatus in accordance with the present invention is applied to a manufacturing apparatus for a color filter substrate.

A substrate 10A shown in FIGS. 13(a) and (b) is processed with a manufacturing apparatus 1 (FIG. 14) described below, which manufactures a color filter substrate 10. The substrate 10A has a plurality of target discharge areas 18R, 18G, and 18B arranged in the form of a matrix.

Specifically, the substrate 10A has an optically transparent carrier substrate 12, a black matrix 14 formed on the carrier substrate 12, and a bank 16 formed on the black matrix 14. The black matrix 14 is formed with light-blocking material. The black matrix 14 and the bank 16 on the black matrix 14 are positioned so that a plurality of light transmitting portions in the form of a matrix, that is, a plurality of pixel areas in the form of a matrix, is defined on the carrier substrate 12.

The concave portions defined by the carrier substrate 12, the black matrix 14, and the bank 16 correspond to the target discharge areas 18R, target discharge areas 18G, and target discharge areas 18B in the corresponding pixel areas. The target discharge areas 18R are areas in which a filter layer 111FR is to be formed for exclusive emission of light in the red wavelength region, the target discharge areas 18G are areas in which a filter layer 111FG is to be formed for exclusive emission of light in the green wavelength region, and the target discharge areas 18B are areas in which a filter layer 111FB is to be formed for exclusive emission of light in the blue wavelength region.

The substrate 10A shown in FIG. 13(b) is positioned on a plane that is parallel both to the X-direction and to the Y-axis direction. The row and column directions of the matrix of FIG. 13(b) formed with the plurality of target discharge areas 18R, 18G, and 18B are each parallel to the X- and Y-axis directions. The target discharge areas 18R, target discharge areas 18G, and target discharge areas 18B in the substrate 10A are periodically aligned in the same order in the Y-axis direction. The target discharge areas 18R are aligned in a single row in the X-axis direction with predetermined fixed spaces therebetween, the target discharge areas 18G are aligned in a single row in the X-axis direction with predetermined fixed spaces therebetween, and the target discharge areas 18B are aligned in a single row in the X-axis direction with predetermined fixed spaces therebetween. The X- and Y-axis directions are mutually orthogonal.

The range in which the target discharge areas 18R, 18G, and 18B are distributed in the X-axis direction is accommodated in the first range EXT (FIG. 9).

The spacing LRY, or the pitch between the target discharge areas 18R along the Y-axis direction is about 560 μm. This spacing LRY is the same as the spacing LGY, which is the space between the target discharge areas 18G along the Y-axis direction, and also the spacing LBY, which is the space between the target discharge areas 18B along the Y-axis direction. The planar image of the target discharge areas 18R is a shape having mutually orthogonal major- and minor-axis directions. In the present invention, the planar image of one target discharge area 18R is substantially a rectangle defined by the long and short sides. Specifically, the Y-axis direction length of the target discharge area 18R is about 100 μm, and the X-axis direction length is about 300 μm. The target discharge area 18G and target discharge area 18B have the same shape and size as those of the target discharge area 18R. The above-described spacing between the target discharge areas and the above-described size of the target discharge areas are applicable to those of the pixel areas for the same colors in a high definition television with a screen size of about 40 inches.

Figure 13:
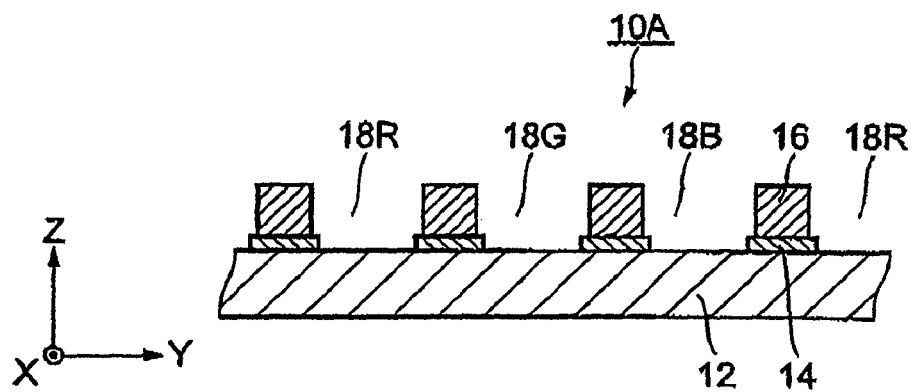
FIG. 13(a) is a schematic diagram showing a cross section of the substrate of in accordance with the fourth embodiment of the present invention.
FIG. 13(b) is a schematic diagram showing the upper surface of the substrate in accordance with the fourth embodiment of the present invention.
Figure 13:
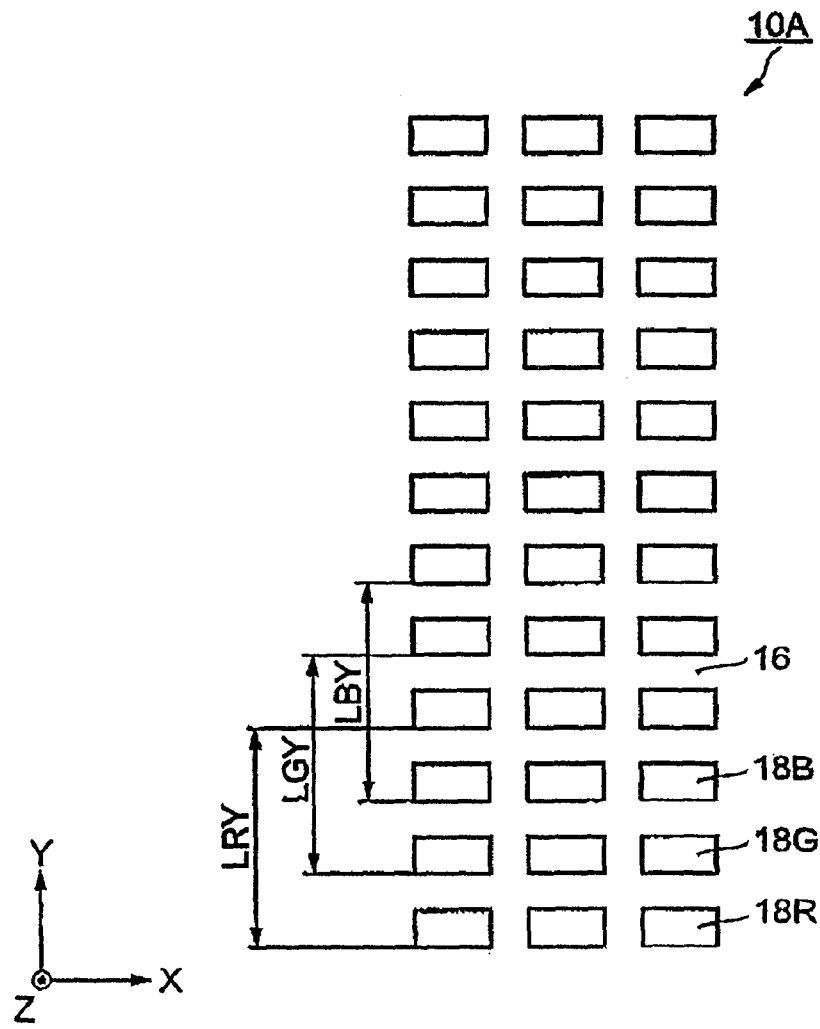
Figure 14:
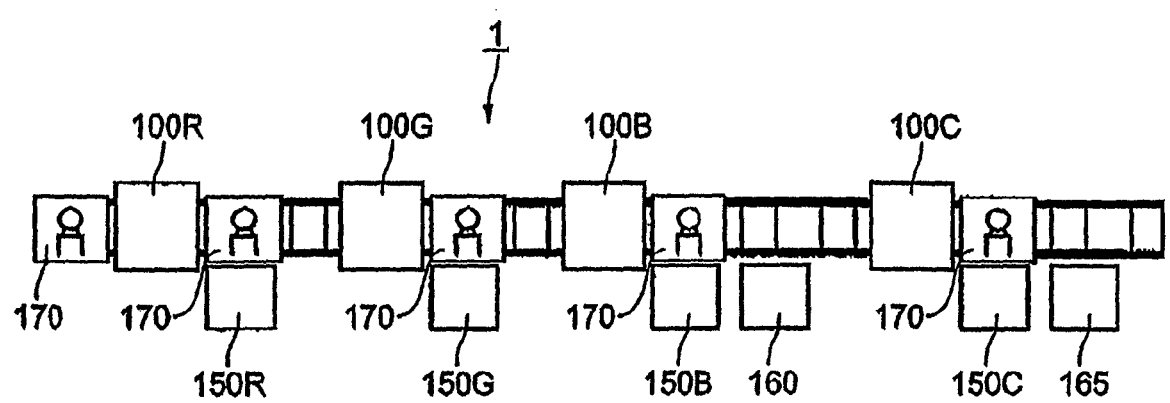
FIG. 14 is a schematic diagram showing the color filter manufacturing apparatus in accordance with the fourth embodiment of the present invention.

The manufacturing apparatus 1 shown in FIG. 14 is an apparatus for discharging corresponding color filter material to each of the target discharge areas 18R, 18G, and 18B of the substrate 10A in FIG. 13. Specifically, the manufacturing apparatus 1 has a discharge apparatus 100R for applying color filter material 111R to all the target discharge areas 18R; a drying apparatus 150R for drying the color filter material 111R on the target discharge areas 18R; a discharge apparatus 100G for applying color filter material 111G to all the target discharge areas 18G; a drying apparatus 150G for drying the color filter material 111G on the target discharge areas 18G; a discharge apparatus 100B for applying color filter material 111B to all the target discharge areas 18B; a drying apparatus 150B for drying the color filter material 111B on the target discharge areas 18B; an oven 160 for reheating (post-baking) the color filter materials 111R, 111G, and 111B; a discharge apparatus 100C for forming a protective film 20 on the layers of post-baked color filter materials 111R, 111G, and 111B; a drying apparatus 150C for drying the protective film 20; and a curing apparatus 165 for reheating the dried protective film 20. Furthermore, the manufacturing apparatus 1 also has a plurality of conveyance apparatuses 170 for sequentially conveying the substrate 10A through the discharge apparatus 100R, the drying apparatus 150R, the discharge apparatus 100G, the drying apparatus 150G, the discharge apparatus 100B, the drying apparatus 150B, the discharge apparatus 100C, the drying apparatus 150C, and the curing apparatus 165 in this order. Each of the plurality conveyance apparatuses 170 has a fork unit, a drive unit for vertically moving the fork unit, and a self-propelled unit.

Figure 15:
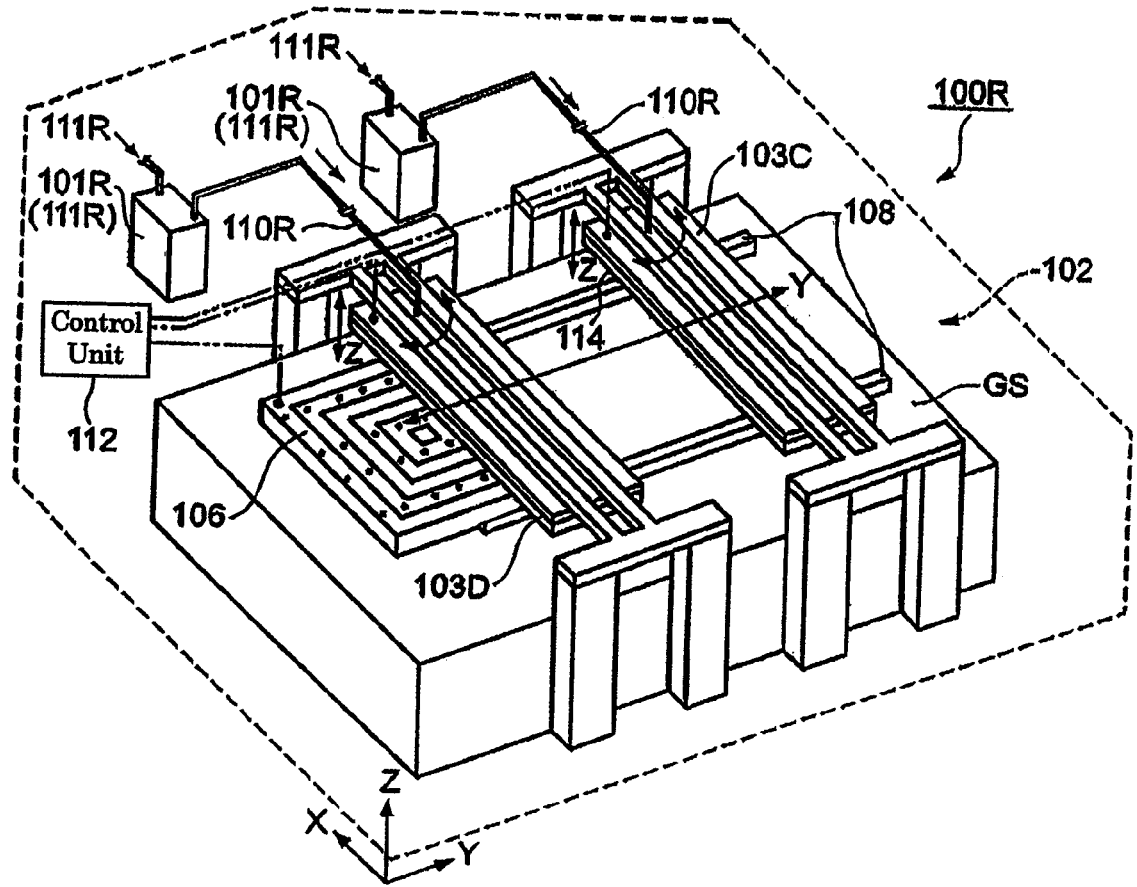
FIG. 15 is a schematic diagram showing the discharge apparatus in accordance with the fourth embodiment of the present invention.

The configuration of the discharge apparatus 100R shown in FIG. 15 is essentially the same as the configuration of the discharge apparatus 100 of the second embodiment. However, the configuration of the discharge apparatus 100R is different from the configuration of the discharge apparatus 100 of the second embodiment in that the discharge apparatus 100R is provided with two tanks 101R and two tubes 110R for the liquid color filter material 111R instead of the tanks 101A and 101B and the tubes 110A and 110B. Other elements of the discharge apparatus 100R will be referred to with the same reference symbols as those of the first or the second embodiment. Furthermore, redundant description will be omitted.

The configurations of the discharge apparatus 100G, the discharge apparatus 100B, and the discharge apparatus 100C are essentially the same as the configuration of the discharge apparatus 100R. However, the configuration of the discharge apparatus 100G is different from the configuration of the discharge apparatus 100R in that the discharge apparatus 100G is provided with a tank and a tube for the color filter material 111G instead of the tank 101R and the tube 110R as in the discharge apparatus 100R. In a similar fashion, the configuration of the discharge apparatus 100B is different from the configuration of the discharge apparatus 100R in that the discharge apparatus 100B is provided with a tank and a tube for the color filter material 111B instead of the tank 101R and tube 110R. Furthermore, the configuration of the discharge apparatus 100C is different from the configuration of the discharge apparatus 100R in that the discharge apparatus 100C is provided with a tank and a tube for the protective film material instead of the tank 101R and tube 110. It should be noted that the liquid color filter materials 111R, 111G, and 111B in the present embodiment are an example of the liquid materials of the present invention.

Next, the operation of the discharge apparatus 100R is described. The discharge apparatus 100R discharges the same material (that is, the color filter material 111R) to the plurality of target discharge areas 18R arranged in the form of a matrix on the substrate 10A. The substrate 10A may be a substrate for an electroluminescent display apparatus, a reverse side substrate for a plasma display apparatus, or a substrate for an image display apparatus provided with an electronic discharge device, as described in the fifth through seventh embodiments below.

Figure 16:
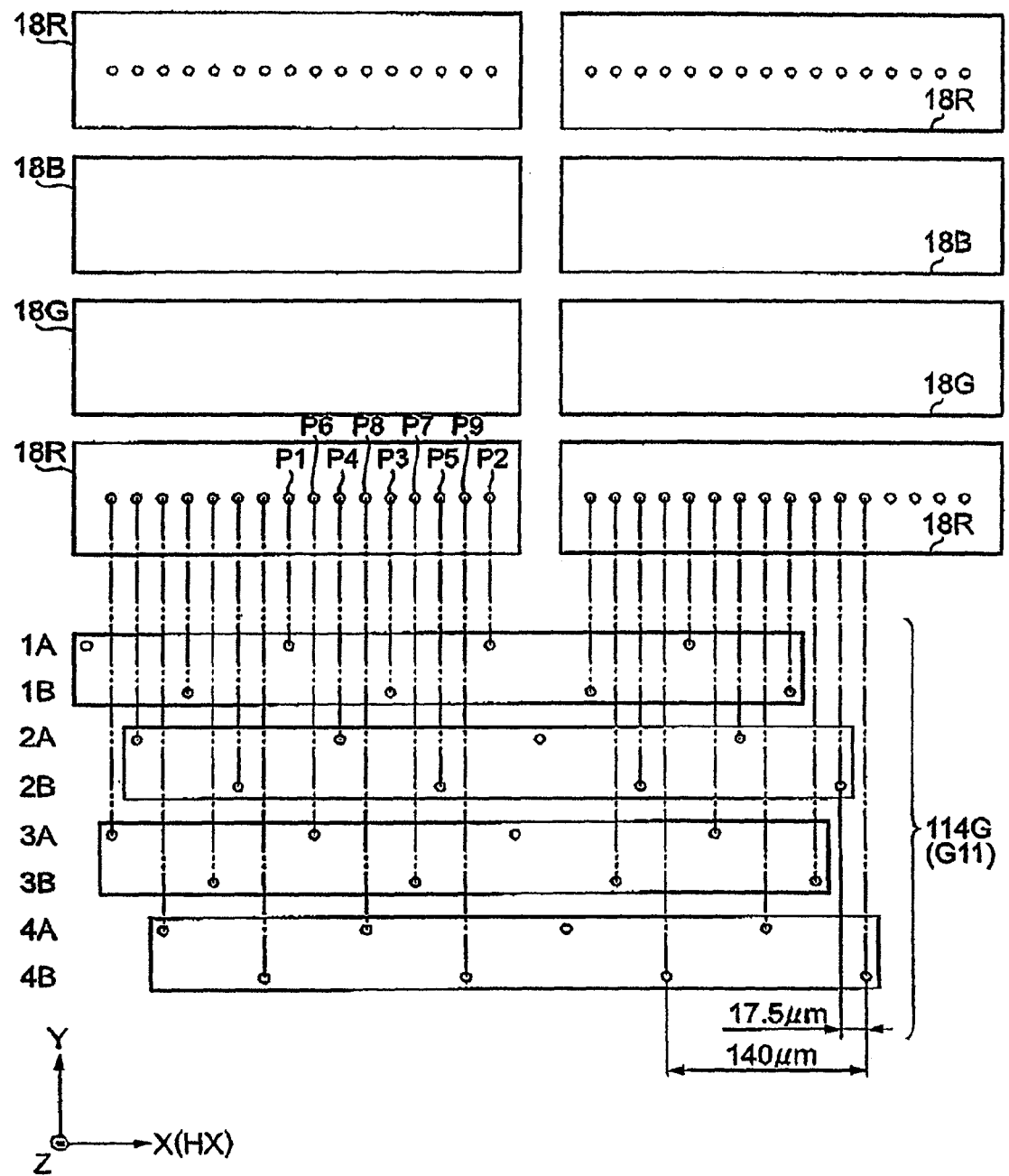
FIG. 16 is a schematic diagram showing the application step in accordance with the fourth embodiment of the present invention.

The substrate 10A of FIG. 16 is installed on the stage 106 so that the directions of the long and short sides of the target discharge area 18R match the X- and Y-axis directions, respectively.

First, the control unit 112 moves, based on the discharge data, the first discharge head unit 103C and the second discharge head unit 103D or the head groups 114G in a relative fashion in the X-axis direction with respect to the substrate 10A so that the X coordinate of some of the nozzles 118 are in a X-coordinate range of the target discharge area 18R. The X-coordinate range of the target discharge area 18R is a X coordinate range between both ends of the target discharge area 18R. In the present embodiment, the length of the long side of the target discharge area 18R is about 300 μm, and the nozzle pitch GXP in the X-axis direction of the head groups 114G is 17.5 μm. For this reason, 16 or 17 nozzles 118 in the head groups 114G enter the X coordinate range of a single target discharge area 18R. No color filter material 111R is discharged from the nozzles 118 outside of the X-coordinate range during the scan period.

Figure 33:
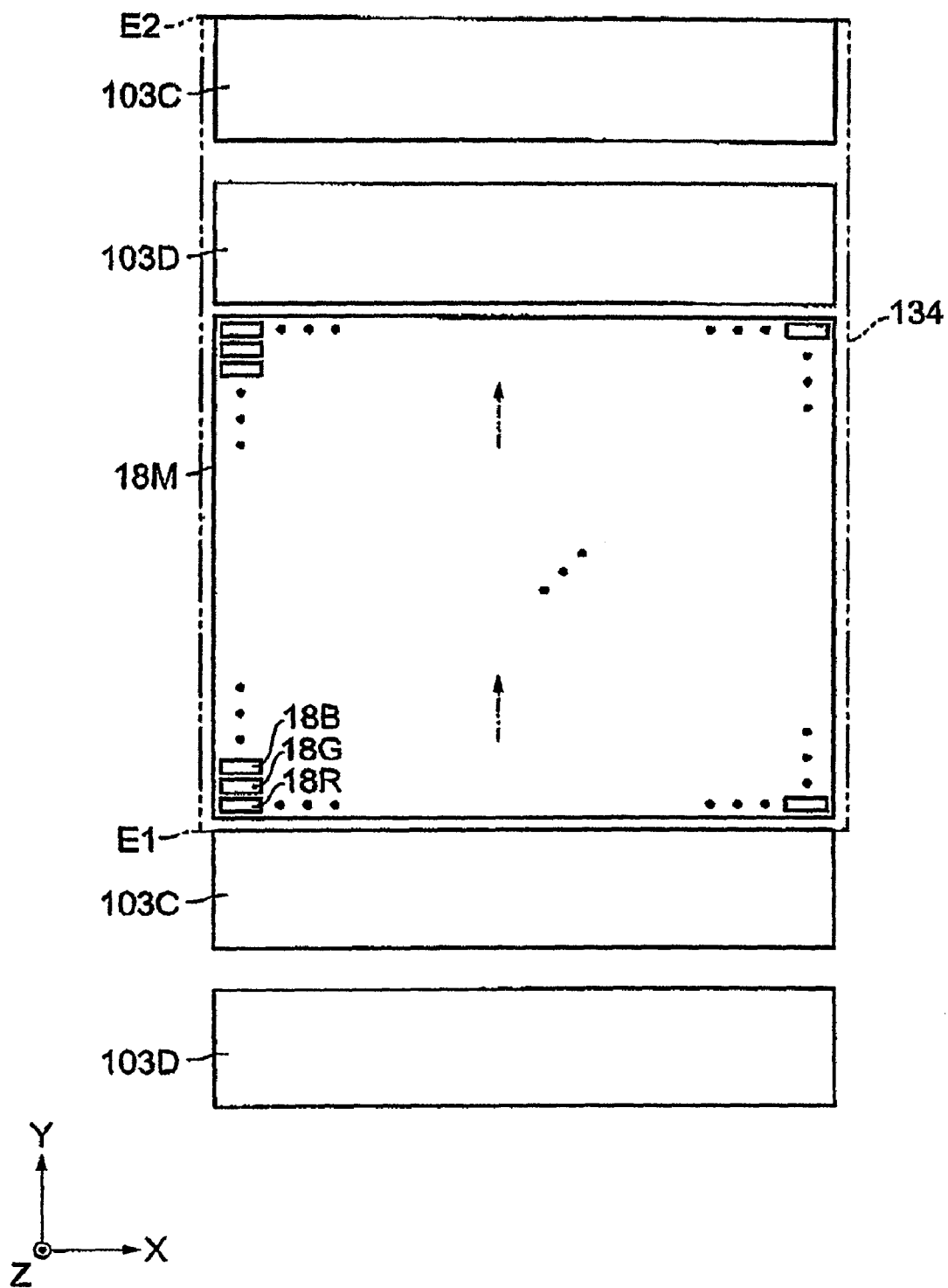
FIG. 33 is a schematic diagram showing the relationship between the target discharge area and the scanning range on the substrate.

The scan period in the present embodiment refers to a period of time in which one side of the first discharge head unit 103C moves once in a relative fashion with respect to the stage 106 from one end E1 (or the other end E2) of the scan range 134 along the Y-axis direction to the other end E2 (or the other end E1), as shown in FIG. 33. Material is applied to all of the target discharge areas 18R on the substrate 10A. A "scan range 134" refers to a range in which the combination of the first discharge head unit 103C and the second discharge head unit 103D moves relative to the stage 106, such that all of the target discharge areas 18R are covered by the scan range 134. In the present embodiment, the first discharge head unit 103C and second discharge head unit 103D move through the scan range 134 in a single scan period.

In some cases, the term "scan range" may refer to a range in which a single nozzle 118 (FIG. 2), a range in which a single nozzle row 116A (116B) (FIG. 2), or a range in which single head 114 (FIG. 2) moves relative to the stage 106.

Relative movement of the first discharge head unit 103C, the second discharge head unit 103D, the head groups 114G (FIG. 9), the heads 114 (FIG. 2), or the nozzles 118 (FIG. 2) refers to the situation in which the relative positions of these components vary with respect to the stage 106, the substrate 10A, or the target discharge area 18R. The first discharge head unit 103C, the second discharge head unit 103D, the head groups 114G (FIG. 9), the heads 114, or the nozzles 118 are therefore stationary with respect to the discharge apparatus 100R in the present embodiment, and the first discharge head unit 103C, the second discharge head unit 103D, the head groups 114G, heads 114, or the nozzles 118 can be referred to as moving relative to the stage 106, the substrate 10A, or the target discharge area 18R even when the stage 106 alone moves. Also, a combination of relative scanning or relative movement and material discharge is referred to as "application scanning."

Droplet Application Step

The control unit 112 determines the velocity of the relative movement of the first discharge head unit 103C and the second discharge head unit 103D with respect to the stage 106 so that a single nozzle 118 comes in alignment with a target discharge area 18R, which extends in the Y-axis direction, at every discharge cycle EP (FIG. 5(b)). The other nozzles 118 in the nozzle row containing the single nozzle 118 thereby overlap each of the target discharge areas 18R at every discharge cycle EP. In the present embodiment, the pitch of the target discharge area 18R in the Y-axis direction is LRY (FIG. 13(b)). Therefore, V=LRY/(k·EP), where V is the velocity of the relative movement of the first discharge head unit 103C (or the second discharge head unit 103D) with respect to the stage 106, and k is an integer. It should be noted that the discharge cycle EP is substantially constant, so the velocity V of relative movement is also substantially constant.

When the scan period begins, the stage 106 begins to move from one end E1 of the scan range 134 in a relative fashion in the positive direction of the Y-axis direction (upward direction of the paper surface of FIG. 16). When this occurs, the nozzle rows 1A, 1B, 2A, 2B, 3A, 3B, 4A, and 4B, which have been described with reference to FIG. 10, enter into the area corresponding to the target discharge area 18R in that order, as shown in FIG. 16. The X coordinate of the 114G does not vary during the scan period.

In the example shown in FIG. 16, the color filter material 111R is discharged through the second nozzle 118 from the left and the third nozzle 118 from the left in the nozzle row 1A when the nozzle row 1A enters the target discharge area 18R on the bottom left hand side in FIG. 16. The color filter material 111R is also discharged through the leftmost nozzle 118 and the second nozzle 118 from the left in the nozzle row 1B when the nozzle row 1B enters the target discharge area 18R on the bottom left hand side in FIG. 16.

When the nozzle row 2A thereafter enters the target discharge area 18R on the bottom left hand side in FIG. 16, the color filter material 111R is discharged through the leftmost nozzle 118 and the second nozzle 118 from the left in the nozzle row 2A. When the nozzle row 2B subsequently enters the target discharge area 18R on the bottom left hand side in FIG. 16, the color filter material 111R is discharged through the leftmost nozzle 118 and the second nozzle 118 from the left in the nozzle row 2B.

When the nozzle row 3A then enters the area corresponding to the target discharge area 18R on the bottom left hand side in FIG. 16, the color filter material 111R is discharged through the leftmost nozzle 118 and the second nozzle 118 from the left in the nozzle row 3A. When the nozzle row 3B subsequently enters the target discharge area 18R on the bottom left hand side in FIG. 16, the color filter material 111R is discharged through the leftmost nozzle 118 and the second nozzle 118 from the left in the nozzle row 3B.

When the nozzle row 4A then enters the target discharge area 18R on the bottom left hand side in FIG. 16, the color filter material 111R is discharged through the leftmost nozzle 118 and the second nozzle 118 from the left in the nozzle row 4A. When the nozzle row 4B subsequently enters the target discharge area 18R on the bottom left hand side in FIG. 16, the color filter material 111R is discharged through the leftmost nozzle 118 and the second nozzle 118 from the left in the nozzle row 4B.

In accordance with the present embodiment, the nozzle pitch GXP in the X-axis direction of the head groups 114G is about ¼ the nozzle pitch HXP in the X-axis direction of a single head 114, and many more nozzles 118 therefore overlap on a single target discharge area in a single scan period.

Among the aligned positions P1, P6, P4, P8, P3, P7, P5, P9, and P2 in the target discharge area 18R shown in FIG. 6, the order of the positions in which the color filter material 111R is deposited in the target discharge area 18R is: P1 and P2, P3, P4, P5, P6, P7, P8, and P9. It should be noted that droplets of the color filter material 111R are substantially simultaneously deposited at P1 and P2.

In other words, in accordance with the present embodiment, the droplets of the color filter material 111R are deposited at a midpoint of two positions that are already covered with droplets. The droplets thus deposited therefore make contact with the two previously deposited droplets if the two previously deposited droplets are close enough to each other. In this manner, the two previously deposited droplets and the newly deposited droplet are aligned such that the two previously deposited droplets are symmetrical with respect to the newly deposited droplet. Force is exerted on the newly-deposited droplet in two opposing directions. As a result, the newly-deposited droplets spread out in a symmetrical shape from its deposit position. For this reason, in accordance with the application step of the present embodiment, non-uniformity in the application of the color filter material 111R rarely occurs.

Conversely, the leftmost nozzle 118 in the nozzle row 1A, the second nozzle 118 from the right in the nozzle row 2A, the second nozzle 118 from the right in the nozzle row 3A, and the second nozzle 118 from the right in the nozzle row 4A do not overlap even once with the target discharge areas 18R, as shown in FIG. 16. Therefore, the color filter material 111R is not discharged at all from these nozzles.

Color Filter Substrate Manufacturing Steps

Described above is the step for applying color filter material 111R to the target discharge area 18R. Described below is a series of steps that allows a color filter substrate 10 to be obtained with the manufacturing apparatus 1.

First, the substrate 10A of FIG. 13 is fabricated following the procedure given below. A metal film is first formed on the carrier substrate 12 by vapor deposition. A black matrix 14 in the form of a lattice is then formed from the metal film by photolithography. Examples of the material for the black matrix 14 include metal chromium and chromium oxide. The carrier substrate 12 should be an optically transparent substrate with respect to visible light. Examples of such substrate include a glass substrate. A resist layer composed of a negative photosensitive resin composition is applied over the carrier substrate 12 and the black matrix 14. The resist layer is then exposed to light while closely attaching to the resist layer a mask film, which is formed into a matrix pattern. A bank 16 is obtained by etching away the portion of the resist layer unexposed to light. The substrate 10A is obtained in this manner.

A bank composed of resin black may be used instead of the bank 16. In this case, a metal film (black matrix 14) is not required, and the bank layer is composed of a single layer.

The substrate 10A is subsequently rendered lyophilic by an oxygen plasma treatment under atmospheric pressure. This treatment provides lyophilicity to the surfaces of the concave portions (portion of the pixel area) that are defined by the carrier substrate 12, the black matrix 14, and the bank 16. In other words, the surfaces of the carrier substrate 12, the black matrix 14, and the surfaces of the bank 16 are subjected to the oxygen plasma treatment. The substrate 10A is thereafter subjected to a plasma treatment using tetrafluoromethane as treatment gas. The plasma treatment with tetrafluoromethane brings about fluorination (treatment to achieve fluid repellency) of the surfaces of the bank 16 in the concave portions, and the surfaces of the bank 16 are thereby rendered repellent to fluids. Due to the plasma treatment with tetrafluoromethane, the lyophilicity is slightly lost from the surface of the carrier substrate 12 and the surface of the black matrix 14, which have been previously rendered lyophilic. However, these surfaces still remain overall lyophilic after the plasma treatment. In this manner, the surfaces of the concave portions are converted to the target discharge areas 18R, 18G, and 18B by subjecting the surfaces of the concave portions defined by the carrier substrate 12, the black matrix 14, and the bank 16 to a predetermined surface treatment.

Depending on the material of the carrier substrate 12, the material of the black matrix 14, and the material of the bank 16, a surface with a desired lyophilicity and fluid repellency can be obtained without a surface treatment such as the one described above. In such cases, the surfaces of the concave portions defined by the carrier substrate 12, the black matrix 14, and the bank 16 form the target discharge areas 18R, 18G, and 18B without the above-described surface treatment.

Figure 17:
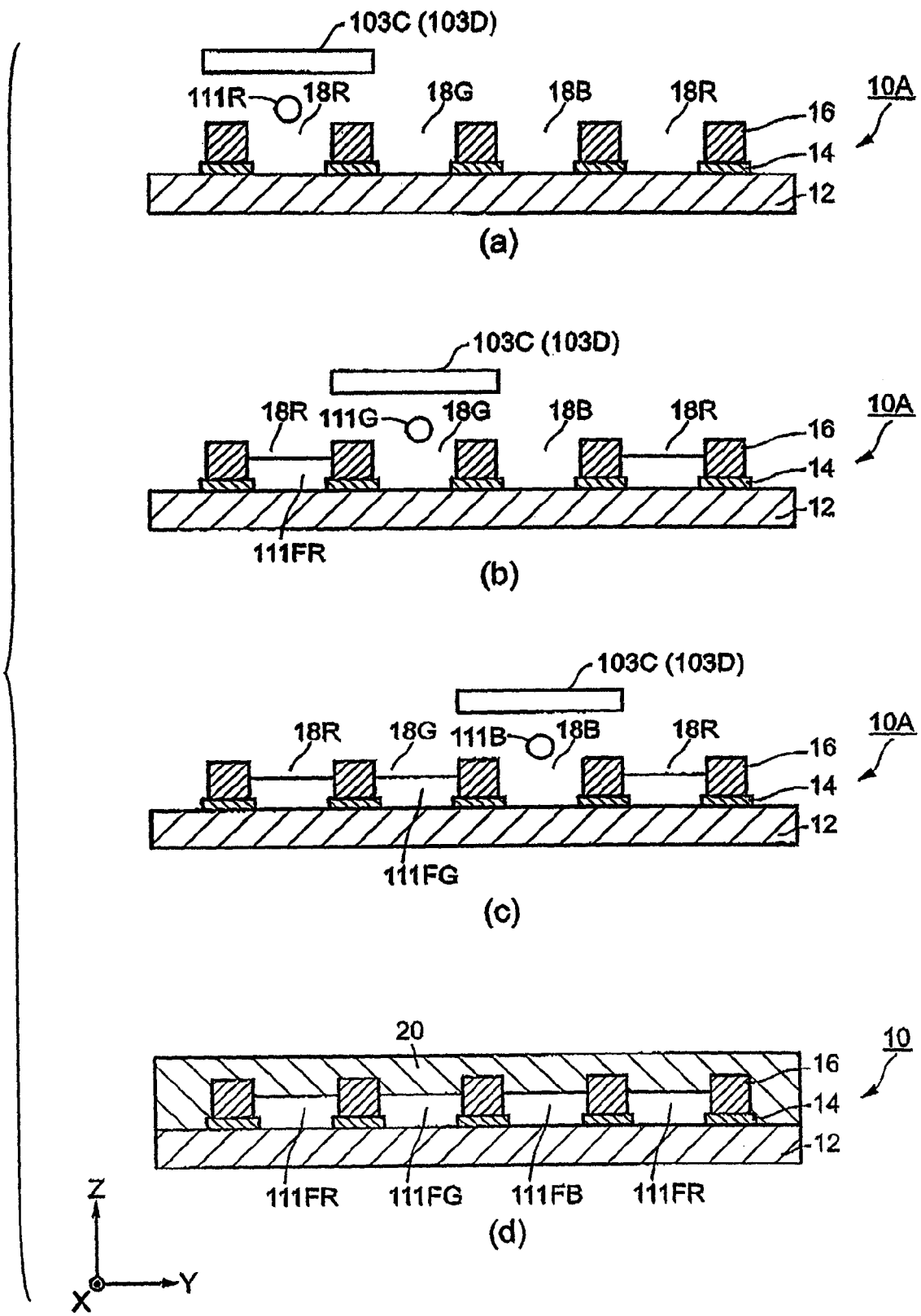
FIG. 17 is a schematic diagram showing the production method for the color filter substrate in accordance with the fourth embodiment of the present invention.

The substrate 10A on which the target discharge areas 18R, 18G, and 18B are formed is carried onto the stage 106 of the discharge apparatus 100R using the conveyance apparatus 170. The discharge apparatus 100R discharges the color filter material 111R from the heads 114 (FIG. 9) so that a layer of liquid material 111R is formed over all the target discharge areas 18R, as shown in FIG. 17(a).

Specifically, the first discharge head unit 103C is initially positioned in the area corresponding to a certain target discharge area 18R. The discharge apparatus 100R then discharges the first droplets of the color filter material 111R from the discharge nozzles 118T of the first discharge head unit 103C toward the target discharge area 18R. Subsequent to the first discharge head unit 103C, the second discharge head unit 103D is positioned in the area corresponding to the target discharge area 18R. Second droplets of the color filter material 111R are then discharged from the second discharge head unit 103D toward the target discharge area 18R.

In the present embodiment, the desired amount of liquid color filter material 111R is applied to all the target discharge areas 18R during the interval in which the stage 106 makes a single movement relative to the first and second discharge head units 103C and 103D in the Y-axis direction. This is because all the target discharge areas 18R are distributed within the first range EXT.

Since the discharge nozzles 118T of the first discharge head unit 103C and the discharge nozzles 118T of the second discharge head unit 103D are positioned at the same positions within the target discharge area 18R during a single scan period, the volume of the color filter material 111R to be applied to the target discharge area 18R during a single scan period can be increased even if the volume of each droplet of color filter material 111R deposited from a single discharge nozzle 118T at a time is small.

When the layers of color filter material 111R are formed over all the target discharge areas 18R of the substrate 10A, the conveyance apparatus 170 positions the substrate 10A in the drying apparatus 150R. The color filter material 111R on the target discharge area 18R is completely dried to form filter layers 111FR on the target discharge areas 18R.

Next, the conveyance apparatus 170 positions the substrate 10A on the stage 106 of the discharge apparatus 100G. The discharge apparatus 100G discharges color filter material 111G from the heads 114 (FIG. 9) so that a layer of color filter material 111G is formed over all the target discharge areas 18G, as shown in FIG. 17(b).

Specifically, the first discharge head unit 103C of the discharge apparatus 100G is initially positioned in the area corresponding to a certain target discharge area 18G. The discharge apparatus 100G then discharges the first droplets of the color filter material 111G from the discharge nozzles 118T of the first discharge head unit 103C toward the target discharge areas 18G. Subsequent to the first discharge head unit 103C, the second discharge head unit 103D is positioned in the area corresponding to the target discharge area 18G.

Second droplets of the color filter material 111G are then discharged from the second discharge head unit 103D toward the target discharge area 18G.

When layer of color filter material 111G are formed over all the target discharge areas 18G of the substrate 10A, the conveyance apparatus 170 positions the substrate 10A in the drying apparatus 150G. The color filter material 111G on the target discharge area 18G is completely dried to form filter layers 111FG on the target discharge areas 18G.

Next, the conveyance apparatus 170 positions the substrate 10A on the stage 106 of the discharge apparatus 100B. The discharge apparatus 100B discharges color filter material 111B from the heads 114 (FIG. 9) so that a layer of color filter material 111B is formed over all the target discharge areas 18B, as shown in FIG. 17(c).

Specifically, the first discharge head unit 103C is initially positioned in the area corresponding to a certain target discharge area 18B. The discharge apparatus 100B then discharges the first droplets of the color filter material 111B from the discharge nozzles 118T of the first discharge head unit 103C toward the target discharge area 18B. Subsequent to the first discharge head unit 103C, the second discharge head unit 103D is positioned in the area corresponding to the target discharge area 18B. Second droplets of the color filter material 111B are then discharged from the second discharge head unit 103D toward the target discharge area 18B.

When layers of color filter material 111B are formed over all the target discharge areas 18B of the substrate 10A, the conveyance apparatus 170 positions the substrate 10A in the drying apparatus 150B. The color filter material 111B on the target discharge area 18B is completely dried to form filter layers 111FB on the target discharge areas 18B.

The conveyance apparatus 170 subsequently positions the substrate 10A inside the oven 160. The oven 160 then reheats (post-baking) the filter layers 111FR, 111FG, and 111FB.

Next, the conveyance apparatus 170 positions the substrate 10A on the stage 106 of the discharge apparatus 100C. The discharge apparatus 100C discharges a liquid protective film material so that a protective film 20 covers the bank 16 and the filter layers 111FR, 111FG, and 111FB. Once the protective film 20 is formed on the bank 16 and the filter layers 111 FR, 111FG, and 111FB, the conveyance apparatus 170 positions the substrate 10A inside the drying apparatus 150C. The protective film 20 is completely dried by the drying apparatus 150C, and the protective film 20 is thereafter completely cured by the curing apparatus 165. This way, a color filter substrate 10 is formed from the substrate 10A.

Modification of the Fourth Embodiment

The manufacturing apparatus 1 shown in FIG. 14 may additionally have an inspection apparatus and a repairing discharge apparatus. More specifically, the manufacturing apparatus 1 may be configured so that the substrate 10A is subjected to the steps performed by the inspection apparatus and the repairing discharged apparatus in this order during the interval between the completion of the step performed by the drying apparatus 150B and the start of the step performed by the discharge apparatus 100C, for example. Here, the inspection apparatus is an apparatus for inspecting whether the color filter materials 111R, 111G, and 111B have been suitably applied to all of the target discharge areas 18R, 18G, and 18B. Also, the repairing discharge apparatus is an apparatus that once again discharges the corresponding color filter material to the target discharge areas 18R, 18G, and 18B that have not been appropriately coated with the corresponding color filter material. The yield of the color filter substrate can be improved when the manufacturing apparatus 1 has the inspection apparatus and the repairing discharged apparatus.

The step performed by the inspection apparatus and the step performed by the repairing discharge apparatus are more preferably carried out before the post-baking in the oven 160. However, it is possible to insert the steps performed by the inspection apparatus and the repairing discharge apparatus anywhere so long as these steps are performed before the protective film 20 is applied by the discharge apparatus 100C. The steps performed by the inspection apparatus and the repairing discharge apparatus may be performed immediately after the step performed by the discharge apparatus 100R, the step performed by the discharge apparatus 100G, and also immediately after the step performed by the discharge apparatus 100B.

Fifth Embodiment

Described below is an example in which the discharge apparatus of the present invention is applied to a manufacturing apparatus for a color filter substrate.

A substrate 30A shown in FIGS. 18(a) and (b) will be processed by a manufacturing apparatus 2 (FIG. 9) described below, which manufactures a substrate for an electroluminescent display apparatus 30 (organic EL display apparatus, for example). The substrate 30A has a plurality of target discharge areas 38R, 38G, and 38B disposed in the form of a matrix.

Specifically, the substrate 30A has a carrier substrate 32, a circuit element layer 34 formed on the carrier substrate 32, a plurality of pixel electrodes 36 formed on the circuit element layer 34, and a bank 40 formed between the plurality of pixel electrodes 36. The carrier substrate 32 is a substrate that is optically transparent with respect to visible light. Examples of such carrier substrate include a glass substrate. Each of the plurality of pixel electrodes 36 is an electrode that is optically transparent with respect to visible light. Examples of such electrode include an ITO (Indium-Tin Oxide) electrode. Also, the plurality of pixel electrodes 36 is arranged in the form of a matrix, and each of such pixel electrodes 36 defines a pixel area. The bank 40 has the form of a lattice that surrounds each of the plurality of pixel electrodes 36. Also, the bank 40 is composed of an inorganic bank 40A formed on the circuit element layer 34 and an organic bank 40B positioned over the inorganic bank 40A.

The circuit element layer 34 is a layer having a plurality of scanning electrodes extending in a predetermined direction on the carrier substrate 32, an insulating film 42 formed so as to cover the plurality of scanning electrodes, a plurality of signal electrodes positioned on the insulating film 42 and extending in the direction orthogonal to the direction in which the plurality of scanning electrodes extend, a plurality of switching elements 44 positioned near the intersection of the scanning electrode and the signal electrodes, and a interlayer insulating film 45 such as polyimide formed so as to cover the plurality of switching elements 44. Each of the switching elements 44 has a gate electrode 44G and a source electrode 44S that are electrically connected to the corresponding scanning electrodes and signal electrodes. The plurality of pixel electrodes 36 is positioned over the interlayer insulating film 45. Through holes 44V are provided in the interlayer insulating film 45 at positions corresponding to the drain electrodes 44D of the switching elements 44, such that an electrical connection is formed between the switching elements 44 and the corresponding pixel electrodes 36 by way of the through holes 44V. Also, each of the switching elements 44 is disposed in a position corresponding to the bank 40. In other words, each of the plurality of switching elements 44 is positioned so as to cover the bank 40, as viewed from the vertical direction of the paper surface of FIG. 13(*b*).

The concave portions (portions of the pixel area) defined by the bank 40 and the pixel electrodes 36 of the substrate 30A correspond to the target discharge area 38R, the target discharge area 38G, and the target discharge area 38B. The target discharge area 38R is an area in which a luminescent layer 211FR is to be formed for exclusive emission of light in the red wavelength region, the target discharge area 38G is an area in which a luminescent layer 211FG is to be formed for exclusive emission of light in the green wavelength region, and the target discharge area 38B is an area in which a luminescent layer 211 GB is to be formed for exclusive emission of light in the blue wavelength region.

Figure 18:
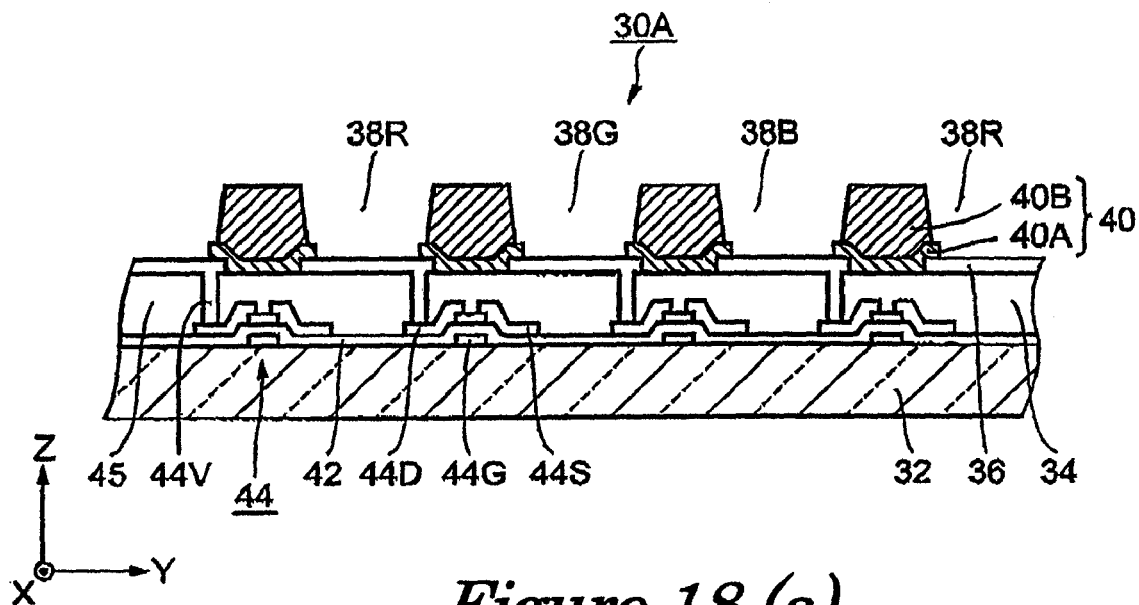
FIG. 18(a) is a schematic diagram showing a cross section of the substrate in accordance with the fifth embodiment of the present invention.
FIG. 18(b) is a schematic diagram showing the plane of the substrate in accordance with the fifth embodiment of the present.
Figure 18:
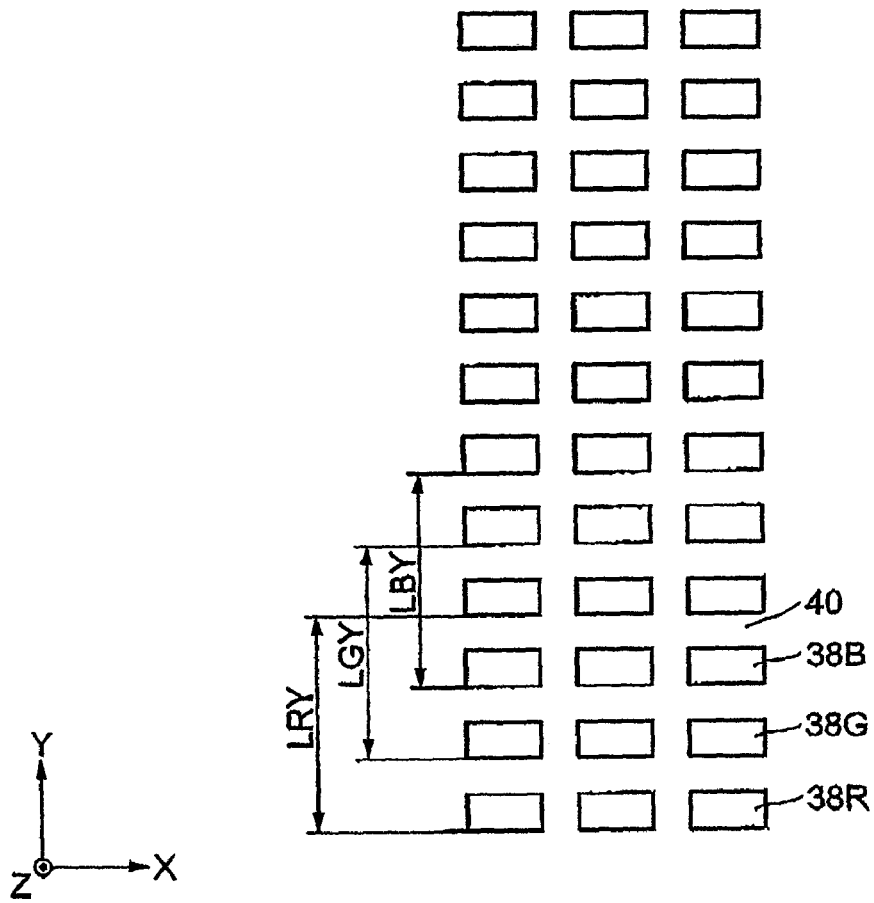

The substrate 30A shown in FIG. 18(*b*) is positioned on a plane that is parallel both in the X-direction and in the Y-axis direction. The row and column directions of the matrix formed by the plurality of target discharge areas 38R, 38G, and 38B are each parallel to the X- and Y-axis directions. The target discharge area 38R, the target discharge area 38G, and the target discharge area 38B in the substrate 30A are periodically aligned in the same order in the Y-axis direction. The target discharge areas 38R are aligned in a single row in the X-axis direction with predetermined fixed spaces therebetween, while the target discharge areas 38G are aligned in a single row in the X-axis direction with predetermined fixed spaces therebetween, and the target discharge areas 38B are aligned in a single row in the X-axis direction with predetermined fixed spaces therebetween. The X- and Y-axis directions are mutually orthogonal.

The range in which the target discharge areas 38R, 38G, and 38B are distributed in the X-axis direction is accommodated within the first range EXT (FIG. 9).

The spacing LRY, or the pitch of the target discharge area 38R, is about 560 μm along the Y-axis direction of the target discharge areas 38R. This spacing is the same as the spacing LGY along the Y-axis direction of the target discharge areas 38G, and the spacing LBY along the Y-axis direction of the target discharge areas 38B. The planar shape of one target discharge area 38R is a rectangle defined by long and short sides. Specifically, the Y-axis direction length of the target discharge area 38R is about 100 μm, and the X-axis direction length is about 300 μm. The target discharge area 38G and the target discharge area 38B have the same shape and size as the target discharge area 38R. The above-described spacing between the target discharge areas and the above-described size of the target discharge areas are applicable to those of the pixel areas of the same colors in a high definition television with a screen size of about 40 inches.

Figure 19:
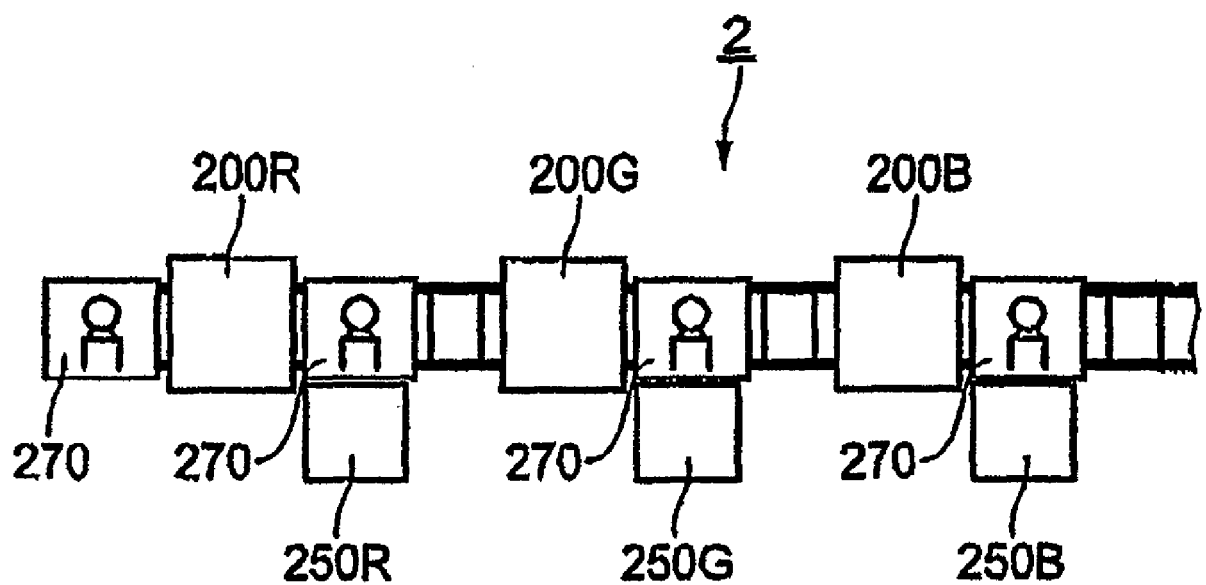
FIG. 19 is a schematic diagram showing the electroluminescent display apparatus in accordance with the fifth embodiment of the present invention.

The manufacturing apparatus 2 shown in FIG. 19 is an apparatus for discharging corresponding luminescent materials to the corresponding target discharge areas 38R, 38G, and 38B of the substrate 30A in FIG. 18. The manufacturing apparatus 2 has a discharge apparatus 200R for applying luminescent material 211R to all the target discharge areas 38R, a drying apparatus 250R for drying the luminescent material 211R on the target discharge areas 38R, a discharge apparatus 200G for applying luminescent material 211G to all the target discharge areas 38G, a drying apparatus 250G for drying the luminescent material 211G on the target discharge areas 38G, a discharge apparatus 200B for applying luminescent material 211B to all the target discharge areas 38B, and a drying apparatus 250B for drying the luminescent material 211B on the target discharge areas 38B. Furthermore, the manufacturing apparatus 2 also has a plurality of conveyance apparatuses 270 that convey the substrate 30A through the discharge apparatus 200R, the drying apparatus 250R, the discharge apparatus 200G, the drying apparatus 250G, the discharge apparatus 200B, and the drying apparatus 250B, in this order. Each of the plurality conveyance apparatuses 270 has a fork unit, a drive unit for vertically moving the fork unit, and a self-propelled unit.

Figure 20:
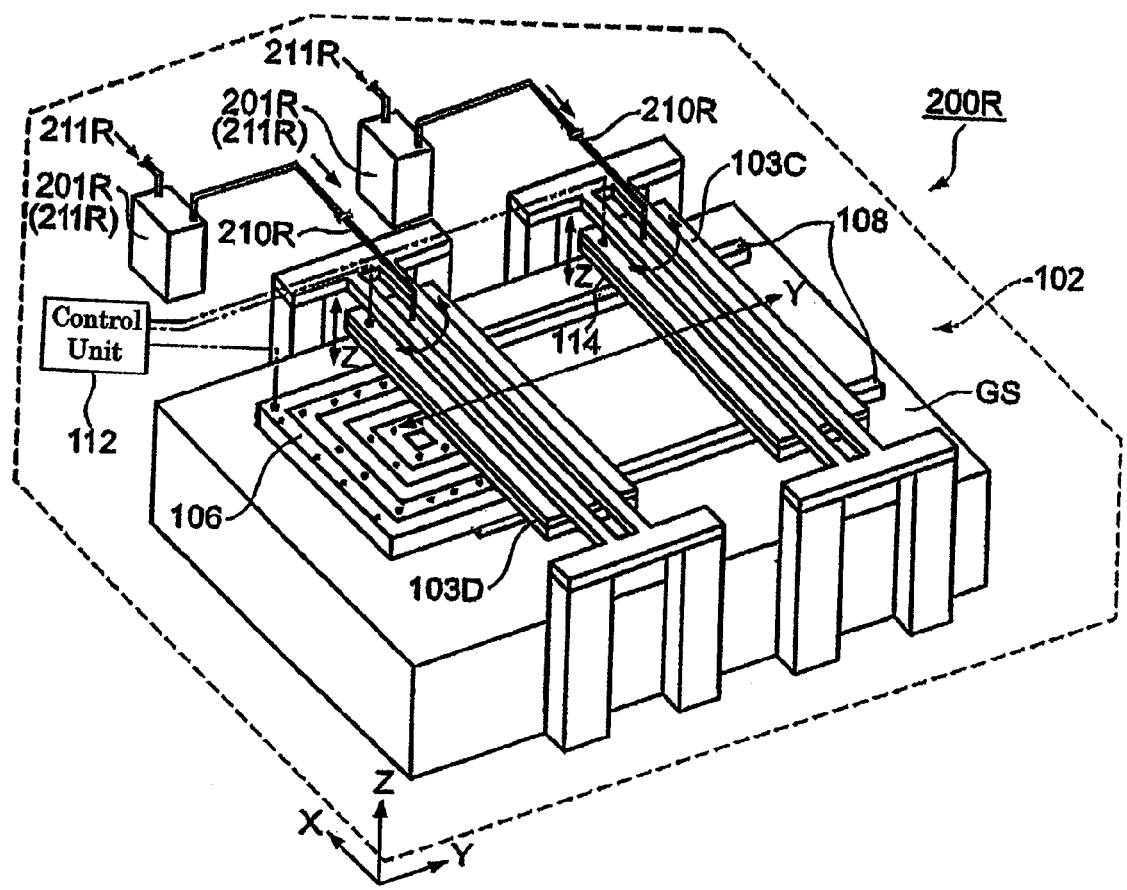
FIG. 20 is a schematic diagram showing the discharge apparatus in accordance with the fifth embodiment of the present invention.

The discharge apparatus 200R shown in FIG. 20 has two tanks 201R for holding liquid luminescent material 211R, two tubes 210R, and a discharge scanning unit 102 to which the luminescent material 211R is fed from the two tanks 201R via the two tubes 210R. The configuration of the discharge scanning unit 102 is the same as the configuration of the discharge scanning unit of the second embodiment. Other elements of the discharge apparatus 200R will be referred to with the same reference symbols as those of the first or the second embodiment. Furthermore, redundant description will be omitted.

The configurations of the discharge apparatus 200G and discharge apparatus 200B are essentially the same as the configuration of the discharge apparatus 200R. However, the configuration of the discharge apparatus 200G is different from the configuration of the discharge apparatus 200R in that the discharge apparatus 200G is provided with a tank and a tube for the luminescent material 211G instead of the tank 201R and tube 210R. In a similar fashion, the configuration of the discharge apparatus 200B is different from the configuration of the discharge apparatus 200R in that the discharge apparatus 200B is provided with a tank and a tube for the luminescent material 211B instead of the tank 201R and tube 210R. It should be noted that the liquid luminescent materials 211R, 211G, and 211B in the present embodiment are an example of the liquid materials of the present invention.

Next, the method of manufacturing an electroluminescent display apparatus 30 with the manufacturing apparatus 2 will be described. First, the substrate 30A shown in FIG. 18 is produced using known film manufacturing technology and patterning technology.

Next, the substrate 30A is rendered lyophilic by an oxygen plasma treatment under atmospheric pressure. This treatment provides lyophilicity to the surfaces of the pixel electrodes 36 in the concave portions (parts of the pixel areas) defined by the pixel electrodes 36 and the bank 40, as well as to the surfaces of the inorganic bank 40A and the surfaces of the organic bank 40B. The substrate 30A is thereafter subjected to plasma treatment using tetrafluoromethane as treatment gas. The plasma treatment with tetrafluoromethane brings about fluorination (treatment to achieve fluid repellency) of the surfaces of the organic bank 40B in the concave portions, and the surfaces of the organic bank 40B are thereby rendered repellent to fluids. Although the lyophilicity is slightly lost from the surfaces of the pixel electrodes 36 and the surfaces of the inorganic bank 40A due to the plasma treatment with tetrafluoromethane, these surfaces still remain overall lyophilic after the plasma treatment. The concave portions are thus converted to the target discharge areas 38R, 38G, and 38B by treating the surfaces of the concave portions defined by the pixel electrodes 36, and the bank 40 with a predetermined surface treatment.

Depending on the material of the pixel electrodes 36, the material of the inorganic bank 40A, and the material of the organic bank 40B, a surface with a desired lyophilicity and fluid repellency can be obtained without a surface treatment such as the one described above. In such cases, the surfaces of the concave portions defined by the pixel electrodes 36, and the bank 40 form the target discharge areas 38R, 38G, and 38B without the above-described surface treatment.

Figure 21:
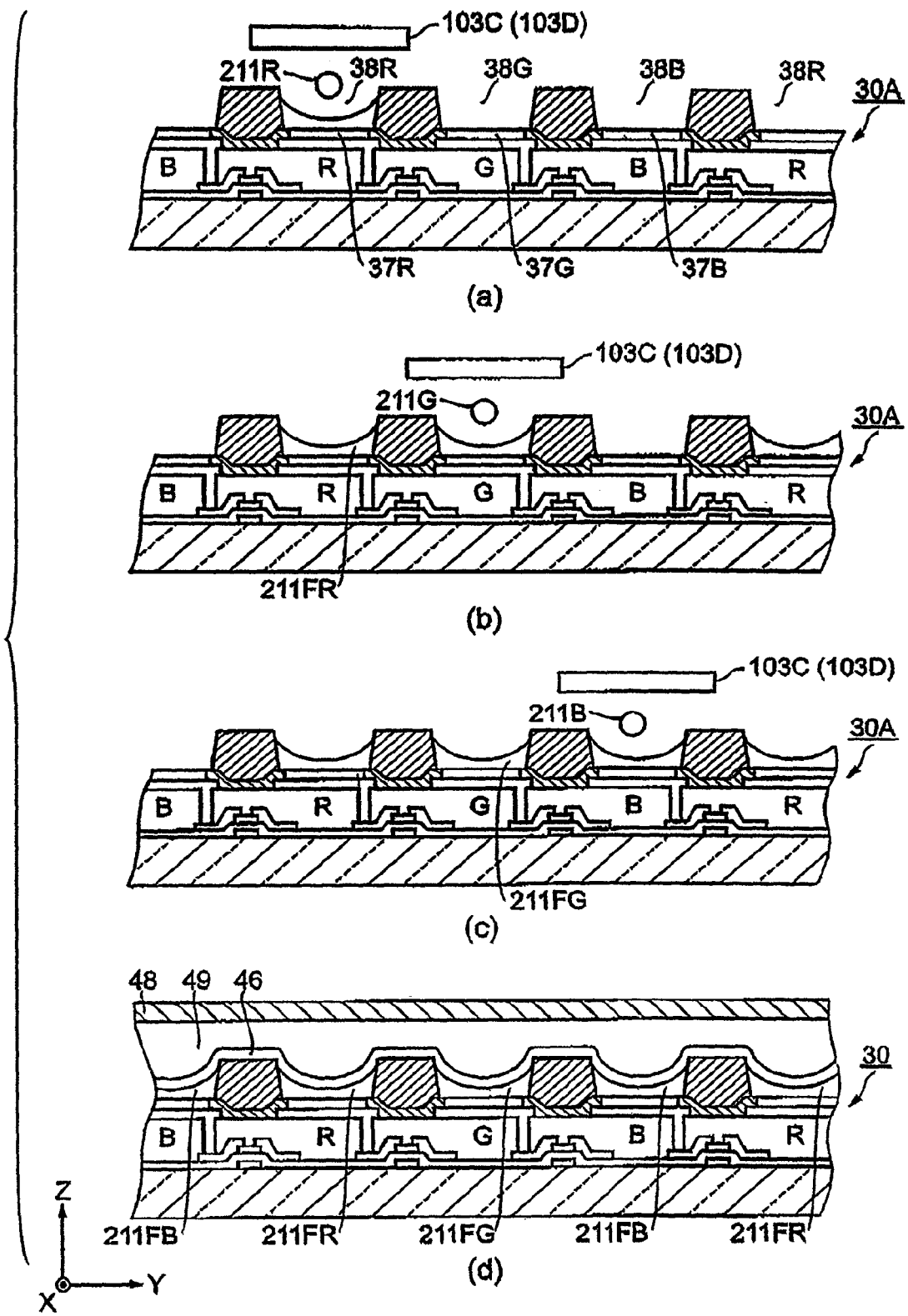
FIGS. 21 (a) to (d) are schematic diagrams showing the production method of the electroluminescent display apparatus in accordance with the fifth embodiment of the present invention.

In FIG. 21(a), hole-transport layers 37R, 37G, and 37B are formed at positions that correspond to each of the plurality of pixel electrodes 36 whose surfaces have been treated. The luminous efficiency of the electroluminescent display apparatus is increased when the hole-transport layers 37R, 37G, and 37B are positioned between the pixel electrodes 36 and the luminescent layers 211RF, 211GF, and 211BF, which will be described below. When the hole-transport layers 37R, 37G, and 37B are provided to each of the plurality of pixel electrodes 36, the concave portions defined by the bank 40 and the hole-transport layers 37R, 37G, and 37B correspond to the target discharge areas 38R, 38G, and 38B, respectively.

It is possible to form the hole-transport layers 37R, 37G, and 37B with an inkjet method. In this case, a solution that contains material for forming the hole-transport layers 37R, 37G, and 37B is applied up to a predetermined amount to each pixel area, such that the hole-transport layers 37R, 37G, and 37B can be formed.

The substrate 30A on which the target discharge areas 38R, 38G, and 38B are formed is carried to the stage 106 of the discharge apparatus 200R using a conveyance apparatus 270. The discharge apparatus 200R discharges luminescent material 211R from the heads 114 (FIG. 9) so that a layer of luminescent material 211R is formed over all the target discharge areas 38R, as shown in FIG. 21(a).

Specifically, the first discharge head unit 103C is initially positioned in the area corresponding to a certain target discharge area 38R. The discharge apparatus 200R then discharges the first droplets of the luminescent material 211R from the discharge nozzles 118T of the first discharge head unit 103C toward the target discharge area 38R. Subsequent to the first discharge head unit 103C, the second discharge head unit 103D is positioned in the area corresponding to the target discharge area 38R. Second droplets of the luminescent material 211R are then discharged from the second discharge head unit 103D toward the target discharge area 38R.

In the present embodiment, the desired amount of liquid luminescent material 211R is applied to all the target discharge areas 38R while the stage 106 makes a single cycle of relative movement in the Y-axis direction. This is because all the target discharge areas 38R are distributed within the first range EXT.

Since the discharge nozzles 118T of the first discharge head unit 103C and the discharge nozzles 118T of the second discharge head unit 103D are positioned at the same positions within the target discharge area 38R during a single scan period, the volume of the luminescent material 211R applied to the target discharge area 38R during a single scan period can be increased even if the volume of each droplet of luminescent material 211R discharged from a single discharge nozzle 118T is small.

When a layer of luminescent material 211R is formed over all the target discharge areas 38R of the substrate 30A, the conveyance apparatus 270 positions the substrate 30A in the drying apparatus 250R. The luminescent material 211R on the target discharge areas 38R is completely dried to obtain a luminescent layer 211FR on the target discharge areas 38R.

Next, the conveyance apparatus 270 positions the substrate 30A on the stage 106 of the discharge apparatus 200G. The discharge apparatus 200G discharges luminescent material 211G from the heads 114 (FIG. 9) so that a layer of luminescent material 211G is formed over all the target discharge areas 38G, as shown in FIG. 21(b).

Specifically, the first discharge head unit 103C is initially positioned in the area corresponding to a certain target discharge area 38G. The discharge apparatus 200G then discharges the first droplets of the luminescent material 211G from the discharge nozzles 118T of the first discharge head unit 103C toward the target discharge area 38G. Subsequent to the first discharge head unit 103C, the second discharge head unit 103D is positioned in the area corresponding to the target discharge area 38G. Second droplets of the luminescent material 211G are then discharged from the second discharge head unit 103D toward the target discharge area 38G.

When a layer of luminescent material 211G is formed over all the target discharge areas 38G of the substrate 30A, the conveyance apparatus 270 positions the substrate 30A in the drying apparatus 250G. The luminescent material 211G on the target discharge area 38G is completely dried to obtain a luminescent layer 211FG on the target discharge areas 38G.

Next, the conveyance apparatus 270 positions the substrate 30A on the stage 106 of the discharge apparatus 200B. The discharge apparatus 200B discharges luminescent material 211B from the heads 114 (FIG. 9) so that a layer of luminescent material 211B is formed over all the target discharge areas 38B, as shown in FIG. 21(c).

Specifically, the first discharge head unit 103C is initially positioned in the area corresponding to a certain target discharge area 38B. The discharge apparatus 200B then discharges the first droplets of the luminescent material 211B from the discharge nozzles 118T of the first discharge head unit 103C toward the target discharge area 38B. Subsequent to the first discharge head unit 103C, the second discharge head unit 103D is positioned in the area corresponding to the target discharge area 38B. Second droplets of the luminescent material 211B are then discharged from the second discharge head unit 103D toward the target discharge area 38B.

When a layer of luminescent material 211B is formed over all the target discharge areas 38B of the substrate 30A, the conveyance apparatus 270 positions the substrate 30A in the drying apparatus 250B. The luminescent material 211B on the target discharge area 38B is completely dried to obtain a luminescent layer 211FB on the target discharge areas 38B.

Next, opposing electrodes 46 are disposed so as to cover the bank 40 and the luminescent layers 211FR, 211FG, and 211FB. The opposing electrode 46 functions as a negative electrode. A sealing substrate 48 and the substrate 30A are then mutually bonded to the surrounding area to obtain the electroluminescent display apparatus 30 shown in FIG. 21(d). It should be noted that inert gas 49 is sealed between the sealing substrate 48 and the substrate 30A.

The light emitted from the luminescent layers 211FR, 211FG, and 211FB in the electroluminescent display apparatus 30 is emitted via the pixel electrodes 36, the circuit element layer 34, and the carrier substrate 32 (downward direction in FIGS. 18(a) and 21(d)). An electroluminescent display apparatus that emits light via a circuit element layer 34 in this manner is referred to as a bottom-emission display apparatus.

Sixth Embodiment

A manufacturing apparatus of a substrate on the reverse side of a plasma display apparatus, in which manufacturing apparatus the discharge apparatus of the present invention is applied, will now be described.

A substrate 50A shown in FIGS. 22(a) and (b) will be processed by a manufacturing apparatus 3 (FIG. 23) described below, such that a substrate 50B for the reverse side of a plasma display apparatus is formed. The substrate 50A has a plurality of target discharge areas 58R, 58G, and 58B disposed in the form of a matrix.

Specifically, the substrate 50A has a carrier substrate 52, a plurality of address electrodes 54 formed in the form of stripes on the carrier substrate 52, a dielectric glass layer 56 formed so as to cover the address electrodes 54, and partition walls 60 that have the shape of a lattice and define a plurality of pixel areas. The plurality of pixel areas is positioned in the form of a matrix, and the rows of the matrix formed by the plurality of pixel areas correspond to the plurality of address electrodes 54. Such substrate 50A can be formed by known screen printing technology.

The concave portions defined by the dielectric glass layer 56 and partitions 60 in each pixel areas of the substrate 50A correspond to the target discharge area 58R, target discharge area 58G, and target discharge area 58B. The target discharge area 58R is an area in which a fluorescent layer 311FR is to be formed for exclusive emission of light in the red wavelength region, while the target discharge area 58G is an area in which a fluorescent layer 311FG is to be formed for exclusive emission of light in the green wavelength region, and the target discharge area 58B is an area in which a fluorescent layer 311FB is to be formed for exclusive emission of light in the blue wavelength region.

Figure 22:
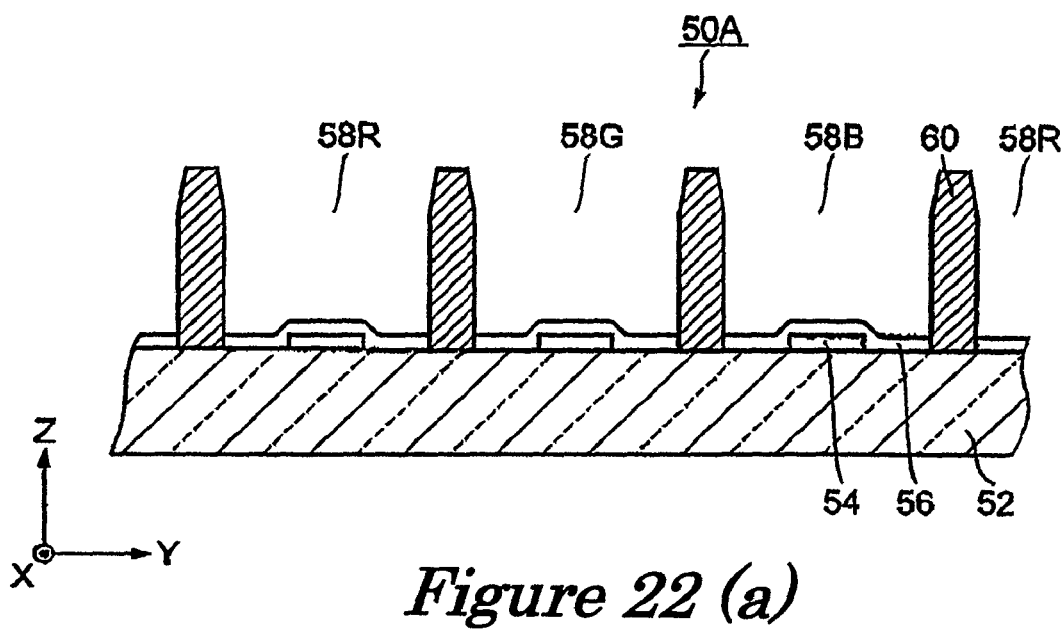
FIG. 22(a) is a schematic diagram showing a cross section of the substrate in accordance with the sixth embodiment of the present invention.
FIG. 22(b) is a schematic diagram showing the plane of the substrate in accordance with the sixth embodiment of the present invention.
Figure 22:
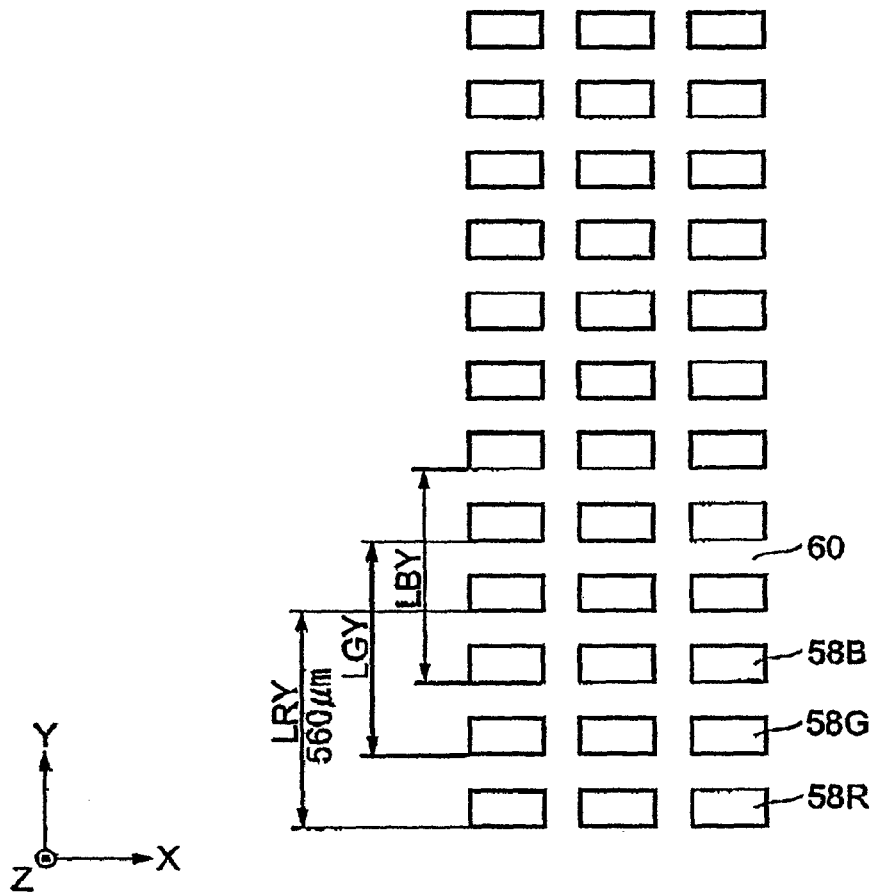

The substrate 50A shown in FIG. 22(*b*) is positioned on a plane that is parallel both to the X-direction and to the Y-axis direction. The row and column directions of the matrix formed by the plurality of target discharge areas 58R, 58G, and 58B are each parallel to the X-axis and Y-axis directions. The target discharge area 58R, target discharge area 58G, and target discharge area 58B in the substrate 50A are periodically aligned in the same order in the Y-axis direction. The target discharge areas 58R are aligned in a single row in the X-axis direction with predetermined fixed spaces therebetween, while the target discharge areas 58G are aligned in a single row in the X-axis direction with predetermined fixed spaces therebetween, and the target discharge areas 58B are aligned in a single row in the X-axis direction with predetermined fixed spaces therebetween. The X- and Y-axis directions are mutually orthogonal.

The range in which the target discharge areas 58R, 58G, and 58B are distributed in the X-axis direction is accommodated within the first range EXT (FIG. 9).

The spacing LRY, or the pitch of the target discharge area 35R, is about 560 μm along the Y-axis direction of the target discharge areas 58R. This spacing is the same as the spacing LGY along the Y-axis direction of the target discharge areas 58G, and the spacing LBY along the Y-axis direction of the target discharge areas 58B. The planar shape of the target discharge areas 58R is a rectangle defined by long and short sides. Specifically, the length of the Y-axis direction of the target discharge area 58R is about 100 μm, and the length of the X-axis direction is about 300 μm. The target discharge area 58G and target discharge area 58B have the same shape and size as the target discharge area 58R. The above-described spacing between the target discharge areas and the above-described size of the target discharge areas are applicable to those of the pixel areas for the same colors in a high definition television with a screen size of about 40 inches.

Figure 23:
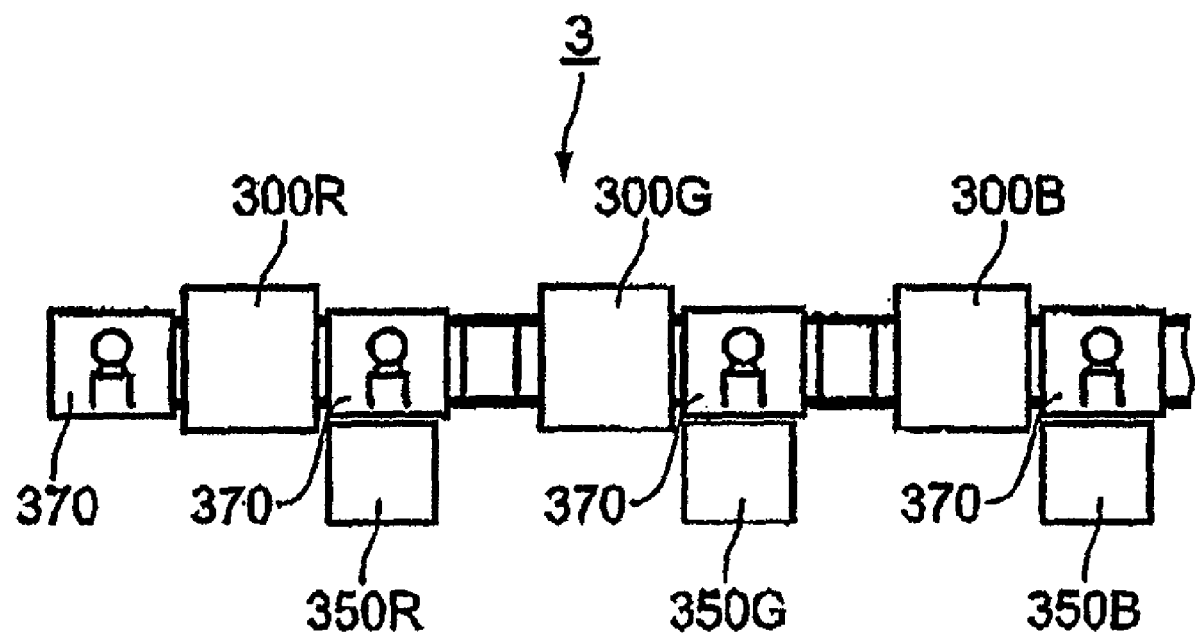
FIG. 23 is a schematic diagram showing a portion of the plasma display apparatus in accordance with the sixth embodiment of the present invention.

The manufacturing apparatus 3 shown in FIG. 23 is an apparatus for discharging corresponding fluorescent material to each of the target discharge areas 58R, 58G, and 58B of the substrate 50A in FIG. 22. The manufacturing apparatus 3 has a discharge apparatus 300R for applying fluorescent material 311R to all the target discharge areas 58R, a drying apparatus 350R for drying the fluorescent material 311R on the target discharge areas 58R, a discharge apparatus 300G for applying fluorescent material 311G to all the target discharge areas 58G, a drying apparatus 350G for drying the fluorescent material 311G on the target discharge areas 58G, a discharge apparatus 300B for applying fluorescent material 311B to all the target discharge areas 58B, and a drying apparatus 350B for drying the fluorescent material 311B on the target discharge areas 58B. Furthermore, the manufacturing apparatus 3 also has a plurality of conveyance apparatuses 370 that convey the substrate 50A through the discharge apparatus 300R, the drying apparatus 350R, the discharge apparatus 300G, the drying apparatus 350G, the discharge apparatus 300B, and the drying apparatus 350B, in this order. Each of the plurality of conveyance apparatuses 270 has a fork unit, a drive unit for vertically moving the fork unit, and a self-propelled unit.

Figure 24:
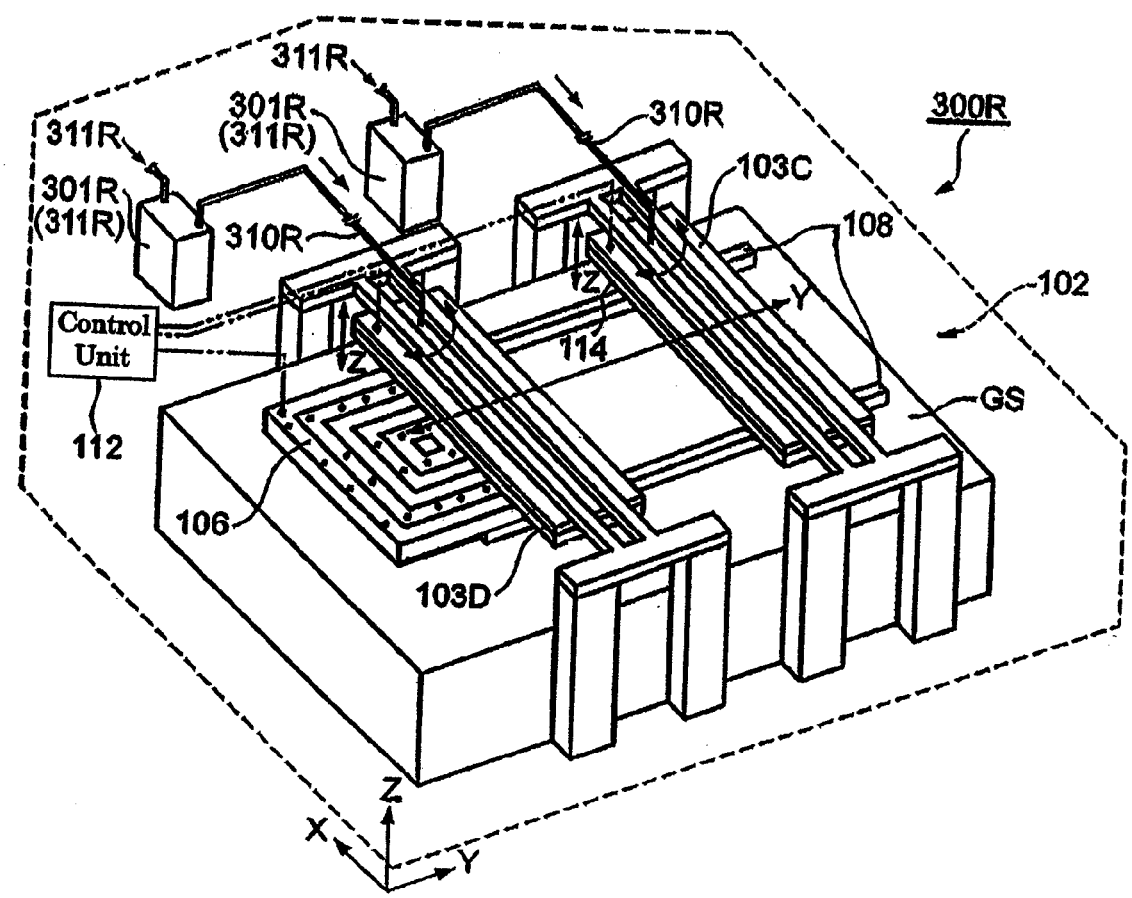
FIG. 24 is a schematic diagram showing the discharge apparatus in accordance with the sixth embodiment of the present invention.

The discharge apparatus 300R shown in FIG. 24 has two tanks 301R for holding liquid fluorescent material 311R, two tubes 310R, and a discharge scanning unit 102 to which the fluorescent material 311R is fed from the two tanks 301R via the two tubes 310R. The configuration of the discharge scanning unit 102 is essentially the same as configuration of the discharge scanning unit of the second embodiment. Other elements of the discharge apparatus 300R will be referred to with the same reference symbols as those of the first or the second embodiment. Furthermore, redundant description will be omitted.

The configurations of the discharge apparatus 300G and discharge apparatus 300B are both essentially the same as the configuration of the discharge apparatus 300R. However, the configuration of the discharge apparatus 300G is different from the configuration of the discharge apparatus 300R in that the discharge apparatus 300G is provided with a tank and a tube for the fluorescent material 311G instead of the tank 301R and tube 310R. In a similar fashion, the configuration of the discharge apparatus 300B is different from the configuration of the discharge apparatus 300R in that the discharge apparatus 300B is provided with a tank and a tube for the fluorescent material 311B instead of the tank 301R and tube 310R. It should be noted that the liquid fluorescent materials 311R, 311B, and 311G in the present embodiment are an example of the liquid materials of the present invention.

Next, the method of manufacturing a plasma display apparatus by using the manufacturing apparatus 3 is described. First, the substrate 50A shown in FIG. 22 is manufactured using known screen printing technology whereby a plurality of address electrodes 54, a dielectric glass layer 56, and partition walls 60 are formed on the carrier substrate 52.

Next, the substrate 50A is rendered lyophilic by an oxygen plasma treatment under atmospheric pressure. This treatment provides lyophilicity to the surfaces of the concave portions (parts of the pixel areas) that are defined by the partition walls 60 and the dielectric glass layer 56. In other words, the surfaces of the partition walls 50 and the dielectric glass layer 56 are subjected to the oxygen plasma treatment. Depending on the material, a surface with a desired lyophilicity can be obtained without a surface treatment such as the one described above. In such cases, the surfaces of the concave portions defined by the partition walls 60 and the dielectric glass layer 56 form the target discharge areas 58R, 58G, and 58B, without the above-described surface treatment.

Figure 25:
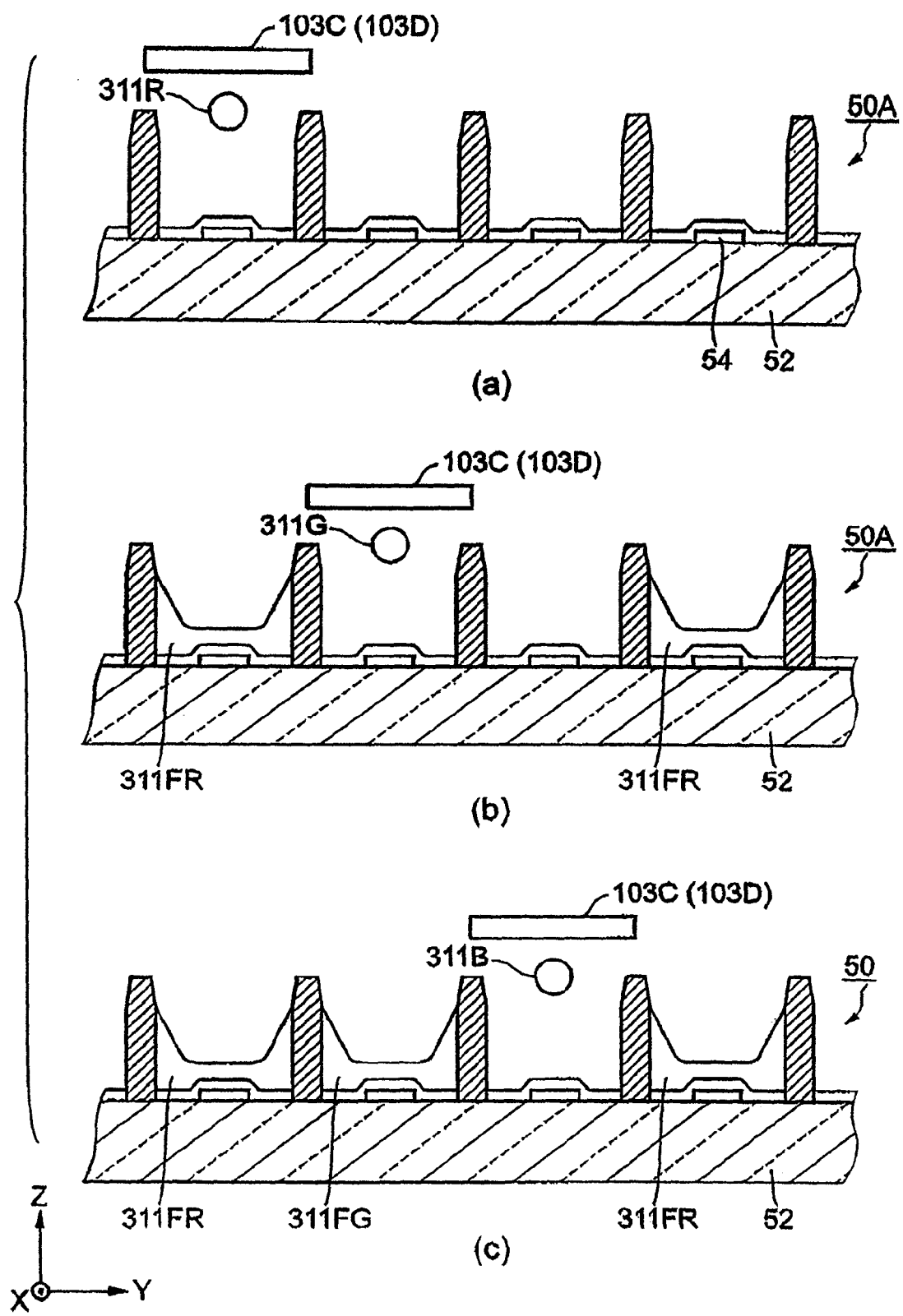
FIGS. 25(a) to (c) are schematic diagrams showing a portion of the production method for the plasma display apparatus in accordance with the sixth embodiment of the present invention.

The substrate 50A on which the target discharge areas 58R, 58G, and 58B are formed is carried onto the stage 106 of the discharge apparatus 300R using a conveyance apparatus 370. The discharge apparatus 300R discharges fluorescent material 311R from the heads 114 (FIG. 9) so that a layer of fluorescent material 311R is formed over all the target discharge areas 58R, as shown in FIG. 25(*a*).

Specifically, the first discharge head unit 103C is initially positioned in the area corresponding to a certain target discharge area 58R. The discharge apparatus 300R then discharges the first droplets of the fluorescent material 311R from the discharge nozzles 118T of the first discharge head unit 103C toward the target discharge area 58R. Subsequent to the first discharge head unit 103C, the second discharge head unit 103D is positioned in the area corresponding to the target discharge area 58R. Second droplets of the fluorescent material 311R are then discharged from the second discharge head unit 103D toward the target discharge area 58R.

In the present embodiment, the desired amount of liquid fluorescent material 311R is applied to all the target discharge areas 58R while the stage 106 makes a single cycle of relative movement in the Y-axis direction. This is because all the target discharge areas 58R are distributed within the first range EXT.

Since the discharge nozzles 118T of the first discharge head unit 103C and the discharge nozzles 118T of the second discharge head unit 103D are positioned at the same positions within the target discharge area 58R during a single scan period, the volume of the fluorescent material 311R applied to the target discharge area 58R during a single scan period can be increased even if the volume of one droplet of fluorescent material 311R deposited from a single discharge nozzle 118T at a time is small.

When a layer of fluorescent material 311R is formed over all the target discharge areas 58R of the substrate 50A, the conveyance apparatus 370 positions the substrate 50A in the drying apparatus 350R. The fluorescent material 311R on the target discharge areas 58R is completely dried to obtain a fluorescent layer 311FR on the target discharge areas 58R.

Next, the conveyance apparatus 370 positions the substrate 50A on the stage 106 of the discharge apparatus 300G. The discharge apparatus 300G discharges fluorescent material 311G from the heads 114 (FIG. 9) so that a layer of fluorescent material 311G is formed over all the target discharge areas 58G, as shown in FIG. 25(b).

Specifically, the first discharge head unit 103C is initially positioned in the area corresponding to a certain target discharge area 58G. The discharge apparatus 300G then discharges the first droplets of the fluorescent material 311G from the discharge nozzles 118T of the first discharge head unit 103C toward the target discharge area 58G. Subsequent to the first discharge head unit 103C, the second discharge head unit 103D is positioned in the area corresponding to the target discharge area 58G. Second droplets of the fluorescent material 311G are then discharged from the second discharge head unit 103D toward the target discharge area 58G.

When a layer of fluorescent material 311G is formed over all the target discharge areas 58B of the substrate 50A, the conveyance apparatus 370 positions the substrate 50A in the drying apparatus 350G. The fluorescent material 311G on the target discharge areas 58G is completely dried to obtain a fluorescent layer 311FG on the target discharge areas 58G.

Next, the conveyance apparatus 370 positions the substrate 50A on the stage 106 of the discharge apparatus 300B. The discharge apparatus 300B discharges fluorescent material 311B from the heads 114 (FIG. 9) so that a layer of fluorescent material 311B is formed over all the target discharge areas 58B, as shown in FIG. 25(c).

Specifically, the first discharge head unit 103C is initially positioned in the area corresponding to a certain target discharge area 58B. The discharge apparatus 300B then discharges the first droplets of the fluorescent material 311B from the discharge nozzles 118T of the first discharge head unit 103C toward the target discharge area 58B. Subsequent to the first discharge head unit 103C, the second discharge head unit 103D is positioned in the area corresponding to the target discharge area 58B. Second droplets of the fluorescent material 311B are then discharged from the second discharge head unit 103D toward the target discharge area 58B.

When a layer of fluorescent material 311B is formed over all the target discharge areas 58B of the substrate 50A, the conveyance apparatus 370 positions the substrate 50A in the drying apparatus 350B. The fluorescent material 311B on the target discharge areas 58B is completely dried to obtain a fluorescent layer 311FB on the target discharge areas 58B.

As a result of the above process, the substrate 50A becomes a substrate 50B, which will be used on the reverse side of a plasma display apparatus.

Figure 26:
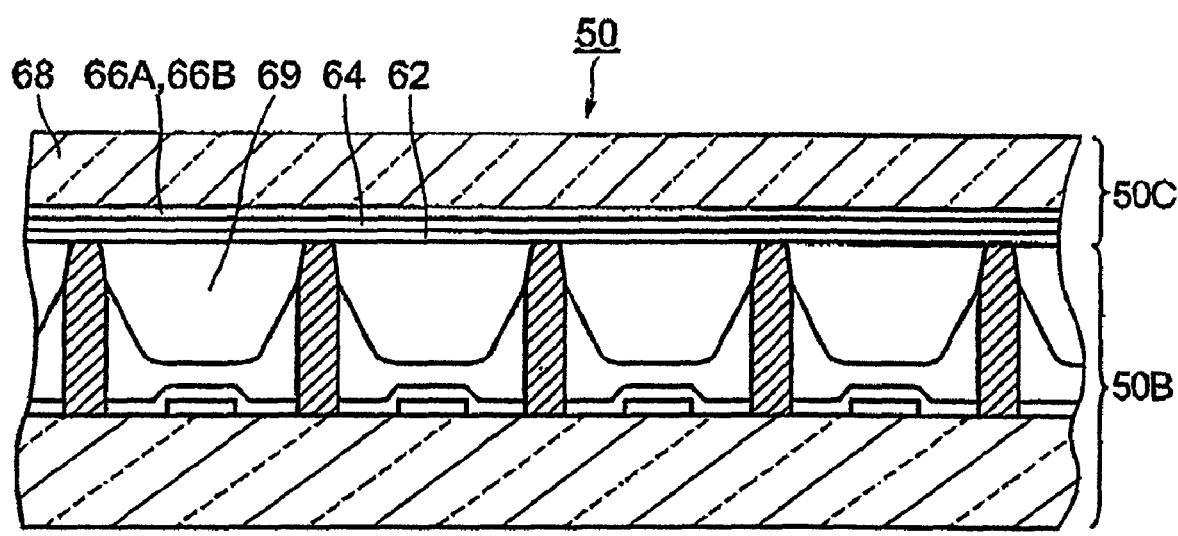
FIG. 26 is a schematic diagram showing a cross section of the plasma display apparatus produced by the production method in accordance with the sixth embodiment of the present invention.

Next, the reverse side substrate 50B and a front side substrate 50C are laminated together with a known method to obtain a plasma display apparatus 50 as shown in FIG. 26. The front side substrate 50C has a glass substrate 68, display electrodes 66A and display scan electrodes 66B that are patterned in parallel on the glass substrate 68, a dielectric glass layer 64 formed so as to cover the display electrodes 66A and the display scan electrodes 66B, and an MgO protective layer 62 formed on the dielectric glass layer 64. The reverse side substrate 50B and the front side substrate 50C are positioned such that the address electrodes 54 of the reverse side substrate 50B are orthogonal to the display electrodes 66A and display scan electrodes 66B of the front side substrate 50C. A discharge gas 69 is sealed at a predetermined pressure in the cell (pixel area) surrounded by the partition walls 60.

Seventh Embodiment

An example in which the present invention is applied to the apparatus for manufacturing an image display apparatus having an electron emission device will now be described.

A substrate 70A shown in FIGS. 27(a) and (b) will be processed by a manufacturing apparatus 4 (FIG. 28) described below, which manufactures a substrate that serves as an electron source substrate 70B for an image display apparatus. The substrate 70A has a plurality of target discharge areas 78 disposed in the form of a matrix.

Specifically, the substrate 70A has a base 72, a sodium diffusion prevention layer 74 positioned on the base 72, a plurality of element electrodes 76A and 76B positioned on the sodium diffusion prevention layer 74, a plurality of pieces of metal wiring 79A positioned on the plurality of element electrodes 76A, and a plurality of pieces of metal wiring 79B positioned on the plurality of element electrodes 76B. Each of the plurality of pieces of metal wiring 79A has a shape that extends in the Y-axis direction, and each of the plurality of pieces of metal wiring 79B has a shape that extends in the X-axis direction (FIG. 27(b)). Since an insulating film 75 is formed between the metal wiring 79A and metal wiring 79B, the metal wiring 79A and metal wiring 79B are electrically insulated.

The portions where a pair of element electrodes 76A and 76B is positioned correspond to single pixel areas. The two element electrodes 76A and 76B are separated from one another by a predetermined spacing and face each other on the sodium diffusion prevention layer 74. The element electrode 76A in correspondence with a certain pixel area is electrically connected to a corresponding metal wiring 79A. Also, the element electrode 76B in correspondence with the certain pixel area is electrically connected to a corresponding metal wiring 79B. It should be noted that in the present specification the portion in which the base 72 and sodium diffusion prevention layer 74 are brought together is sometimes designated as a carrier substrate.

In each of the pixel areas of the substrate 70A, a portion of the element electrode 76A, a portion of the element electrode 76B, and the sodium diffusion prevention layer 74 exposed between the element electrode 76A and the element electrode 76B correspond to a target discharge area 78. More specifically, the target discharge area 78 is an area in which an electroconductive thin film 411F (FIG. 31) is to be formed. The electroconductive thin film 411F is formed so as to cover a portion of the element electrode 76A, a portion of the element electrode 76B, and the gap between the element electrodes 76A and 76B. The planar shape of the target discharge areas 78 in the present embodiment is circular, as shown by the dotted lines in FIG. 27(b). Thus, the planar shape of the target discharge areas of the present invention is a circle defined by the X-coordinate range and the Y-coordinate range.

The substrate 70A shown in FIG. 27(b) is positioned on a plane that is parallel both to the X-direction and to the Y-axis direction. The row and column directions of the matrix formed by the plurality of target discharge areas 78 are each parallel to the X- and Y-axis directions. In other words, the target discharge areas 78 are aligned on the substrate 70A such that its row and column directions match with the X-axis and Y-axis directions. It should be noted that the X- and Y-axis directions are orthogonal to each other.

The range in which the target discharge areas 78 are distributed in the X-axis direction is accommodated in the first range EXT (FIG. 9).

The spacing L, or the pitch between the target discharge areas 78 is about 190 μm along the Y-axis direction of the target discharge areas 78. The X-axis direction diameter (length of the X-coordinate range) of the target discharge area 78R is about 100 μm, and the Y-axis direction diameter (length of the Y-coordinate range) is about 100 μm. The above-described spacing between the target discharge areas 78 and the above-described size of the target discharge areas are applicable to those of the pixel areas for the same colors in a high definition television with a screen size of about 40 inches.

Figure 27:
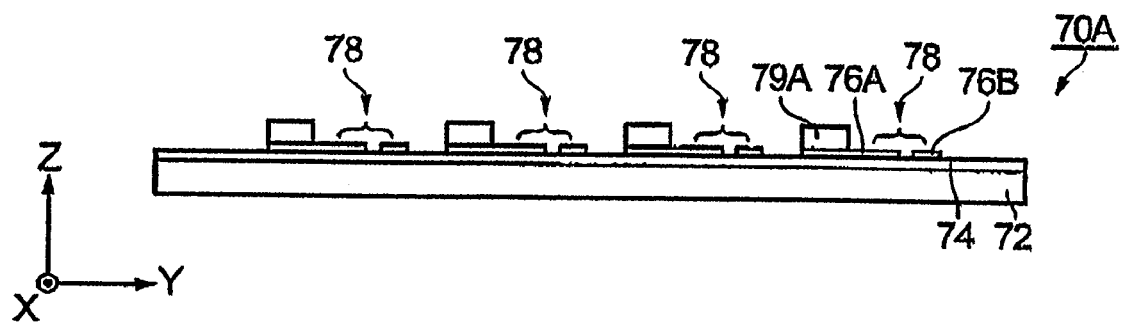
FIG. 27(a) is a schematic diagram showing a cross section of the substrate in accordance with the seventh embodiment of the present invention.
FIG. 27(b) is a schematic diagram showing the plane of the substrate in accordance with the seventh embodiment of the present invention.
Figure 27:
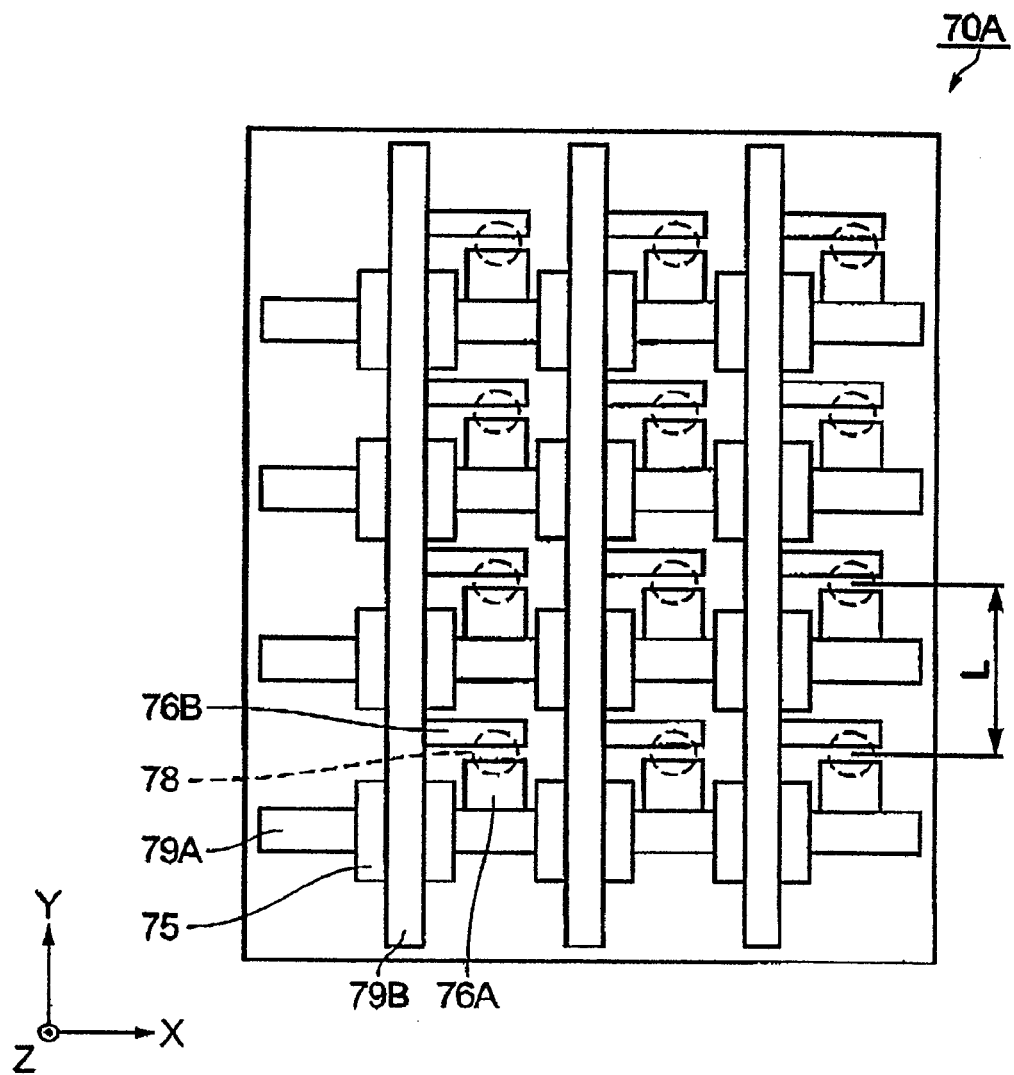
Figure 28:
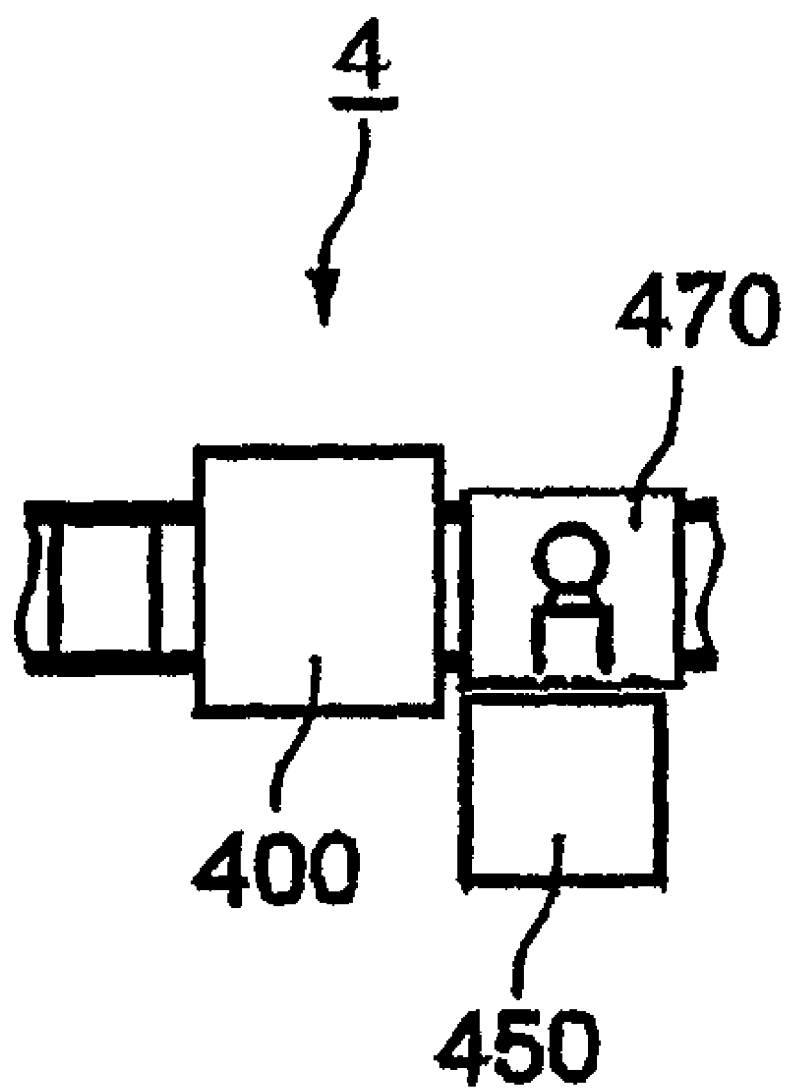
FIG. 28 is a schematic diagram showing the manufacturing apparatus of the image display device in accordance with the seventh embodiment of the present invention.

The manufacturing apparatus 4 shown in FIG. 28 is an apparatus for discharging electroconductive thin film material 411 to each of the target discharge areas 78 of the substrate 70A in FIG. 27. The manufacturing apparatus 4 has a discharge apparatus 400 for applying electroconductive thin film material 411 to all the target discharge areas 78, and a drying apparatus 450 for drying the electroconductive thin film material 411 on the target discharge areas 78. Furthermore, the manufacturing apparatus 4 also has a conveyance apparatus 470 for conveying the substrate 70A to the discharge apparatus 400 and the drying apparatus 450 in this order. The conveyance apparatus 470 has a fork unit, a drive unit for vertically moving the fork unit, and a self-propelled unit.

Figure 29:
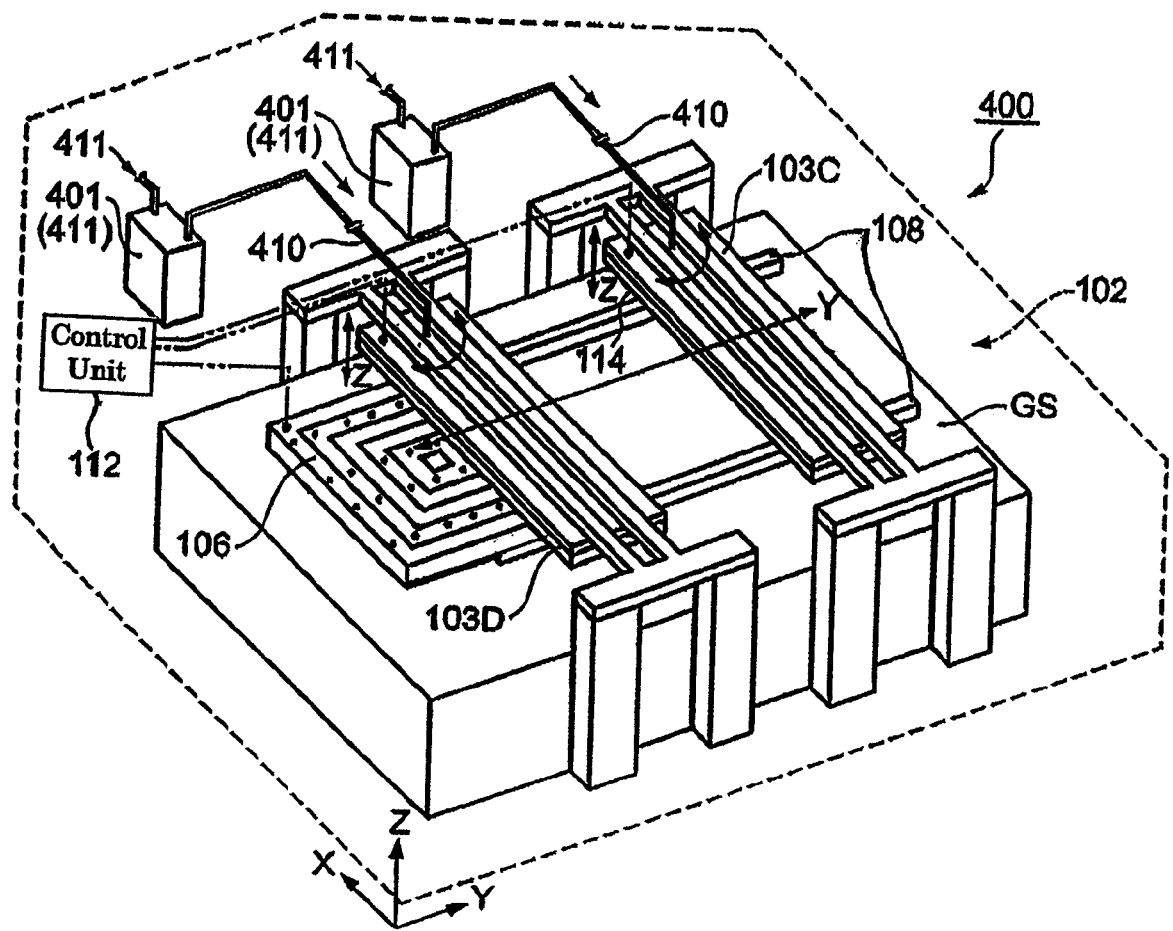
FIG. 29 is a schematic diagram showing the discharge apparatus in accordance with the seventh embodiment of the present invention.

The discharge apparatus 400 shown in FIG. 29 has two tanks 401 for holding the liquid electroconductive thin film material 411, two tubes 410, and a discharge scanning unit 102 to which the electroconductive thin film material 411 is fed from the two tanks 401 via the two tubes 410. The configuration of the discharge scanning unit 102 is essentially the same as the configuration of the discharge scanning unit of the second embodiment. Other elements of the discharge apparatus 400 will be referred to with the same reference symbols as those of the first or the second embodiment. Furthermore, redundant description will be omitted.

In the present embodiment, the liquid electroconductive thin film material 411 is an organic palladium solution. The electroconductive thin film material 411 in the present embodiment is an example of the liquid material of the present invention.

Next, the method of manufacturing an image display apparatus using a manufacturing apparatus 4 is described. First, a sodium diffusion prevention layer 74 that has $SiO_2$ as the main component is formed on a base 72, which is mainly composed of soda glass or the like. Specifically, the sodium diffusion prevention layer 74 is obtained by forming a film of $SiO_2$ up to a thickness of 1 μm on the base 72 using the sputtering method. A titanium layer is subsequently formed up to a thickness of 5 nm over the sodium diffusion prevention layer 74 by sputtering or vapor deposition. Out of the titanium layer, a plurality of pairs of element electrodes 76A and 76B are formed using photolithography and etching, such that the electrodes 76A and 76B in each pair are separated from one another by a predetermined distance.

Thereafter, a plurality of pieces of metal wiring 79A extending in the Y-axis direction is formed by applying and baking an Ag paste, using a screen printing technology, over the sodium diffusion prevention layer 74 and the plurality of element electrodes 76A. An insulating film 75 is subsequently formed by applying and baking a glass paste to a portion of the metal wirings 79A using the screen printing technology. A plurality of pieces of metal wiring 79B extending the X-axis direction is then formed by applying and baking an Ag paste, using the screen printing technology, over the sodium diffusion prevention layer 74 and the plurality of element electrodes 76B. In fabricating the metal wiring 79B, the Ag paste is applied such that the insulating film 75 is interposed at the intersection of the metal wiring 79B and the metal wiring 79A. The substrate 70A shown in FIG. 27 is obtained by a process such as the one described above.

The substrate 70A is subsequently rendered lyophilic by an oxygen plasma treatment under atmospheric pressure. This treatment provides lyophilicity to a portion of the surface of the element electrode 76A, a portion of the surface of the element electrode 76B, and the surface of the carrier substrate (which is a surface of the sodium diffusion prevention layer 74) exposed between the element electrode 76A and the element electrode 76B. The target discharge areas 78 are created from these surfaces. Depending on the material, a surface with a desired lyophilicity can be obtained without a surface treatment such as the one described above. In such a case, a portion of the surface of the element electrode 76A, a portion of the surface element electrode 76B, and the surface of the carrier substrate exposed between the element electrode 76A and element electrode 76B form the target discharge area 78 without the above-described surface treatment.

Figure 30:
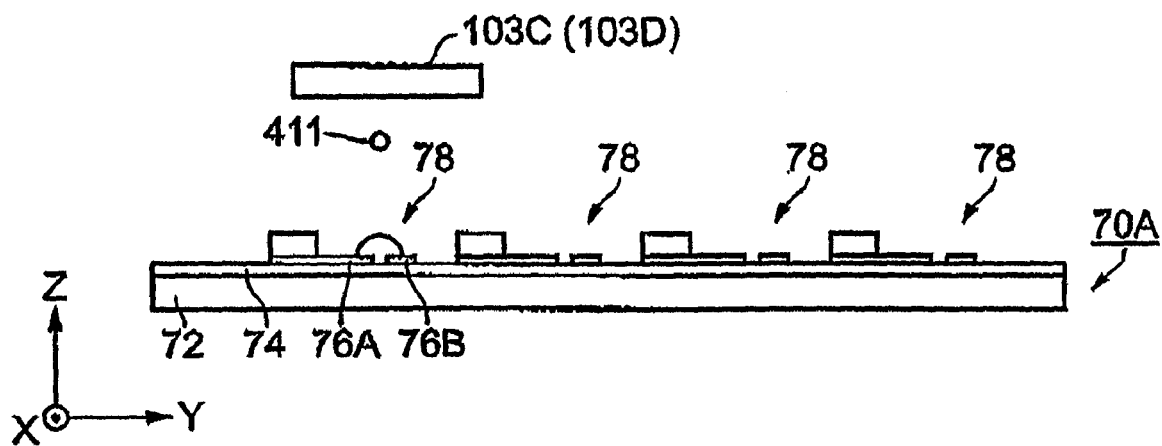
FIG. 30 is a schematic diagram showing the production method of the image display device in accordance with the seventh embodiment of the present invention.

The substrate 70A on which the target discharge areas 78 are formed is carried onto the stage 106 of the discharge apparatus 400 using the conveyance apparatus 470. The discharge apparatus 400 discharges the electroconductive thin film material 411 from the heads 114 (FIG. 9) so that an electroconductive thin film 411F is formed over all the target discharge areas 78, as shown in FIG. 30.

Specifically, the first discharge head unit 103C is initially positioned in an area corresponding to a certain target discharge area 78. The discharge apparatus 400 then discharges the first droplets of the electroconductive thin film material 411 from the discharge nozzles 118T of the first discharge head unit 103C toward the target discharge area 78. Subsequent to the first discharge head unit 103C, the second discharge head unit 103D is positioned in the area corresponding to the target discharge area 78. Second droplets of the electroconductive thin film material 411 are then discharged from the second discharge head unit 103D toward the target discharge area 78.

In the present embodiment, the desired amount of liquid electroconductive thin film material 411 is applied to all the target discharge areas 78 while the stage 106 makes a single cycle of relative movement in the Y-axis direction. This is because all the target discharge areas 78 are distributed within the first range EXT.

Since the discharge nozzles 118T of the first discharge head unit 103C and the discharge nozzles 118T of the second discharge head unit 103D are positioned at the same positions within the target discharge area 78 during a single scan period, the volume of the electroconductive thin film material 411 applied to the target discharge area 78 during a single scan period can be increased even if the volume of one droplet of the electroconductive thin film material 411 from a single discharge nozzle 118T at a time is small.

In the present embodiment, the control unit 112 gives a signal to the heads 114 so that the diameter of the droplets of the electroconductive thin film material 411 that have been deposited on the target discharge areas 78 is in the range of 60 µm to 80 µm. When a layer of electroconductive thin film material 411 is formed on all the target discharge areas 78 of the substrate 70A, the conveyance apparatus 470 positions the substrate 70A in the drying apparatus 450. The electroconductive thin film material 411 on the target discharge areas 78 is completely dried to obtain an electroconductive thin film 411F, whose main component is palladium oxide, on the target discharge areas 78. Thus, an electroconductive thin film 411F, which covers a portion of the element electrode 76A, a portion of the element electrode 76B, and the sodium diffusion prevention layer 74 exposed between the element electrode 76A and the element electrode 76B, is formed in each of the pixel areas.

Electron emission portions 411D are subsequently formed on portions of the electroconductive thin film 411F by applying a predetermined voltage in the form of pulses between each element electrode 76A and element electrode 76B. The voltage is preferably applied between the element electrode 76A and the element electrode 76B under an organic atmosphere and under vacuum conditions. This is because the electron emission efficiency from the electron emission portion 411D is increased thereby. Element electrodes 76A, corresponding element electrodes 76B, and electroconductive thin films 411F on which the electron emission portion 411D is disposed, are electron emission elements. Also, these electron emission elements correspond to the pixel areas.

Figure 31:
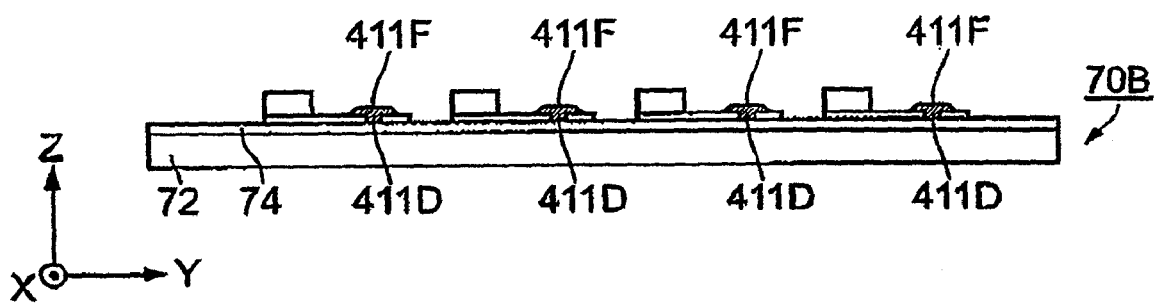
FIG. 31 is a schematic diagram showing the production method of the image display device in accordance with the seventh embodiment of the present invention.

In the above process, the substrate 70A is formed into an electron source substrate 70B, as shown in FIG. 31.

Figure 32:
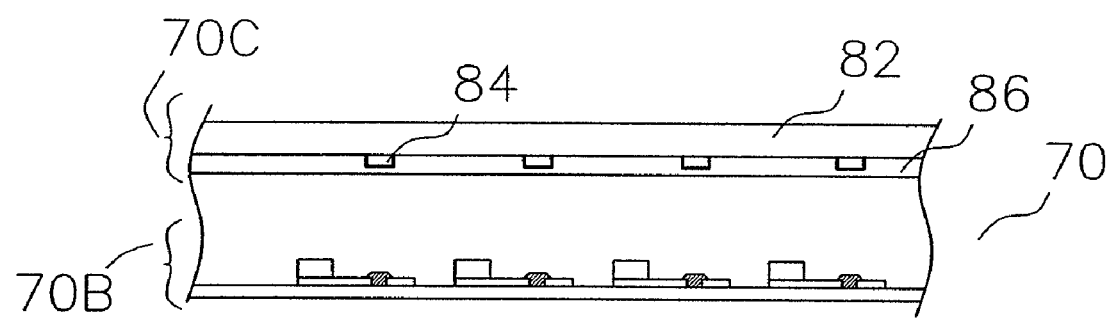
FIG. 32 is a schematic diagram showing the production method of the image display device in accordance with the seventh embodiment of the present invention.

Next, the electron source substrate 70B and the front side substrate 70C are laminated together using a known method to obtain an image display apparatus 70, as shown in FIG. 32. The front side substrate 70C has a glass substrate 82, a plurality of fluorescent portions 84 positioned in the form of a matrix on the glass substrate 82, and a metal plate 86 for covering the plurality of fluorescent portions 84. The metal plate 86 functions as an electrode for accelerating the electron beam from the electron emission substrate 411D. The electron source substrate 70B and the front side substrate 70C are positioned with respect to each other so that each of the plurality of electron emission elements faces each of the plurality of fluorescent portions 84. Also, a vacuum state is maintained between the electron source substrate 70B and the front side substrate 70C.

An image display apparatus 70 provided with the above-described electron emission device is also referred to as a SED (Surface-Conduction Electron-Emitter Display) or an FED (Field Emission Display). In the present specification, an image display apparatus or the like in which a liquid crystal display apparatus, an electroluminescent display apparatus, a plasma display apparatus, or an electron emission device is used may be described as an "electrooptic apparatus." As used in the present specification, the term "electrooptic apparatus" refers to an apparatus in general that emits, transmits, or reflects light in accordance with the application of a signal voltage, and is not limited to apparatuses that are operated based on variations in birefringence, optical rotation, light scattering, and other optical characteristics (so-called electrooptic effects).

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A material application method by which a discharge apparatus discharges droplets of fluid material on a substrate that has target discharge areas, the discharge apparatus including a stage, a discharge head unit having a first nozzle row of first nozzles and a second nozzle row of second nozzles, and a scanning unit for moving at least one of the stage and the discharge head unit with respect to the other, the material application method comprising:

mounting the substrate on the stage of the discharge apparatus such that the target discharge areas are positioned to extend along a X-axis direction;

moving one of the stage and the drive head unit relative to the other in a Y-axis direction, the Y-axis direction intersecting with the X-axis direction;

discharging first droplets of the fluid material from the first nozzles to the target discharge areas when the first nozzles are positioned in an area above the target discharge areas so that all of the first droplets are arranged in the target discharge areas on different X-axis direction positions so as not to overlap each other when viewed in the Y-axis direction; and discharging second droplets of the fluid material from the second nozzles to the target discharge areas to which the first droplets have been discharged when the second nozzles are positioned in the area above the target discharge areas after a predetermined period of time passed since the discharge of the first droplets to the target discharge areas.

2. The material application method as recited in claim 1, wherein the discharging of the second droplets includes discharging the second droplets so that all of the second droplets are arranged in the target discharge areas on different X-axis direction positions so as not to overlap each other when viewed in the Y-axis direction, and so that every one of the second droplets is arranged to overlap corresponding one of the first droplets that is positioned on the same X-axis direction as when viewed in the Y-axis direction.

* * * * *